US008351408B2

(12) United States Patent
Daigle

(10) Patent No.: US 8,351,408 B2
(45) Date of Patent: Jan. 8, 2013

(54) DATA PACKET GENERATOR FOR GENERATING PASSCODES

(76) Inventor: Mark R. Daigle, Minnetonka, MN (US)

( * ) Notice: Subject to any disclaimer, the term of this patent is extended or adjusted under 35 U.S.C. 154(b) by 74 days.

(21) Appl. No.: 12/544,798

(22) Filed: Aug. 20, 2009

(65) Prior Publication Data
US 2010/0046553 A1 Feb. 25, 2010

Related U.S. Application Data

(60) Provisional application No. 61/138,295, filed on Dec. 17, 2008, provisional application No. 61/105,202, filed on Oct. 14, 2008, provisional application No. 61/090,461, filed on Aug. 20, 2008.

(51) Int. Cl.
*H04W 4/00* (2009.01)
*G06F 7/04* (2006.01)
*H04M 1/66* (2006.01)

(52) U.S. Cl. .............................. 370/338; 455/411; 726/4

(58) Field of Classification Search .................. 713/161, 713/178, 184, 194, 171, 172, 180; 709/203, 709/219, 220, 221, 223, 224, 222, 228; 726/21, 726/7, 5; 455/410; 370/254, 395.53
See application file for complete search history.

(56) References Cited

U.S. PATENT DOCUMENTS

| 6,577,238 | B1 | 6/2003 | Whitesmith | |
|---|---|---|---|---|
| 7,508,794 | B2* | 3/2009 | Feather et al. | 370/331 |
| 7,958,211 | B2* | 6/2011 | Lam et al. | 709/222 |
| 2005/0015588 | A1 | 1/2005 | Lin et al. | |
| 2005/0050330 | A1 | 3/2005 | Agam et al. | |
| 2007/0037552 | A1* | 2/2007 | Lee et al. | 455/410 |
| 2007/0133591 | A1* | 6/2007 | Shatford | 370/457 |
| 2007/0250923 | A1 | 10/2007 | M'Raihi | |
| 2008/0060065 | A1* | 3/2008 | Wynn et al. | 726/5 |
| 2008/0065892 | A1* | 3/2008 | Bailey et al. | 713/171 |
| 2009/0313693 | A1* | 12/2009 | Rogers | 726/21 |
| 2010/0024017 | A1* | 1/2010 | Ashfield et al. | 726/7 |

FOREIGN PATENT DOCUMENTS
EP  1 775 673 A2  4/2007

OTHER PUBLICATIONS

International Search Report and Written Opinion mailed Nov. 27, 2009.
International Search Report and Written Opinion for PCT/US2011/026080 mailed Oct. 26, 2011, 10 pages.
Peterson, Ron et al., "Interacting With Sensor Network," Nov. 2002, pp. 105-110.

* cited by examiner

*Primary Examiner* — Hanh Nguyen

(74) *Attorney, Agent, or Firm* — Merchant & Gould P.C.

(57) ABSTRACT

A data packet generator periodically generates a data packet including a passcode comprising a plurality of characters. The data packet is sent to a server or a computing device for validation. If validated, the data packet is used, for example, to identify the location of a user or device. Additional systems and methods involving such a data packet generator are also disclosed.

23 Claims, 48 Drawing Sheets

DETERMINE CURRENT PASSCODE
DETERMINE ALERT CODE
DETERMINE ALERT CODE DIGIT
GENERATE AND DISPLAY CURRENT MANUAL ALERT PASSCODE
FIG. 27

CURRENT PASSCODE:

| 6 | 1 | 7 | 9 | 8 | 4 | 7 |
|---|---|---|---|---|---|---|
| 1 | 2 | 3 | 4 | 5 | 6 | 7 |

← DIGIT

ALERT CODE:

0

ALERT CODE DIGIT:

3

CURRENT MANUAL ALERT PASSCODE:

| 6 | 1 | 0 | 7 | 9 | 8 | 4 | 7 |
|---|---|---|---|---|---|---|---|
| 1 | 2 | 3 | 4 | 5 | 6 | 7 | 8 |

← DIGIT

FIG. 28

CURRENT PASSCODE:

| 6 | 1 | 7 | 9 | 8 | 4 | 7 |

ALERT DATA:

<ALERT CODE>
<TRIGGERING EVENT>
<TRIGGER TIME>
<NEIGHBOR PASSCODES>

MESSAGE:

<HEADER>6179847<ALERT CODE><TRIGGERING EVENT><TRIGGER TIME><NEIGHBOR PASSCODES>

FIG. 30

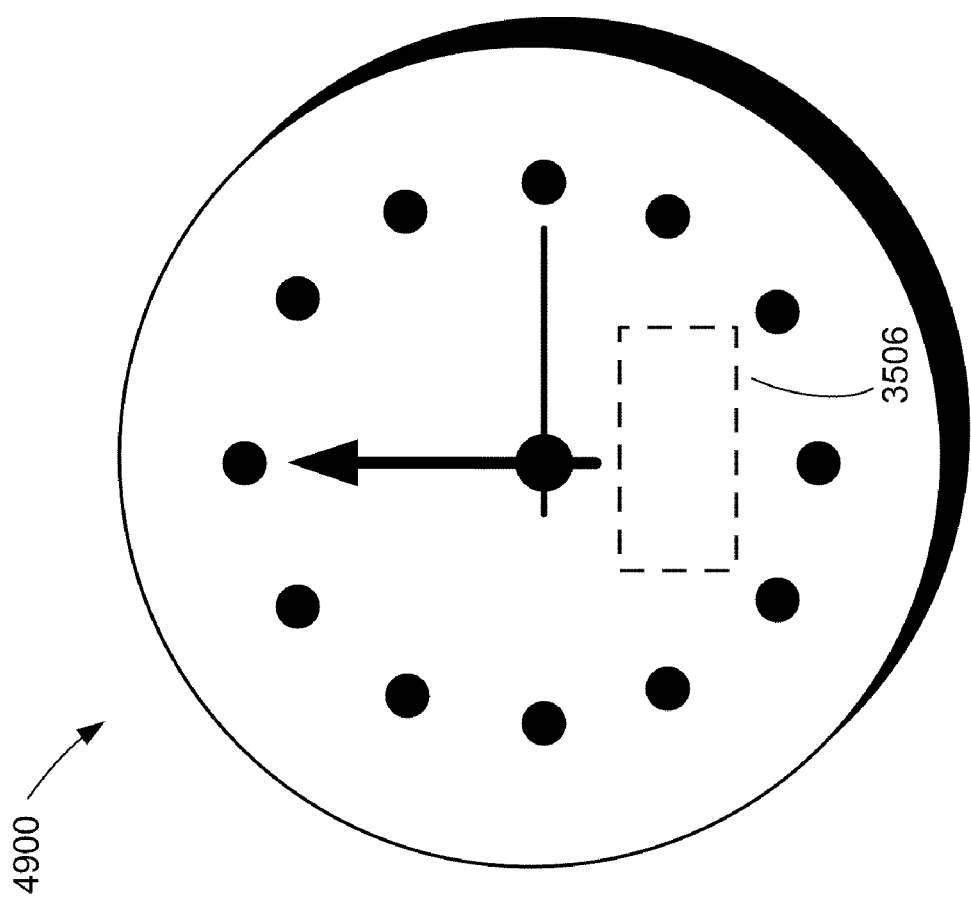

DATA PACKET GENERATOR FOR GENERATING PASSCODES

CROSS-REFERENCE TO RELATED APPLICATIONS

This application claims priority to U.S. Provisional Application Ser. No. 61/138,295 filed on Dec. 17, 2008, entitled PASSCODE GENERATOR AND AUTHENTICATION PROCESS; and to U.S. Provisional Application Ser. No. 61/105,202 filed on Oct. 14, 2008, entitled PASSCODE GENERATOR AND AUTHENTICATION PROCESS; and to U.S. Provisional Application Ser. No. 61/090,461 filed on Aug. 20, 2008, entitled PASSCODE GENERATOR AND AUTHENTICATION PROCESS, the disclosures of which are incorporated by reference herein in their entireties.

TECHNICAL FIELD

This application relates to an electronic device that generates a data packet, and more particularly to a data packet generator that generates unique codes periodically and associated systems and methods.

BACKGROUND

The two greatest expenses for most companies are human resources and real estate. Human resources involves the employment of a skilled workforce and includes related expenses such as salaries, retirement contributions, health care contributions, and the like. Real estate involves the buildings and other facilities in which those employees work, and includes expenses such as rent, utilities, and property taxes. In addition to these aspects of a company, information technology is a third aspect that is becoming more critical to most companies. Information technology includes the management of technology resources such as computers, telephones, and other electronic devices. In today's world, information technology is crucial to most businesses.

Traditionally, each of these aspects of a company has been able to work somewhat autonomously. Human resources and real estate needs did not change rapidly, and as needs changed, there was adequate time to consider the options and make decisions. Information technology was traditionally not a crucial part of most business.

Today's business environment is changing. Rapid changes are becoming the norm. Employees are increasingly mobile, with current technology allowing them to perform their work anywhere. The office is becoming a thing of the past as employees are increasingly working from temporary work stations, their homes, their cars, or out in the field. Enormous effort is required for the real estate department or other decision makers to understand the company's needs at any given time. Similarly, as employees move, the information technology department is challenged to allocate and distribute technology resources where they are needed. If the technology is not available when needed, employee productivity and efficiency suffers. Needs change from one day to another; but companies lack adequate tools to help them track, understand, and respond to these ever changing needs.

SUMMARY

In general terms, this disclosure is directed to a data packet generator. In one possible configuration and by non-limiting example, the data packet generator is a semi-transient electronic device that generates a data packet. In some embodiments the data packet includes at least one passcode that changes periodically.

One aspect is a data packet generator comprising: a processing device; memory storing data instructions, which when executed by the processor cause the processor to periodically generate a passcode, the passcode including a plurality of characters; an output device that outputs a data packet including a passcode; and an attachment device configured for semi-permanent attachment to an object.

Another aspect is a method of determining a location, the method comprising: receiving at a computing device a data packet from a data packet generator, the data packet including at least one passcode; determining with the computing device a location associated with the passcode; and identifying with the computing device the location in a computer-aided design drawing.

Yet another aspect is a method of communicating a passcode, the method comprising: generating with a data packet generator a passcode, the data packet generator including a processor device, memory, and a wireless communication device; and communicating using the wireless communication device a service set identifier, the service set identifier including the passcode.

A further aspect is a method of authenticating, the method comprising: receiving with a computing device a passcode generated at a first time by a data packet generator of a plurality of data packet generators; determining with the computing device whether the passcode is a valid passcode; determining with the computing device whether the passcode should have been generated by any of the plurality of data packet generators at the first time; and authenticating with the computing device the passcode if the passcode is a valid passcode and if the passcode should have been generated by any of the plurality of data packet generators at the first time.

BRIEF DESCRIPTION OF THE DRAWINGS

FIG. 27 is a flow chart of an example method of operating a data packet generator in a manual alert mode of the alert mode shown in FIG. 26.

FIG. 28 provides an example of the method shown in FIG. 27.

FIG. 30 is provides an example of the method shown in FIG. 29.

FIG. 49 is another example embodiment of a data packet generator in the form of a clock.

DETAILED DESCRIPTION

Figure 1:
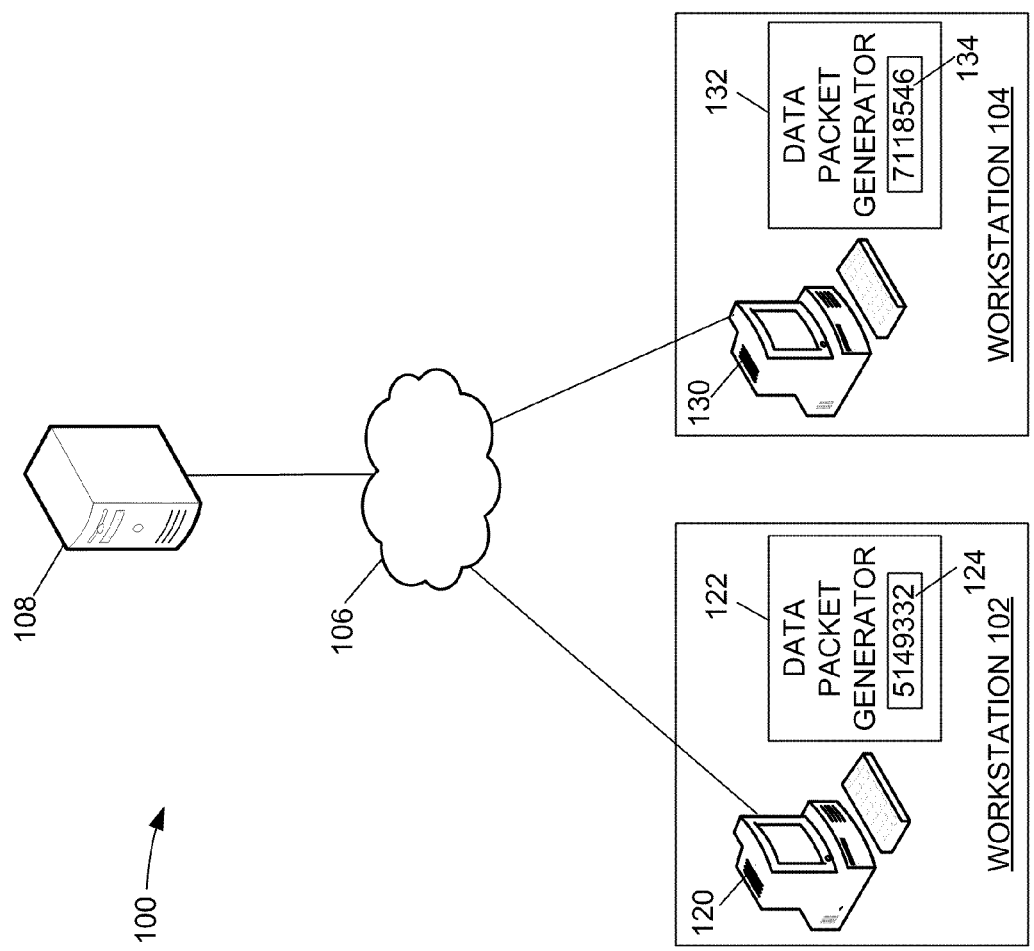
FIG. 1 is a schematic block diagram of an exemplary authentication system 100 according to the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is a schematic block diagram of an exemplary authentication system 100 according to the present disclosure. System 100 is an example of a location authentication system. System 100 includes workstation 102, workstation 104, communication network 106, server 108, computing device 120, data packet generator 122, computing device 130, and data packet generator 132. Data packet generators 122 and 132 operate, in some embodiments, to output a passcodes 124 and 134, respectively.

Workstations 102 and 104 are physical locations that are known by server 108. Often workstations 102 and 104 are physical locations where people work, such as an office, a cubicle, a conference room, a reception desk, or a security booth. Other embodiments include other physical locations, such as a particular location of a room or building, or a particular physical location in the outdoors, such as the physical location near a tree, park bench, or lake, or a particular location as identified by a global positioning system coordinate, or a latitude and longitude coordinate. In some embodiments, a workstation is any physical location where a data packet generator is located. As just one example, workstations 102 and 104 are sometimes referred to herein as being a physical location within a building, such as an office, desk, room, or cubicle.

Within workstations 102 and 104 are computing devices 120 and 130, respectively. An example of a computing device 120 or 130 is a personal computer. Other examples of computing devices include a handheld computer, a server, a mobile device, a cell phone, a smart phone, a personal digital assistant, or any device having a processing device, memory, and a communication system suitable for data communication across network 106. An example computing device 120 is described in more detail with reference to FIG. 9.

In some embodiments, Data packet generators 122 and 132 are devices that generate a data packet, such as passcodes 124 and 134. Data packet generators 122 and 132 are alternatively referred to as code generators in some embodiments, such as when a data packet includes a passcode. Such codes generated by data packet generators 122 and 132 are typically formed of a quantity of characters. The quantity of characters is typically in a range from 1 to 25, and preferably in a range from 5 to 10 characters. For example, in some embodiments the passcode includes 7 characters. In general, a larger quantity of characters results in a larger quantity of unique passcode combinations that are available. On the other hand, long passcodes are sometimes less desirable, such as when a passcode is to be entered manually. In some embodiments a single character of a passcode is provided at a time, with subsequent digits being provided one-by-one (or two-by-two, etc.) until a single data packet generator has been uniquely identified.

The characters from which the passcodes 124 and 134 are composed are typically selected from alphanumeric characters so that they are easily recognizable to a user, although other characters are used in other embodiments. For example, in the English language the alphabet includes 26 letters (A through Z) and 10 numbers (0 through 9). Thus, some embodiments include 36 possible characters made up of the combination of 26 letters and 10 numbers, sometimes referred to as base 36. In some embodiments the letters I, O, and Q and the numbers 0 and 1 are not used because of the similarities in the letters and numbers. This reduces the chance that a user will misidentify a character of the passcode. Thus, some embodiments include 31 possible characters composed of 23 letters and 8 numbers, sometimes referred to as base 31. In yet other embodiments, only numbers are used. Thus, some embodiments include 10 characters, sometimes referred to as base 10. Other embodiments include other alphanumeric characters, such as those of other languages, or other character systems (e.g., Braille).

In some embodiments, data packet generator 122 and 132 output more than one passcode at a given time. For example, some data packet generators display a previous passcode, a current passcode, and a next passcode. Other embodiments generate two or more passcodes at any given time. In some embodiments all passcodes are valid while being output by a data packet generator. This is useful, for example, if multiple passcodes are needed, such as for method 1300 (described below with reference to FIG. 13).

In some embodiments, data packet generators 122 and 132 generate one or more passcodes that are used to communicate a unique identifier for subsequent authentication. The identifier itself takes up no space (because numbers and time require no space in and of themselves). The only space that is consumed is that of the data packet generator, which acts to generate and output the identifier. When the data packet generator is implemented by software (as some embodiments are) the space utilization of the system approaches zero, absent the space consumed by the devices that are implementing the data packet generator and performing processing and communication steps involving the data packet generator and/or passcode.

Communication network 106 is a data communication network that facilitates data communication between computing device 120 or 130 and server 108, and/or between data packet generators 122 or 132 and server 108. An example of network 106 is the Internet. Other examples of network 106 include an intranet, extranet, local-area network (LAN), wireless network (such as conforming to the 802.11 protocols), cellular network, telephone network, and other known data communication networks. In some embodiments two or more communication networks are used.

Server 108 is a computing device that stores data associated with data packet generators 122 and 132, and in some embodiments operates to validate passcodes generated by data packet generators 122 and 132. Server 108 is also configured to communicate with computing devices 120 and 130 across network 106. Although server 108 is illustrated as a single device, in some embodiments server 108 includes multiple servers 108, such as a computer cluster.

Server 108 typically includes a database. In some embodiments, the database contains data relating to data packet generators 122 and 132, such as the location of the data packet generators 122 and 132, as well as passcode information that permits sever 108 to determine what passcode will be generated by the respective data packet generator 122 or 132 at a particular time. As discussed herein, the passcode information includes in some embodiments a table of all passcodes for each data packet generator, while in other embodiments the passcode information includes a mathematical formula and seed information necessary to compute the passcodes.

Some embodiments include more than one server 108. For example, one alternative embodiment includes two servers. The first server is a local server operated by a single company or location, and the other server is a remote server that may be overseeing multiple companies or locations. The remote server is configured to recognize passcodes for some or all data packet generators in a particular company or location. In some embodiments, the remote server provides seed information allowing the local server to perform at least some of the functions of the remote server for a period of time. In some of these embodiments, the remote server communicates relevant passcode information to the local server, which then operates to validate passcodes from data packet generators over a period of time. In some embodiments, the remote server provides only a limited number of passcodes to allow the local server to operate for a limited period of time (e.g., 90 days) without renewing with the remote server. After the period of time has elapsed (or shortly before), the local server receives another set of passcodes from the remote server to continue operation. Other embodiments include more than two servers. In further embodiments, multiple servers are used to distribute workload or for redundancy.

One possible example of a local server is a jumpnode server, such as distributed by Jumpnode Systems LLC located in Minneapolis, Minn., US, that allows data to be shared outside of the local area network, such as with a remote server. In this example, the jumpnode server permits communication to the remote server, but can be configured to prohibit communication into the local area network. In some embodiments, the jumpnode server sends communications including data packets or data from data packet generators to a remote server or other computing device.

In some embodiments system 100 operates as a location authentication system to authenticate the location of a user, computing device, or other device. An example authentication process will now be described with reference to FIG. 1. In this example, system 100 operates to determine whether a user is working at workstation 102, or if the user is at workstation 104, or whether the user may not be at either workstation 102 or workstation 104. As an example, assume a user is working at workstation 102 and is using computing device 120.

An example authentication process begins with data packet generator 122 displaying passcode 124 and data packet generator 132 displaying passcode 134. The user at workstation 102 is prompted by computing device 120 to enter a passcode. Since the user is located in workstation 102, passcode 124 is visible to the user on the display of the data packet generator 122. As a result, the user reads passcode 124 and enters passcode 124 into computing device 120.

Computing device 120 receives the passcode, and transmits the passcode across network 106 to server 108. Server 108 receives the passcode. Server 108 then determines whether passcode 124 should have been displayed by any data packet generator 122 or 132, and if so, which data packet generator it was displayed by. In this case, server 108 identifies the passcode as being associated with workstation 102. In this way, the location of the user is authenticated as being at workstation 102.

In another possible embodiment, computing device 120 and/or server 108 operate to monitor a transition of a passcode from a first passcode to a next passcode. Validation occurs only if the transition occurs between two valid passcodes at an expected time. For example, computing device 120 is programmed to monitor the transition to confirm that a valid transition occurs at the expected time. Alternatively, computing device 120 is programmed to monitor a transition and to report the passcode to server 108 within a predetermined period of time, such as within one to five seconds. Other embodiments allow more or less time (e.g., milliseconds or tens of seconds). Such validation can be used to reduce or prevent the chance that a person or device would transferring a code from a data packet generator to a remote location and then falsely report that code as an identification of the present location. Such validation processes that monitor a passcode transition can be referred to as changing-of-the-guards validation processes. Further, some embodiments monitor and validate only if multiple passcode transitions occur at the expected times.

In some embodiments, authentication system 100 operates as a location authentication system. The location authentication system 100 operates to authenticate a location of a user or device. For example, in large companies employees are frequently moved between various office spaces. It is sometimes desirable to identify the location of a particular employee, such as to know what workstation that the employee is currently working at. To do so, a login screen is presented to the employee on computing device 120 each time that the employee logs into the computer system and/or periodically while the employee continues to access the network. In some embodiments, the login screen requests the username and password (e.g., see user interface 1400, shown in FIG. 14). The login screen also requests that the employee enter the passcode shown on the data packet generator associated with the workstation (e.g., workstation 102). The username and password are typically used to authenticate who the employee is, and the passcode is used to identify where the employee is. Once the location of the employee is known, the location data may be stored for subsequent use. For example, an employee directory is updated to accurately reflect the location of the employee. Some embodiments request one or more of the username, password, and passcode. In some embodiments the username is not required; such as if it was previously saved or is otherwise already known by the computer system or server.

As another exemplary embodiment, authentication system 100 is used in some embodiments to control access to protected resources based upon the location of the user. For example, a problem with wireless networks is that the signal from a wireless router often extends beyond the physical borders of a building. Authentication system 100 is used in some embodiments to require that only those present within the building are granted access to the wireless network or to particular protected resources. This is accomplished, for example, by requiring a user to enter a passcode from a data packet generator as part of a network login process or to retain network access that has previously been granted. The passcode is then evaluated either to identify the data packet generator that generated the passcode or deny the access request. Once the data packet generator becomes known, the location of the corresponding user is identified. If the location of the user is determined to be within the boundaries of the building (or satisfies other criteria, such as on a particular floor, in a particular group—e.g., the accounting department, etc.), the user is permitted to access the wireless network or protected resource. In some embodiments, authentication system 100 requires a user to be at a particular workstation (rather than merely within a group of workstations) in order to access the network or particular protected resources on the network. Some embodiments are used to control access to a wireless network within a home or residence. These examples are provided as just some of the many possible embodiments. Many other embodiments are discussed below.

Figure 50:
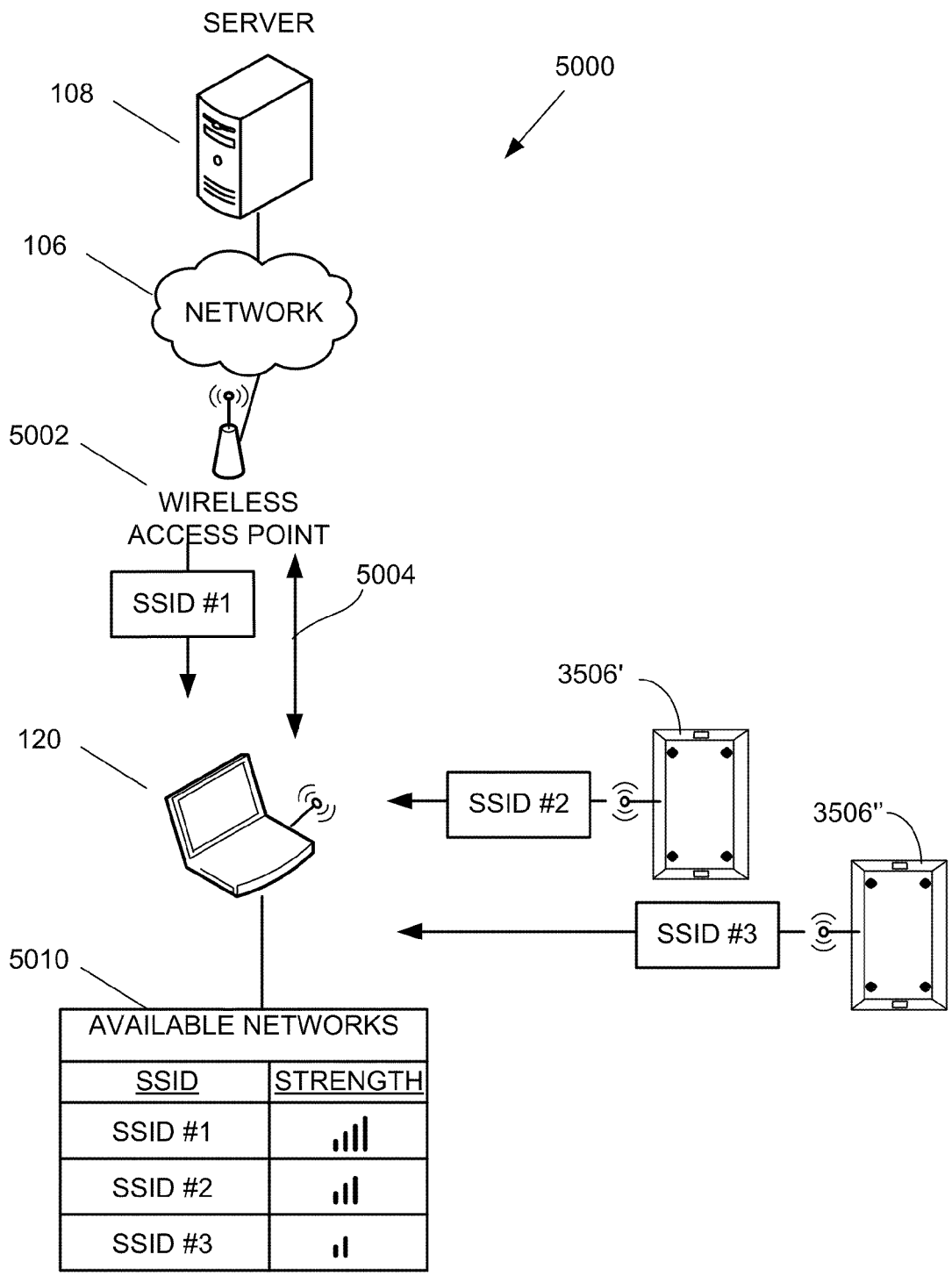
FIG. 50 is a schematic block diagram of a system including a data packet generator.

An example of a wireless access point of a wireless network is shown in FIG. 50, herein.

Examples of protected resources include data stored on a computing device and functions performed by a computing device. In some embodiments, protected resources are local to a data packet generator, local to a computing device, or remote, such as operating on a server. In some embodiments protected resources are provided by an application service provider. Protected resources are sometimes part of a Software as a Service (SaaS) application, or an application commonly referred to as a cloud computing. Other examples of protected resources include room or building control systems, such as room electricity, lighting, a room scheduling system, and voice/data access.

Figure 2:
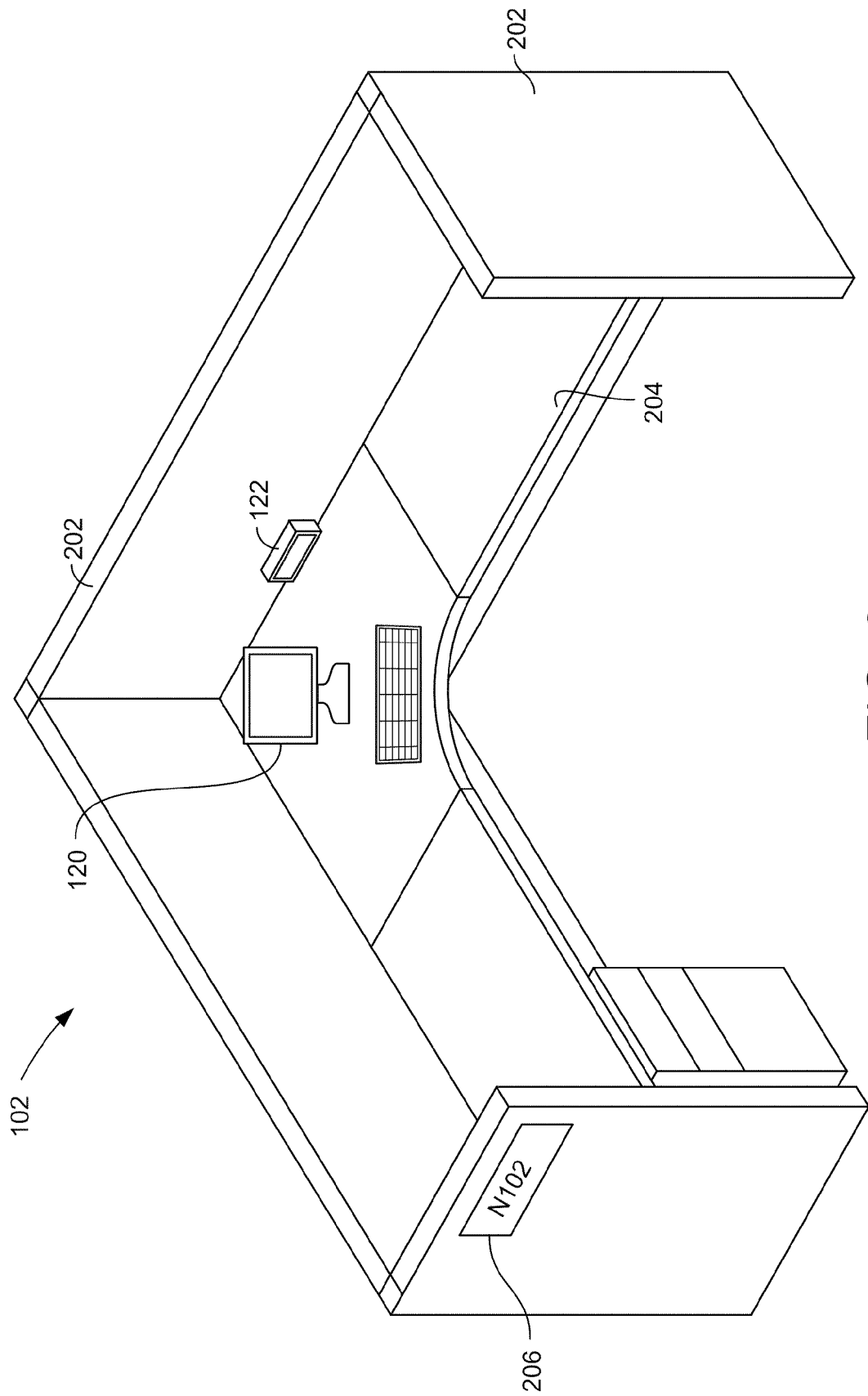
FIG. 2 is a schematic perspective view of an exemplary workstation of the authentication system shown in FIG. 1.

FIG. 2 is a schematic perspective view of an exemplary workstation 102 including computing device 120 and data packet generator 122. Workstation 102 also includes walls 202 and desktop 204. Workstation 102 is, for example, a cubicle located within a building. The cubicle is typically arranged in a particular floor of the building, in a particular room or location of the building. In some embodiments, the workstation 102 is identified by a workstation identifier 206 (e.g., N102).

Some embodiments of workstation 102 include walls 202 that define the outer boundary of the workstation. Workstation 102 also typically includes a desktop 204 that provides a solid work surface. In some embodiments desktop 204 is connected to and supported by walls 202. In other embodiments, desktop 204 is a desk that is not connected to walls 202 but is within the outer boundary defined by walls 202. At least part of computing device 120 (e.g., a display) is typically supported by desktop 204.

In this example, data packet generator 122 is attached or associated with workstation 102. The attachment is permanent in some embodiments, while it is somewhat permanent in other embodiments. For example, data packet generator 122 is attached to desktop 204 in some embodiments in a manner that would require disassembly of the desk or that would require specialized tools in order to disassociate the data packet generator from desktop 204. In other embodiments, data packet generator 122 is attached to walls 202. In other embodiments, data packet generator 122 is attached to another part of workstation 102 other than desktop 204 or walls 202 (e.g., another structure within workstation 102). In other embodiments, data packet generator 122 is attached to something near workstation 102 (e.g., a floor, a ceiling, an architectural wall). Some specific examples are shown herein, such as in FIG. 47-48. In yet other embodiments, data packet generator 122 is contained by or integrated with a component of workstation 102 (e.g., a tile or the worksurface).

As shown in FIG. 2, data packet generator 122 is preferably located near to computing device 120, so that a user in workstation 102 that is using computing device 120 can easily identify a passcode generated by data packet generator 122.

In some embodiments, two or more data packet generators are associated with each location. This provides redundancy, for example, if a data packet generator were to malfunction. Alternatively, a second or additional data packet generator may be used if a code generated by a first data packet generator is not unique at that time (such as for use in method 1300 described with reference to FIG. 13). In such an event, the second data packet generator is used to provide a second passcode to uniquely identify the location or data packet generators.

Figure 3:
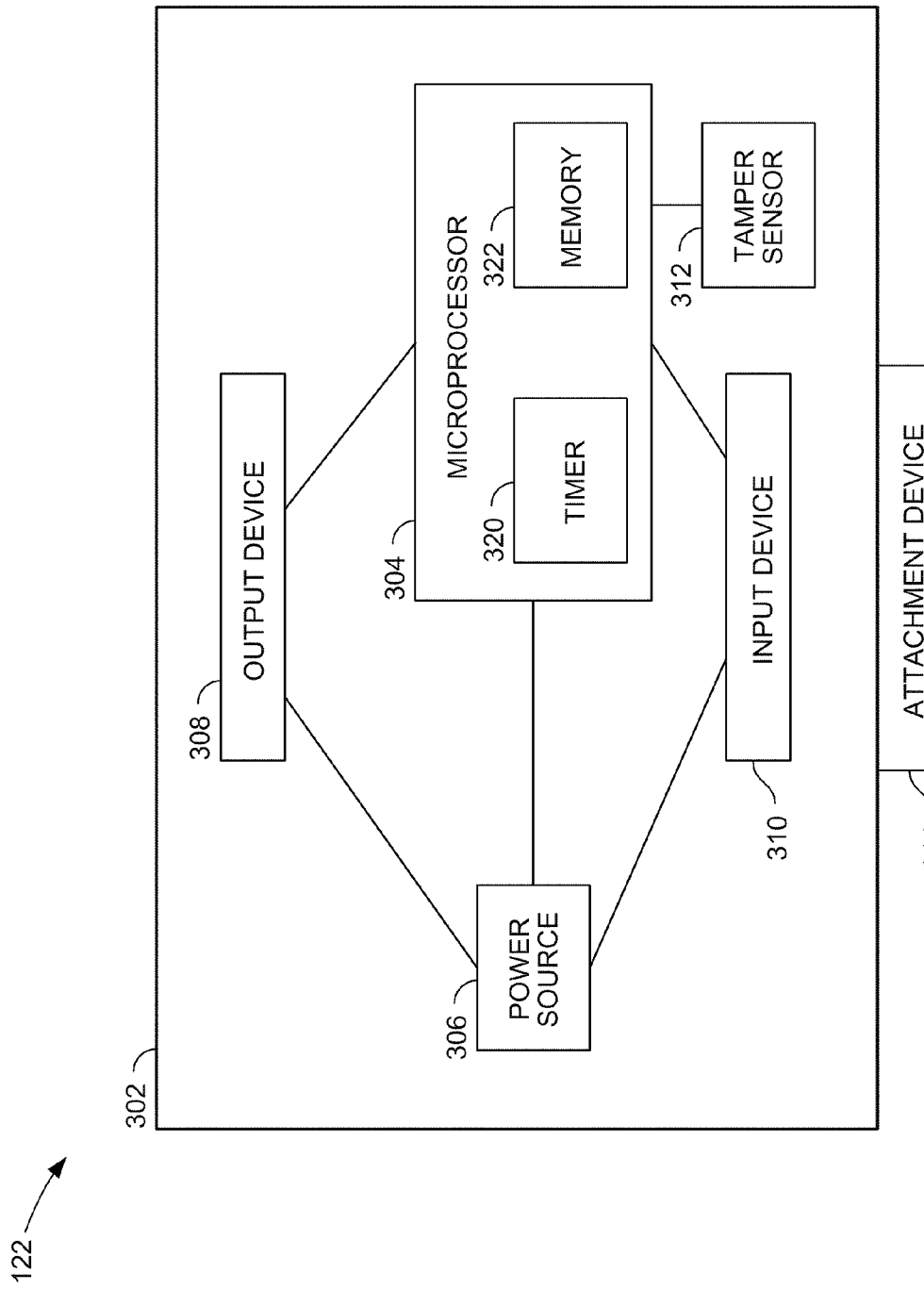
FIG. 3 is a schematic block diagram of an exemplary data packet generator of the authentication system shown in FIG. 1.

FIG. 3 is a schematic block diagram of an exemplary data packet generator 122. In some embodiments, data packet generator 122 includes housing 302, microprocessor 304, power source 306, output device 308, input device 310, tamper sensor 312, and attachment device 314. Microprocessor 304 includes timer 320 and memory 322.

Housing 302 is a protective enclosure of data packet generator 122. In some embodiments housing 302 is a metal enclosure, but in other embodiments housing 302 is made of other materials such as plastic. Housing 302 is sealed in some embodiments, such as to be water resistant or water proof. Further, some embodiments of housing 302 are designed with seals that are tamper resistant. In some embodiments temper-evident seals are provided across housing joints. An example of a tamper-evident seal is a label adhered with an adhesive across a housing joint. If the joint is opened, the label will tear. A warning against opening housing 302 is printed on the tamper-evident seal in some embodiments. In this way the label acts to reveal if someone has attempted to open housing 302.

Microprocessor 304 is a processing device that is typically enclosed within housing 302. Examples of a suitable microprocessor include a central processing unit ("CPU"), microcontroller, programmable logic device, field programmable gate array, digital signal processing ("DSP") device, and other types of microprocessors. Microprocessor 304 may be of any general variety such as reduced instruction set computing (RISC) device, complex instruction set computing device ("CISC"), or specially designed processing device such as an application-specific integrated circuit ("ASIC") device.

In some embodiments microprocessor 304 includes timer 320 and memory 322. In other embodiments, timer 320 and memory 322 may be separate from, or in addition to microprocessor 304. Timer 320 is used by microprocessor 304 to measure the passage of time. For example, in some embodiments a new passcode is generated by data packet generator 122 periodically. Timer 320 is used to measure the period of time. After the period of time has elapsed, a new passcode is generated and output using output device 308. The period of time is typically in a range from about 1 second to about 5 minutes, and preferably from about 30 seconds to about 2 minutes when manual passcode entry is involved. In some embodiments the period of time is short to provide rapid passcode changes, such as eight passcode changes per second. Rapid passcode changes are more typically used when the output is not dependent on manual entry of the passcode. In other embodiments, the period of time is long to provide infrequent passcode changes, such as in a range from about 24 hours to about three months.

Memory 322 is used by microprocessor to store data. For example, a passcode is stored in memory 322 in some embodiments. In other embodiments, memory 322 stores a formula that is used to generate a passcode. Memory 322 also stores an identifier (such as a serial number) of data packet generator 122 in some embodiments. Software or other program code may also be stored in memory 322 in some embodiments that define logical operations of data packet generator 122.

Data packet generator 122 typically includes power source 306 within housing 302. Power source 306 supplies power to the electronic devices of data packet generator 122, such as microprocessor 304, output device 308, input device 310, and in some embodiments tamper sensor 312. An example of power source 306 is a battery. In other embodiments, power source 306 is a power supply circuit that receives power from a source external to housing 302, such as a wall outlet. In other embodiments, power source 306 is a power jack or terminal that is connected to housing 302 and is configured to receive power from an external source, such as from a power adapter. When power source 306 is a battery, it is sometimes helpful to have a secondary power source in place (another battery) so that changing the primary battery does not cause a loss of electric energy to the data packet generator 122. In some embodiments power is received from an Ethernet cable, such as from a Power over Ethernet (PoE) system.

Output device 308 generates one or more outputs. One of the outputs is typically passcode 124 (shown in FIG. 1). Examples of output device 308 include a visual display device, and audible output device, a vibratory or sensory output device, a wireless signal output device (e.g., wireless communication device 3622, shown in FIG. 36), a wired signal output device (e.g., a network interface 3610, shown in FIG. 36), and other output devices. Examples of visual display devices include a light-emitting diode (LED) display, a liquid crystal display (LCD), a cathode ray tube (CRT), a vacuum fluorescent display (VFD), a sheet of electronic paper, and other display devices. In some embodiments, visual display devices include a backlight to assist a user in viewing the visual display device in poorly lit environments. Examples of audible output devices include a speaker, headset, buzzer, alarm, and other output devices. In some embodiments, an audible output device provides an alert to a user. In other embodiments, an audible output device provides information (such as a passcode) sufficient for use by a user that is vision impaired. Examples of vibratory or sensory output devices include a vibrator and a Braille terminal. In some embodiments, output device 308 is or includes a data communication device. The data communication device is used by data packet generator 122 to communicate with another device, such as computing device 120, server 108, another device connected to network 106, or another device. Examples of data communication devices include a network communication device, a wireless communication device (e.g., wireless communication device 3622, shown in FIG. 36), a modem, a cellular communication device, a radio-frequency transmitter, or other communication devices. In some embodiments a radio frequency identification (RFID) tag acts as a communication device (e.g., to communicate the serial number of the data packet generator). In some embodiments, data packet generator 122 includes two or more output devices 308.

In some embodiments, output device 308 is a visual display device, such as an LCD. Data packet generator 122 operates, in some embodiments, to generate a passcode 124 using microprocessor 304. The passcode 124 is then displayed by output device 308. After a period of time, the passcode 124 is typically changed to a new passcode 124. The new passcode 124 is then displayed by output device 308 instead of the previous passcode.

Other output devices 308 are used for other purposes in some embodiments, such as to provide audible feedback when an input device 310 is activated (e.g., generate a sound when a button is pressed), or to provide an alarm if tampering is detected by tamper sensor 312.

Input devices 310 operate to receive one or more inputs. Some embodiments of data packet generator 122 do not include an input device 310 because no input is required. Other embodiments of data packet generator 122 do include one or more input devices 310. Examples of input devices include a button, a switch, a microphone, a mouse, a keyboard, a keypad, a magnetic sensor, a radio-frequency receiver, and other input devices. Some output devices 308 also operate as an input device 310. Examples of devices that act as both input and output devices include a touch screen display and at least some data communication devices such as a USB port.

An example of a use for input device 310 is as a power saving feature. For example, in some embodiments input device 310 is a depressable button arranged on a face of data packet generator 122. When input device 310 is pressed, the current passcode (e.g., 124, shown in FIG. 1) is displayed for a period of time by output device 308. The rest of the time, output device 308 is powered off, or in a lower power state. As a result, considerable energy savings is realized.

Another example of a use for input device 310 is for syncing data packet generator 122 with another device, such as server 108 (shown in FIG. 1). In some embodiments it is desirable to have timer 320 synced with a timer of server 108. To do so, input device 310 may include a data communication device, such as to communicate with server 108 across network 106. One or more messages may be sent between data packet generator 122 and server 108 to ensure that data packet generator 122 and server 108 are in sync. Some embodiments do not require synchronizing between data packet generator 122 and server 108. Other embodiments require only a single syncing operation during manufacturing or initial setup, and do not require further syncing thereafter.

In an alternative embodiment, input device 310 is a data communication port through which it is connected with computing device 120. The data communication port allows computing device 120 to communicate directly with data packet generator 122. If desired, server 108 is also configured to communicate with data packet generator 122 through computing device 120 in some embodiments.

In some embodiments, data packet generators 122 and 132 communicate directly with server 108 across communication network 106 or another communication network. For example, as discussed in more detail herein, some embodiments of data packet generators 122 and 132 are directly connected to the network 106, such as through an Ethernet cable. Other embodiments include a wireless communication system, and are configured to utilize a wireless access point to communicate across network 106.

Some embodiments of data packet generator 122 include a tamper sensor 312. An example of tamper sensor 312 is a motion sensor, such as an accelerometer. If the motion sensor detects motion, data packet generator 122 may be programmed to take appropriate action. For example, data packet generator 122 may sound an alarm. The alarm may be an audible or visible warning that movement has been detected. The alarm may alternatively be a message sent across a communication network (e.g. network 106). For example, a message may be sent to server 108 or elsewhere, such as to a security booth. In other embodiments, data packet generator acts to generate a code or series of codes that indicate to the server 108 that tampering has occurred.

In some embodiments tamper sensor 312 includes a Global Positioning System or other location identifier. In such cases, the tamper sensor 312 can be used as part of a larger system capable of monitoring the location of the data packet generator 122, and to identify movement of the data packet generator.

Data packet generator 122 typically includes attachment device 314 that is configured for connecting housing 302 with another structure. One example of an attachment device 314 is a fastener. Fasteners include screws, nails, adhesive, rivets, bolts and nuts, and a wide variety of other known fasteners. In some embodiments, fasteners are used that are not easily removable. For example, in some embodiments screws include one-way heads that are designed to be easily inserted but resist removal. In other embodiments, screws include less common head configurations (as opposed to the most common slotted and Phillips configurations) or non-standard shapes or sizes. Examples of less common head configurations include Torx and Robertson head configurations. In addition to (or in place of) fasteners, some embodiments of attachment device 314 include brackets, pins, keyed slots or protrusions, or other features to aid in attaching housing 302 with another structure. In some embodiments the housing 302 is itself detachable from the attachment device 314 and interchangeable with other attachment devices 314. For example, it may be desirable for data packet generator 122 to be compatible with various worksurface thicknesses. An appropriately sized attachment device may then be selected from various differently sized attachment devices to find an attachment device that most closely matches the thickness of the worksurface. Similarly, different shaped attachment devices are used in some embodiments.

Figure 4:
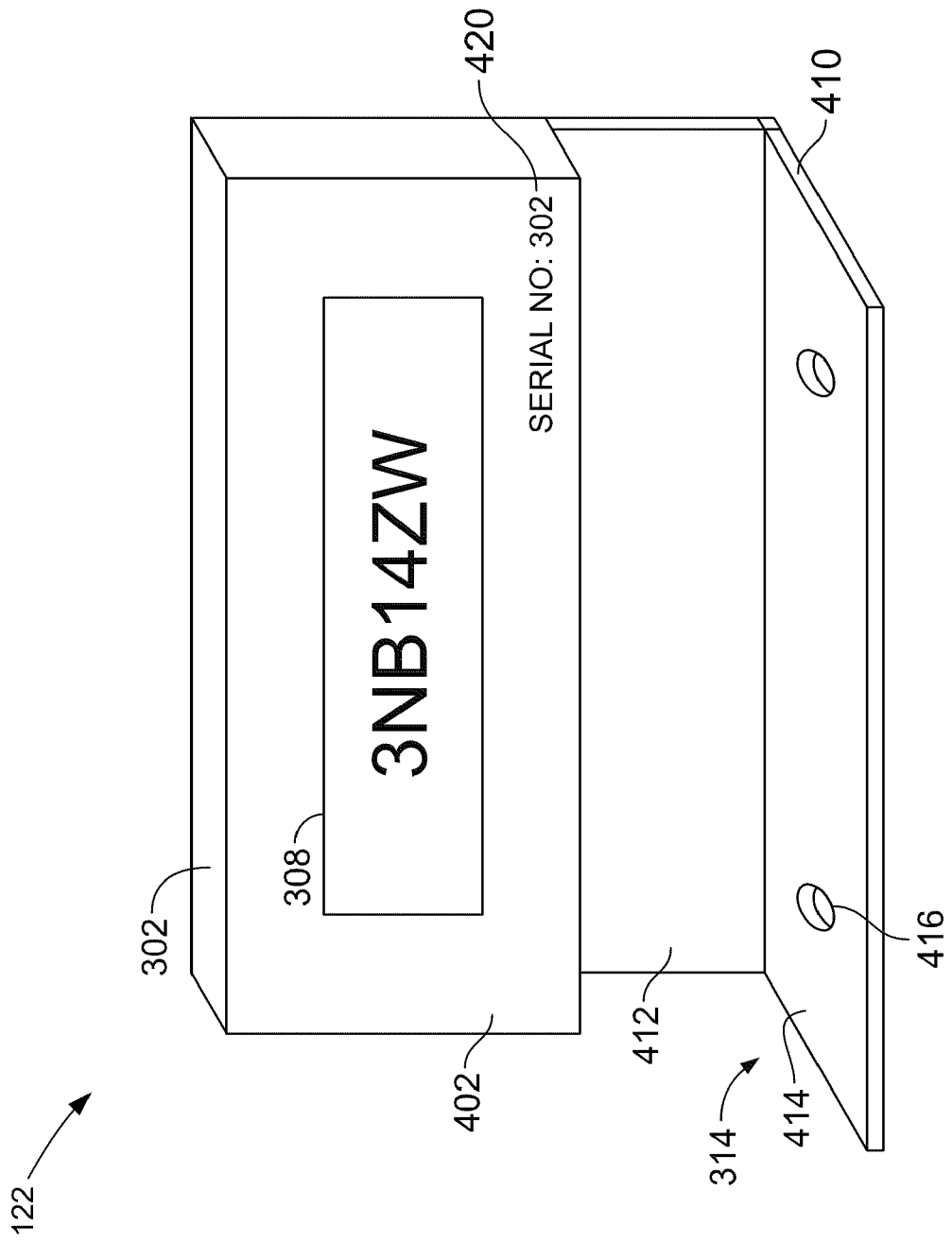
FIG. 4 is a schematic perspective view of the data packet generator shown in FIG. 3.

FIG. 4 is a schematic perspective view of an exemplary data packet generator 122. In this embodiment, data packet generator 122 includes housing 302, output device 308, and attachment device 314. Housing 302 includes face 402. Attachment device 314 includes angle bracket 410 having a rear portion 412, a bottom portion 414, and fastener holes 416.

In this embodiment, output device 308 is a digital display, such as an LCD display. Output device 308 is arranged so that it is visible at the face 402 of housing 302. In some embodiments housing 302 includes a sheet of transparent material, such as glass, across output device 308. In other embodiments output device 308 is connected in front of (or flush with) face 402 of housing 302.

Data packet generator 122 is configured, in some embodiments, to be connected with a structure, such as a desktop as illustrated in FIG. 2. Attachment device 314 is provided for this purpose, which includes angle bracket 410. Angle bracket 410 includes a rear portion 412 that extends downward from housing 302. Rear portion 412 typically extends slightly further than the thickness of desktop 204. Bottom portion 414 is connected to rear portion 412 at a joint or bend. Bottom portion 414 is configured to be placed against a bottom surface of a desktop, and includes fastener holes 416 in some embodiments.

To connect data packet generator 122 to a desktop 204, angle bracket 410 is arranged so that bottom portion 414 is against and generally parallel with a bottom surface of the desktop 204. In addition, rear portion 412 is arranged so that it is behind a rear side of the desktop 204. When in this position, data packet generator 122 is arranged above a top surface of the desktop 204, such as shown in FIG. 2. A fastener (not shown in FIG. 4) is then used to securely connect data packet generator 122 to the bottom surface of the desktop 204.

Figure 5:
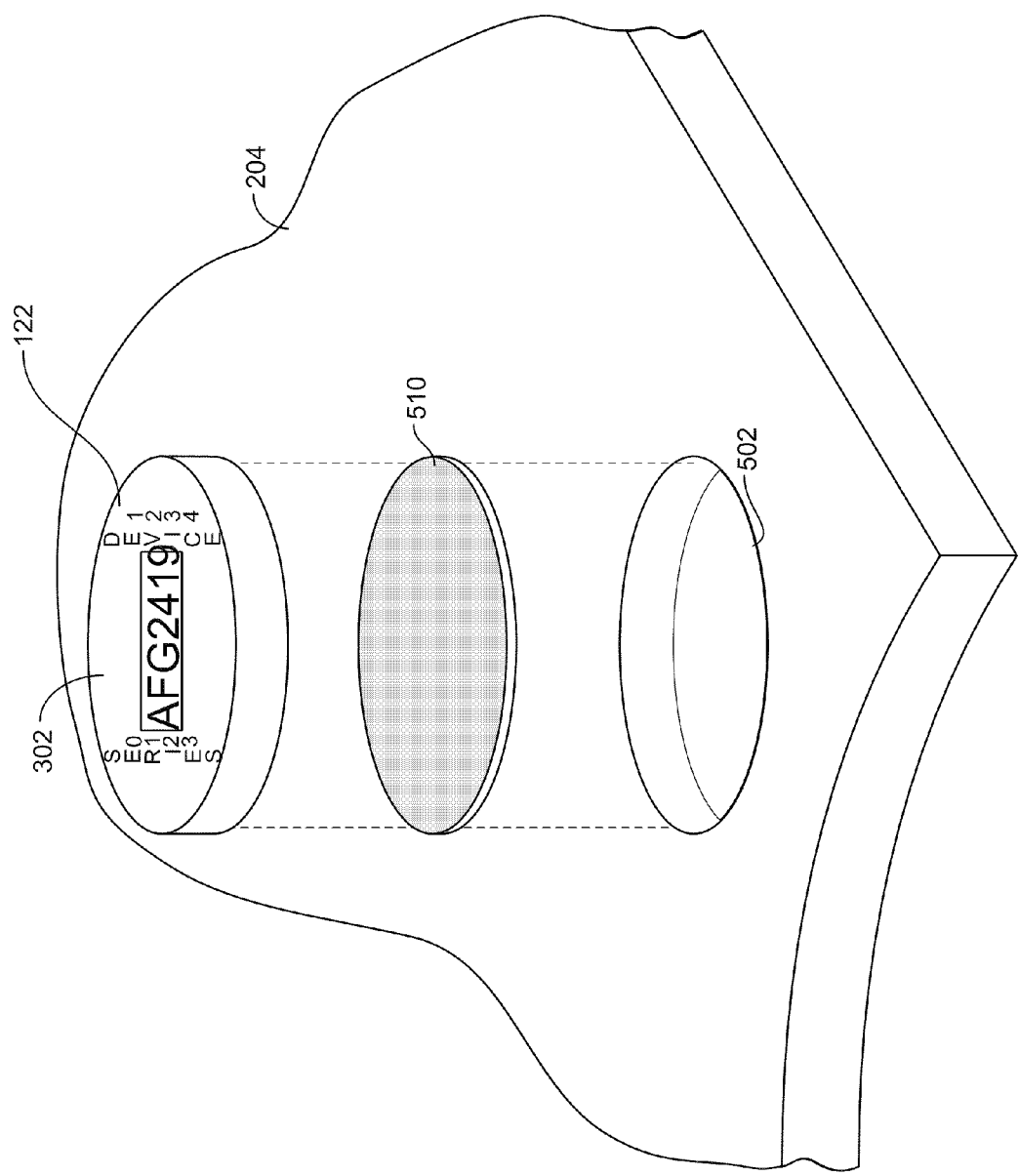
FIG. 5 is a schematic perspective view of another exemplary data packet generator according to the present disclosure.

The arrangement and configuration of attachment device 314 is only one of many possible embodiments of attachment device 314. Other attachment devices 314 are used in other embodiments to match different desktop, wall, or workstation configurations. For example, another possible embodiment is illustrated in FIG. 5. In some embodiments the attachment device is designed to fit between the back of a desktop and a partition wall without requiring the desktop to be dismantled from it supports.

Data packet generator 122 typically includes an identifier 420, such as a serial number or other identifier. In some embodiments the identifier 420 is printed on housing 302. In other embodiments identifier 420 is stored in memory of data packet generator 122. Yet another possible embodiment includes an RFID tag that is configured to transmit identifier 420 to an external RFID tag reader.

FIG. 5 is a schematic perspective view of another example data packet generator 122 and desktop 204. In this example, data packet generator 122 includes housing 302 and adhesive patch 510. Desktop 204 includes a recessed region 502.

In this embodiment, data packet generator 122 is configured for insertion into recessed region 502 formed in desktop 204. In this embodiment data packet generator 122 does not include an angle bracket (e.g., angle bracket 410 shown in FIG. 4). Rather, data packet generator 122 is configured for insertion into recessed region 502 of desktop 204. Recessed region 502 has an outer periphery that is slightly larger than the outer periphery of housing 302 and typically has a depth about equal to the thickness of data packet generator 122.

An adhesive patch 510 is applied, in some embodiments, to a bottom surface of data packet generator 122. An example of an adhesive patch is a layer of material having a layer of adhesive on either side. Peel-away protective layers are used to temporarily protect and seal the adhesive layers until ready for installation, in some embodiments. After recessed region 502 is formed, the data packet generator 122 and adhesive patch 510 are inserted into recessed region 502. The bottom surface of adhesive patch 510 adheres to the bottom of recessed region 502. Data packet generator 122 is preferably positioned so that face 402 of data packet generator 122 is generally flush with the top surface of desktop 204. In some embodiments another layer is applied over the data packet generator 122, such as one or more layers of epoxy. In such embodiments, adhesive patch 510 may not be necessary, as the epoxy will supply adequate adhesion. Other embodiments include other fasteners.

Alternatively, data packet generator 122 is arranged slightly below the top surface of desktop 204 to leave room for a transparent face plate or other cover to be placed above data packet generator 122, and flush with the top surface of desktop 204.

Figure 6:
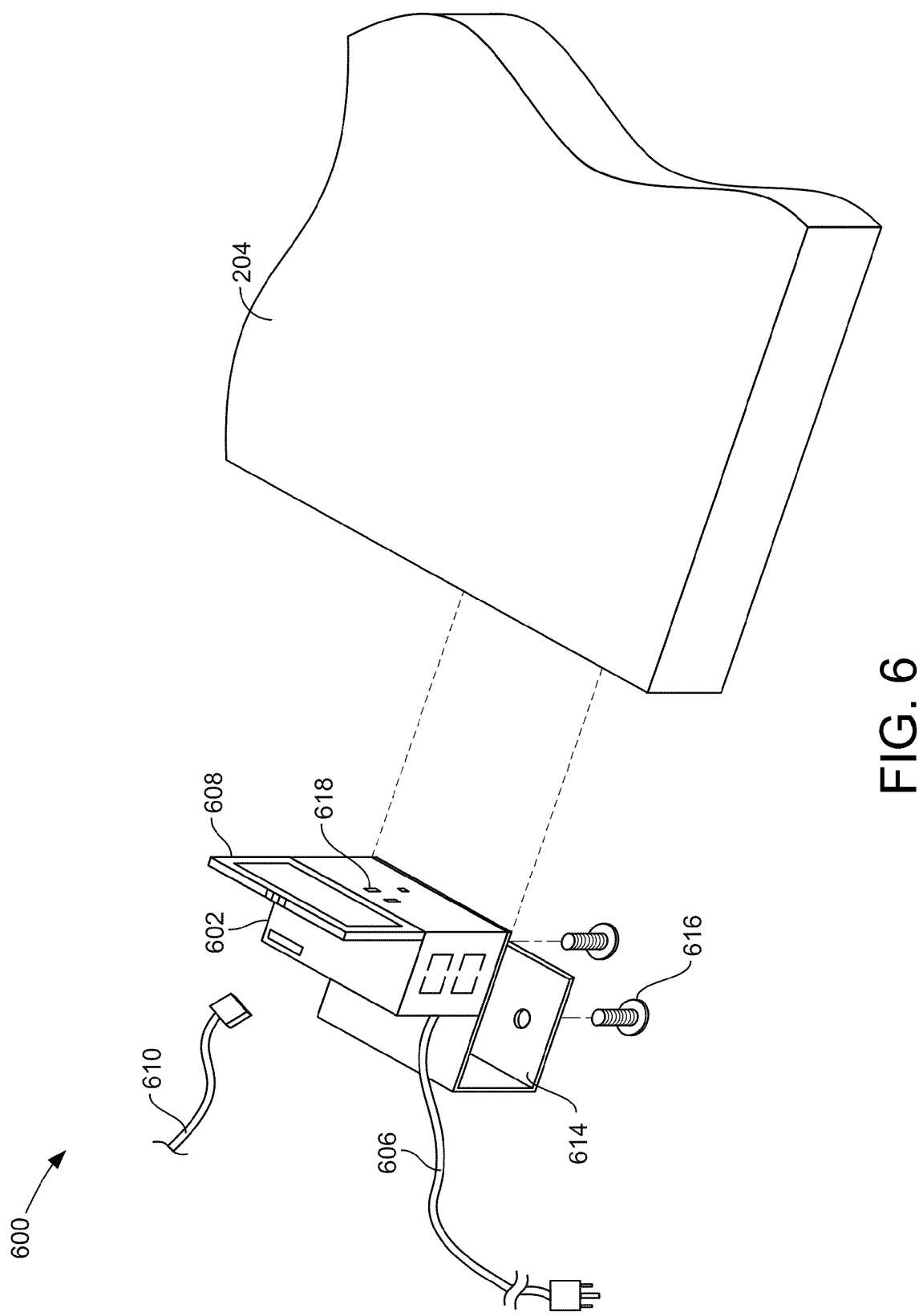
FIG. 6 is a schematic perspective view of another exemplary data packet generator according to the present disclosure.

FIG. 6 is a schematic perspective view of another exemplary embodiment of a data packet generator 600 configured for attachment to a desktop 204. In some embodiments, data packet generator 600 is integrated with other devices. For example, data packet generator 600 includes an integrated power outlet 618. In this example, data packet generator 600 includes housing 602, power source 606, output device 608, input device 610, attachment device 614, fasteners 616, and power outlet 618. In some other embodiments, data packet generator 600 is integrated with other devices such as a pencil holder, digital image picture display, or other accessory, such as the example hoteling hub 4602 shown in FIG. 46.

In this example, data packet generator 600 includes housing 602. In some embodiments, most components of data packet generator 600 are located within housing 602, but some components, such as output device 608, attachment device 614, and portions of input device 610 and power source 606 are located external to housing 602.

Power source 606 receives power from an external source, such as a wall outlet, and is partially comprised of a power cord. The power cord can be plugged into the wall outlet to receive power for data packet generator 600 as well as for power outlet 618. Some embodiments of data packet generator 600 also include a battery. Some embodiments further include a battery charger that operates to charge the battery from the power supplied by the wall outlet. The battery provides backup power to data packet generator 600 in the event that power is not available from the wall outlet. Other embodiments receive power from other sources, such as from a solar panel, power adapter, external battery, crank, or other power source.

In this embodiment, output device 608 is a display. Output device 608 operates to display a passcode periodically on the display so that it is visible to a user. In some embodiments, output device 608 is removable from housing 602. For example, output device 608 is connected via a wire so that output device 608 may be moved to a more convenient location away from housing 602. Output device 608 includes a fastener, such as an adhesive layer, a clip, or a hook-and-loop fastener layer in some embodiments that allow output device 608 to be arranged at a convenient location, such as on a wall of a workspace, on a computer monitor, on the desktop, or any other desired location. In another embodiment, output device 608 is a display device that receives wireless data. An example of such a display device is a smartphone.

In some embodiments, data packet generator 600 includes input device 610. Input device is, for example, a communication device and cable. The communication cable is connectable to another device, such as a computer, cell phone, wireless router, or other device to enable data packet generator 600 to receive input communications. Input device 610 is used in some embodiments, for example, to synchronize data packet generator 600 with a server, to provide a new set of passcodes or a new passcode formula, or to receive other communications. In some embodiments the same input device 610 also allows data packet generator 600 to send communications to an external source.

Attachment device 614 is connected to housing 602 and configured to securely attach housing 602 to desktop 204. In this embodiment, attachment device 614 is a C-shaped bracket having a top portion, a rear portion, and a bottom portion. The rear portion has a height that is typically slightly larger than the thickness of desktop 204. Attachment device 614 is connected to the rear side of desktop 204 by arranging the attachment device 614 adjacent to desktop 204, and sliding it onto the desktop 204 until the rear portion of the attachment device comes into contact with the edge of desktop 204. Fasteners 616 are then inserted through fastener holes through the bottom portion and into the bottom surface of the desktop 204.

Power outlet 618 is provided at the face of data packet generator 600. The power outlet 618 provides an easily accessible source of power so that a user can plug in another electric-powered device to power the device.

In some embodiments data packet generator 600 is integrated with one or more other devices or components. Examples of other devices or components include any portion of a workstation (e.g., cubicle tile, wall, cabinet, etc.), a telephone, a computer, a nameplate, a pen/pencil holder, a picture frame, a clock, a cup holder, a television, a ceiling, a floor, or other devices or components. An example is shown in FIG. 49 herein.

Figure 7:
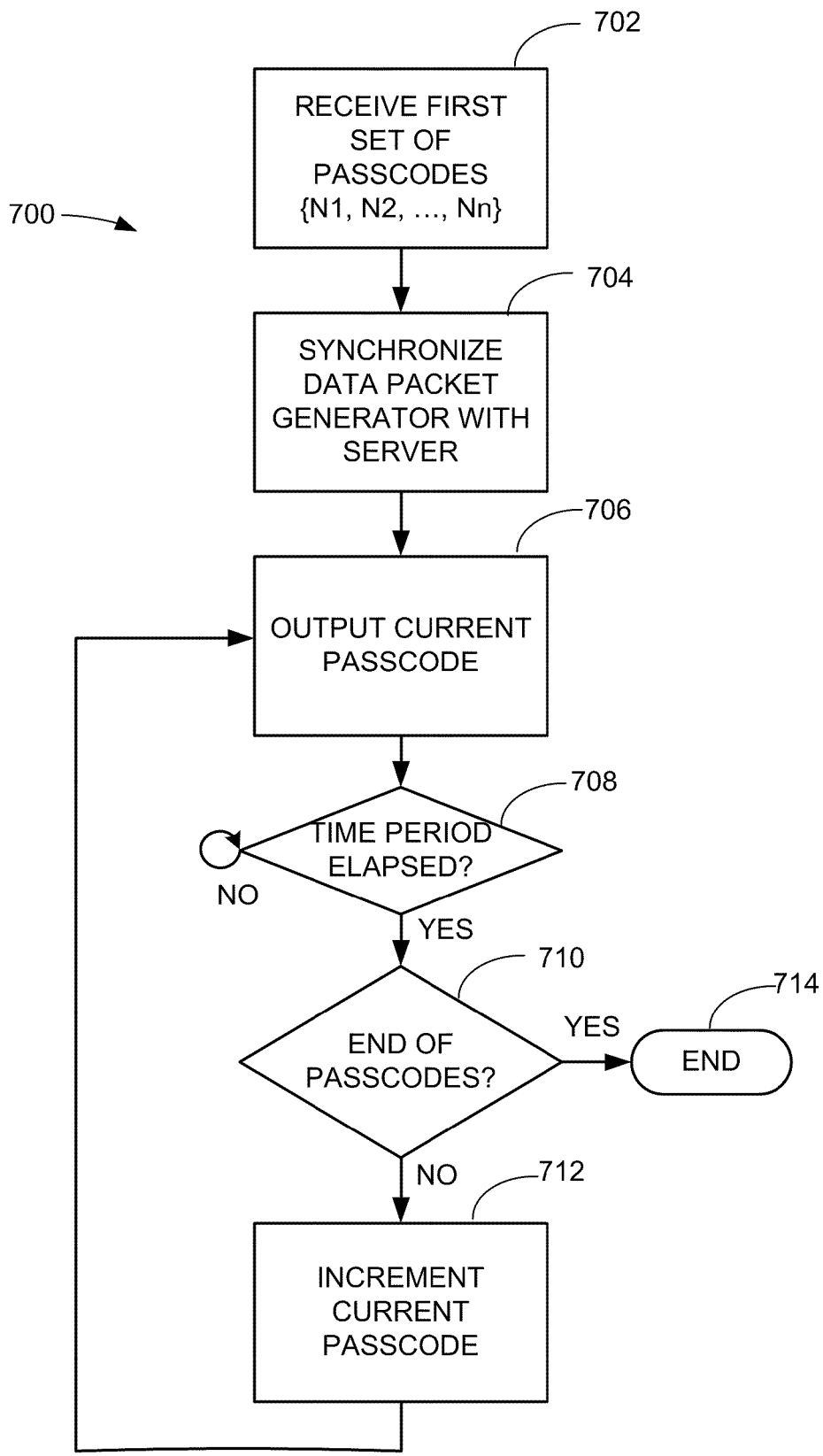
FIG. 7 is a schematic flow chart of an exemplary method of operating a data packet generator according to the present disclosure.

FIG. 7 is a schematic flow chart illustrating an exemplary method 700 of operating a data packet generator. Method 700 includes operations 702, 704, 706, 708, 710, 712, and 714.

Method 700 begins with operation 702, during which a data packet generator receives a first set of passcodes. In some embodiments, a set of passcodes is received, such as from a server. The set of passcodes may include any number of passcodes. The number of passcodes is typically in a range from about 30 passcodes to about 6 million passcodes or more. If, for example, the passcode were to change once per minute, about 5.25 million passcodes would allow a data packet generator to continue operating for a period of about ten years. The set of passcodes is typically stored into memory. By receiving passcodes from the server, the data packet generator and the server are now in possession of the same set of passcodes. In some embodiments, operation 702 is performed during manufacturing of the data packet generator. In other embodiments, communication occurs across a communication network after manufacturing.

Operation 704 is next performed to synchronize the data packet generator with the server. In some embodiments, synchronization involves setting a clock of the data packet generator to match the server's clock. In other embodiments, synchronization involves identifying a start time in which to begin displaying passcodes. Further, in some embodiments, synchronization also includes identifying one of the passcodes of the set of passcodes as a current passcode. For example, the server may operate in some embodiments to maintain all data packet generators in sync. Thus, when a new data packet generator is synced, the server informs the new data packet generator of which code of the set of codes the other data packet generators are currently on (e.g., the fifth passcode), so that the new data packet generator is also synchronized with the other data packet generators (e.g., to display the fifth passcode). An advantage of such synchronization is that the server may be used, in some embodiments, to ensure that no two data packet generators will output the same passcode at the same time. However, some embodiments do allow data packet generators to display the same passcode at the same time, as described in more detail below.

In some embodiments operation 704 is performed before operation 702 to synchronize the data packet generator with the server before sending a first set of passcodes. In other embodiments operations 702 and 704 are performed simultaneously. In other embodiments the server begins to observe data packet(s) that identify a single data packet generator as being the source of the data packet(s) (such as when the serial number of the data packet generator is included within the data packet). In this scenario, one or more data packet retrievals can inform the server about the current status of the data packet passcode sequence (if such passcodes are in the data packet). Through preprogramming and memory, the server can then synchronize itself to that data packet generator so that all future passcodes from that data packet generator are predictable by the server. This is helpful, for example, in the case of data packet generators that are programmed (e.g., at the factory) to not start generating passcodes until a tab is removed from the battery.

Operation 706 is next performed to output the current passcode. In some embodiments, operation 706 involves displaying the current passcode on a display. In other embodiments, operation 706 involves generating an audible signal identifying the current passcode. In other embodiments, operation 706 involves communicating the passcode via a digital communication signal or by using another output device.

After the passcode has been output, method 700 pauses to wait for a time period to elapse with operation 708. The time period defines how frequently the passcode is changed to a new passcode. A benefit of changing the passcode periodically is that it prevents someone from viewing a passcode on a data packet generator and then later using it in an unauthorized manner from a different location. In general, the more frequently the passcode is changed, the more difficult it would be for someone to use the passcode at a different location. The period of time used in operation 708 is typically in a range from about 10 seconds to about 1 hour, and preferably from about 30 seconds to about 2 minutes. In some embodiments, the time period is about one minute, such that the passcode is updated about once per minute. One minute is typically a sufficient amount of time for a user to manually enter a passcode.

Once the time period has elapsed, operation 710 is performed to determine whether the current passcode is the last of the first set of passcodes. If so, operation 714 is performed to bring method 700 to an end. Alternatively, method 700 returns to the first passcode and displays the same passcodes again beginning with operation 706. In yet another embodiment, a user alert is provided to inform the user that all passcodes have been exhausted. In a further embodiment, the data packet generator initiates communication with a server to obtain a second set of passcodes and restarts method 700 to obtain the second set of passcodes.

If further passcodes remain, operation 712 is performed to increment the current passcode to the next passcode of the first set of passcodes. Method 700 then returns to operation 706 where the next passcode is displayed as the current passcode.

Figure 8:
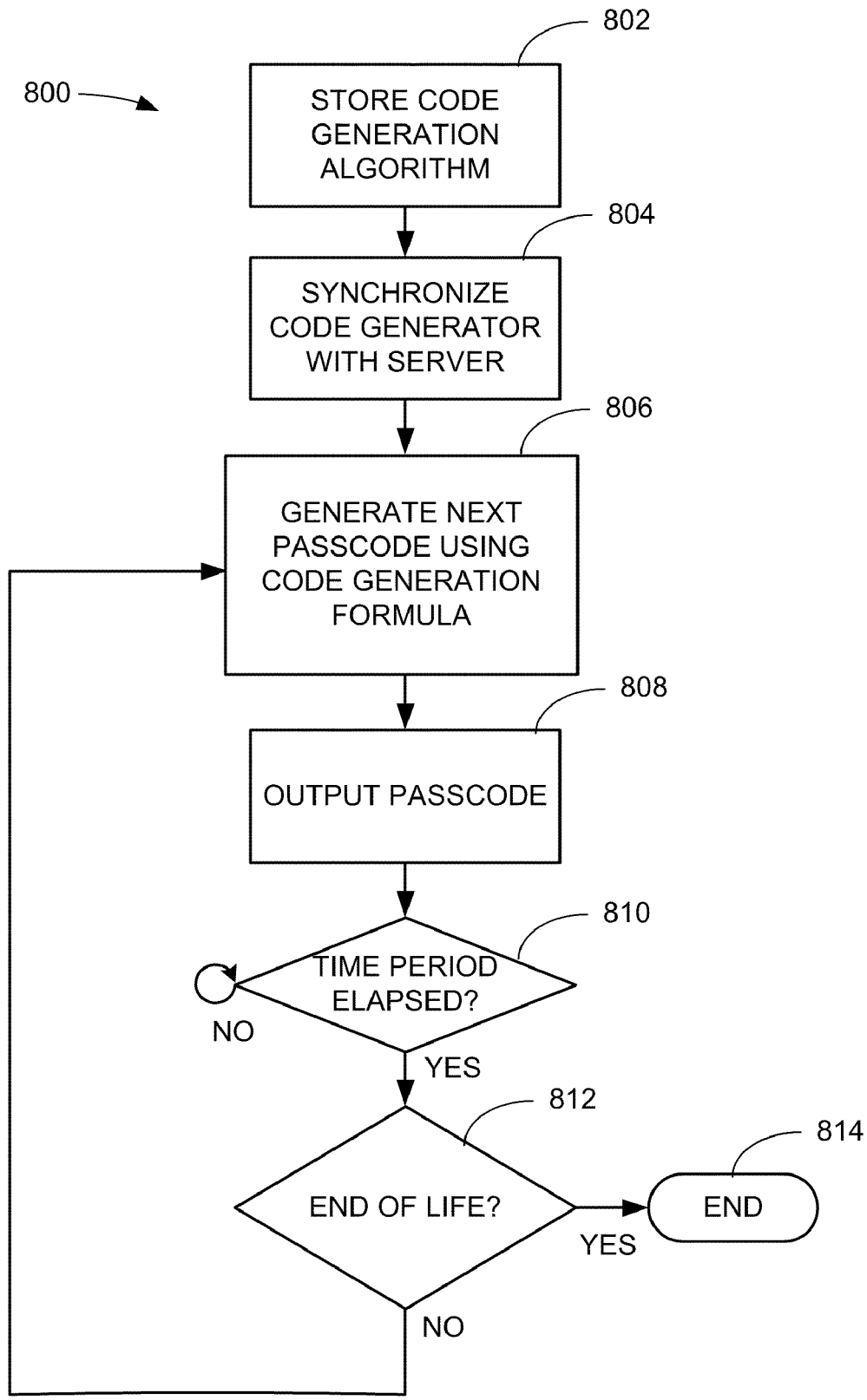
FIG. 8 is a schematic flow chart of an exemplary method of operating a data packet generator according to the present disclosure.

FIG. 8 is a schematic flow chart of an exemplary method 800 of operating a data packet generator. Method 800 includes operations 802, 804, 806, 808, 810, 812, and 814.

Method 800 begins with operation 802 that stores a code generation algorithm. In some embodiments, the code generation algorithm is programmed into the data packet generator during manufacturing and is stored in memory. In other embodiments, the code generation algorithm is received through an input device subsequent to manufacturing. For example, the code generation algorithm is received from another device, such as a server or a computing device, and is stored in memory. In other embodiments the server begins to observe data packet(s) that identify a single data packet generator as being the source of the data packet(s) (such as when the serial number of the data packet generator is included within the data packet). In this scenario, one or more data packet retrievals can inform the server about the current status of the data packet passcode sequence (if such passcodes are in the data packet). Through preprogramming and memory, the server can then synchronize itself to that data packet generator so that all future passcodes from that data packet generator are predictable by the server. This is helpful, for example, in the case of data packet generators that are programmed (e.g., at the factory) to not start generating passcodes until a tab is removed from the battery.

The code generation algorithm is an algorithm for generating random numbers or pseudorandom numbers for use as passcodes. In some embodiments, the passcodes are generated by a known algorithm so that they can also be accurately determined or predicted by the server. In some embodiments, the code generation algorithm is cryptographically secure or substantially cryptographically secure. In some embodiments, the code generation algorithm is an algorithm for generating pseudo-random numbers. One example of a code generation algorithm utilizes a linear congruential generator (LCG) algorithm. The LCG algorithm is defined by the recurrence relation:

$$X_{n+1}=(aX_n+c)\bmod m$$

where $X_n$ is the sequence of random values, m=modulus, a=multiplier, c=increment, and $X_0$=the seed or start value. m, a, c, and $X_0$ are integer values. Other embodiments utilize other code generation algorithms, such as the Mersenne twister algorithm developed by Makoto Matsumoto and Takusju Nishimura; Blum Blum Shub developed by Lenore Blum, Manuel Blum, and Michael Shub in 1986; the Crytographic Application Programming Interface's CryptGenRandom distributed by Microsoft Corporation; the Yarrow algorithm designed by Bruce Schneier, John Kelsey, and Niels Ferguson of Counterpane Labs and incorporated into the Mac OS X; Fortuna devised by Bruce Schneier and Niels Ferguson; or other algorithms.

Another example of a code generation algorithm is the proprietary SecurID hash function developed by John Brainard, which is believed to take as an input a 64-bit secret key, unique to one single authenticator, and the current time (expressed in seconds since 1986). It then generates an output by computing a pseudo-random function based on these two input variables.

Another possible embodiment includes a hardware random number generator, such as those based on microscopic phenomena including thermal noise, the photoelectric effect, or other quantum phenomena. Examples of quantum phenomena include shot noise, nuclear decay, and the passage of photons through a semi-transparent mirror (such as used in the line of cryptography products developed by id Quantique of Geneva, Switzerland.)

Some embodiments generate a passcode using base 31, rather than base 10. A base 31 code may be generated by first generating a number of appropriate length using base 10 (or binary, if desired). The number is then converted into base 31 using an appropriate conversion algorithm. Alternatively, an algorithm is used to generate a passcode in base 31 directly.

In some embodiments the actual code generation algorithm is predefined, but operation 802 involves storing the start value and any other necessary value in memory. In some embodiments the resulting number is truncated to generate a passcode of a desired number of characters. In other embodiments, two or more resulting numbers are merged to form a single passcode.

Operation 804 involves synchronizing the data packet generator with the server. In some embodiments operation 804 involves setting a clock of the data packet generator to match a clock of the server. In other embodiment, operation 804 involves identifying a time to display a first code.

In some embodiments operation 804 is performed before operation 802 to synchronize the data packet generator with the server before storing the code generation algorithm. In other embodiments operations 802 and 804 are performed simultaneously.

A passcode is then generated through operation 806 using the code generation formula of operation 802. The passcode is typically stored in memory after being generated.

Once the passcode has been generated it is output in operation 808. In some embodiments operation 808 involves displaying the passcode. In other embodiments the passcode is communicated in another manner, as discussed herein.

After the passcode is output, operation 810 is performed to wait until a predetermined time period has elapsed. In some embodiments the passcode output in operation 808 is only valid during this time period.

After the time period has elapsed, operation 812 is performed to determine whether the data packet generator has reached an end of life. In some embodiments data packet generators are configured to operate only for a predetermined life span. For example, the life span is typically in a range from about one hour (such as for a data packet generator given to guests on a temporary basis) to about ten years. Other embodiments have other life spans outside of this range. Added security is achieved in some embodiments by limiting the life of data packet generators to a predetermined duration. If the end of life has been reached, operation 814 is performed to terminate operation of the data packet generator. In some embodiments a warning or alert is given to the user. In further embodiments a user alert is provided in advance of the end of life of the data packet generator.

If the end of life has not been reached, method 800 returns to operation 806 to generate the next passcode, which is subsequently output in operation 808.

In some embodiments data packet generators do not have a predetermined life span. As a result, some embodiments of method 800 perform operation 806 immediately following operation 810 rather than performing the end of life check of operation 812.

Other embodiments of data packet generators operate in different manners than illustrated in FIGS. 7 and 8. Some embodiments have additional features. For example, some data packet generators include a tamper sensor (e.g., 312, shown in FIG. 3) that, in some embodiments, causes the data packet generator to cease functioning if tampering is detected. Other embodiments include more or fewer features, methods, and processes.

Figure 9:
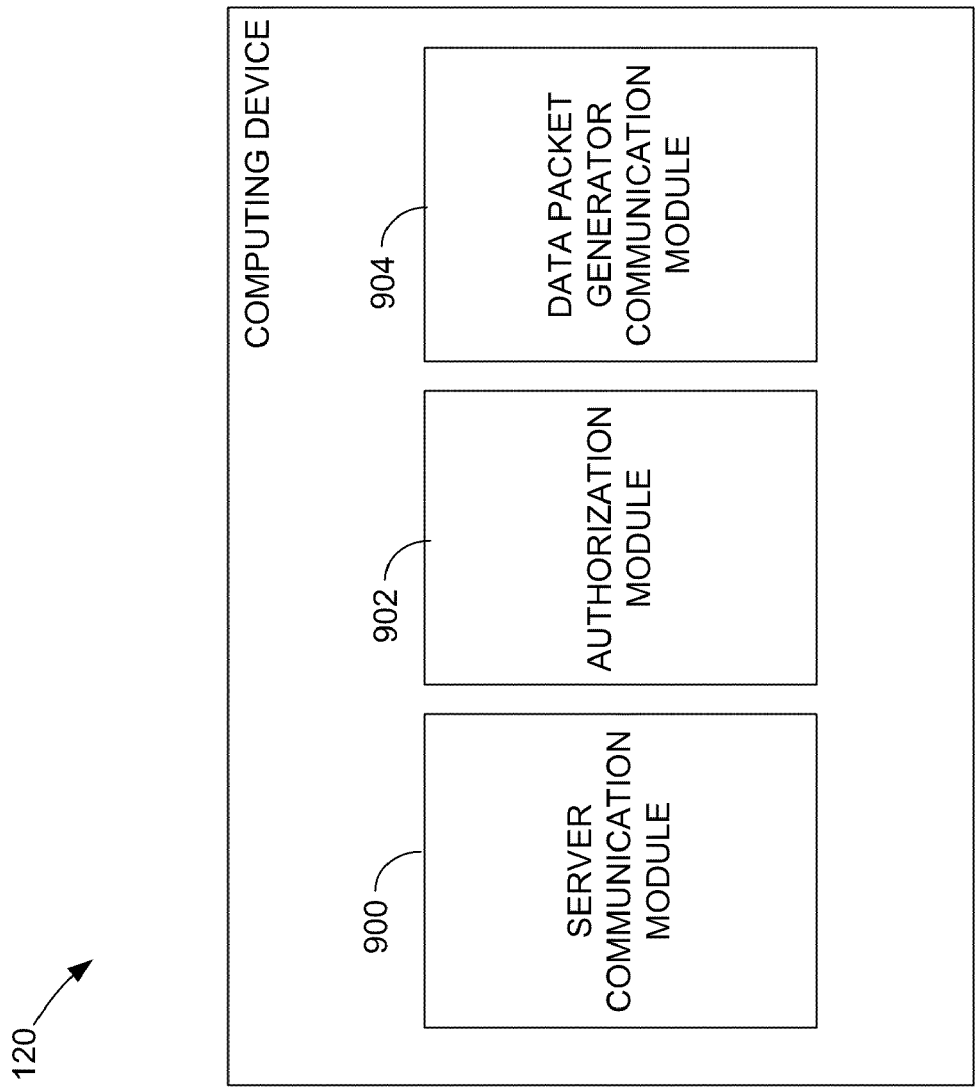
FIG. 9 is a functional block diagram of an exemplary computing device of the authentication system shown in FIG. 1.

FIG. 9 is a functional block diagram of an exemplary computing device 120. In some embodiments, computing device 120 includes server communication module 900, authentication module 902, and data packet generator communication module 904. Not all modules are included in all embodiments of computing device 120, and some embodiments include additional modules.

Server communication module 900 operates, in some embodiments, to control communications between computing device 120 and server 108 across network 106 (shown in FIG. 1). In some embodiments, server communication module 900 is a Web browser that receives data defining one or more Web pages from server 108 and displays the Web pages to the user. In other embodiments, server communication module 900 is a custom software module that communicates with server 108 according to a defined network communication protocol.

Figure 14:
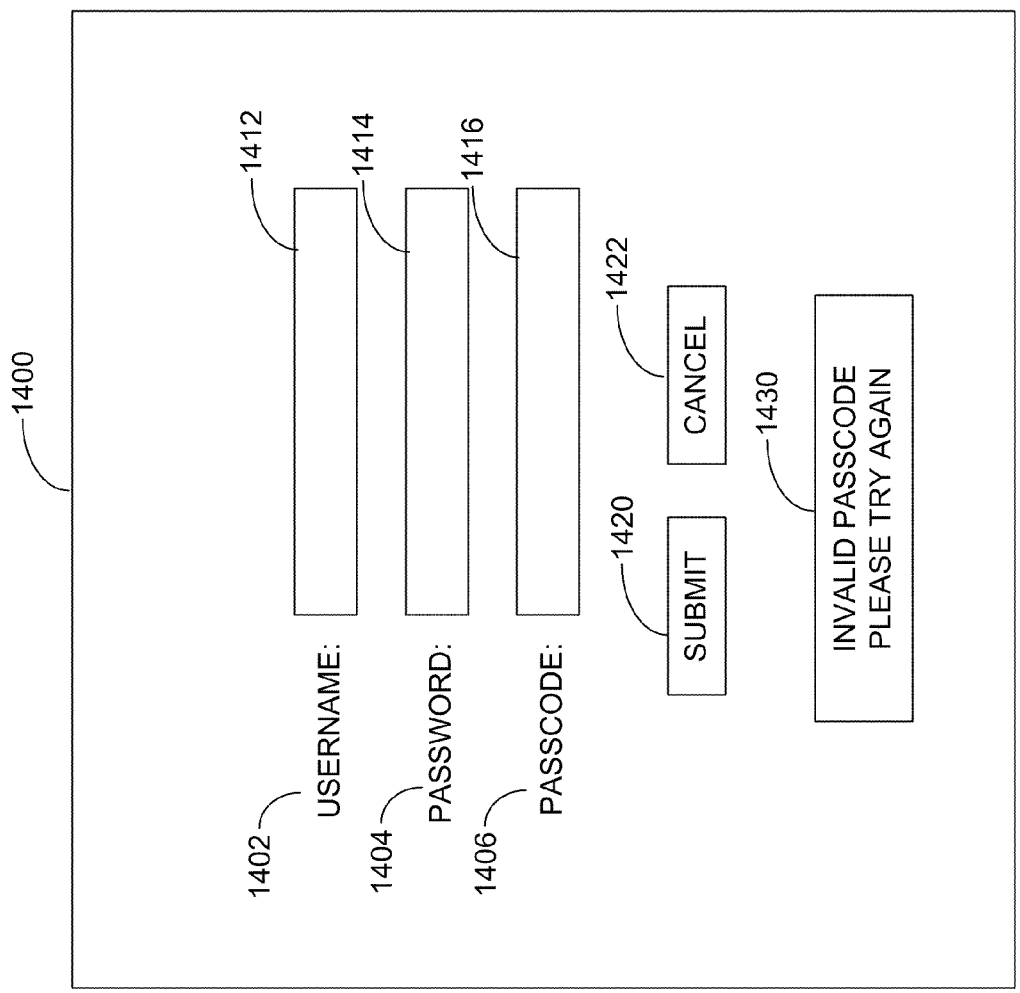
FIG. 14 is a schematic screen shot of an exemplary user interface according to the present disclosure.

Authentication module 902 operates to require authentication from a user of computing device 120. In some embodiments, authentication module 902 operates to require authentication before allowing access to a protected resource. For example, in some embodiments authorization module 902 is configured to generate a user interface display when a user starts the computing device. (An example user interface display that is generated by authentication module 902 in some embodiments is shown in FIG. 14.) The authentication module 902, in some embodiments, prevents a user from accessing protected resources on the computing device (or on the network) until proper authentication has been provided, such as a valid passcode. For example, once a passcode is entered, the authorization module 902 operates to request validation of the passcode, by sending the passcode to the server using server communication module 900. If validated, the server returns a validation message that is delivered to the authorization module 902. Upon receiving the validation message, the authorization module 902 allows the user to access the protected resource. Other embodiments operate in other manners, such as discussed herein.

Some embodiments of authentication module 902 require that a passcode be entered, but do not validate the passcode, and/or do not prevent access if an invalid passcode is entered. Although such embodiments may not be used for very high security applications, such embodiments may be used for data logging or other purposes. For example, data may be gathered and stored in memory relating to general space utilization. When a passcode is entered, data is stored identifying the location of the user. The location data may be used to identify spaces that are highly used, or spaces that are infrequently used, for example. In this example, the passcode is not being used for security purposes, and therefore need not prohibit access to resources upon entry of an invalid passcode. Rather, the data associated with an invalid code is discarded or stored as an erroneous entry. Alternatively, an algorithm is used in some embodiments to identify the data packet generator based on the invalid code, such as by identifying a data packet generator that had a code that was very similar to the code entered by the user. If a subsequent report (e.g., a space usage report) is generated based on the data, the data associated with an invalid code may be ignored for generating space usage reports.

In some embodiments authentication module 902 is not required, such as if the protected resource is located on a server (e.g., 108) rather than on computing device 120. For example, if server 108 is a Web service, authentication may be handled by server 108 through a Web browser of server communication module 900, rather than locally on computing device 120.

Some embodiments of computing device 120 include a data packet generator communication module 904. The data packet generator communication module 904 operates to communicate with one or more data packet generators. In some embodiments, a data packet generator (e.g., 122, shown in FIG. 1) is communicatively or otherwise coupled to computing device 120, such as via wires or wirelessly or by being built into the computing device hardware or software. A data communication protocol is typically used to communicate data between the data packet generator communication module and the data packet generator.

In its most basic hardware configuration, computing device 120 typically includes a processing device, memory, and a communication device. Other embodiments include other components. A processing device is a device that processes a set of instructions. One example of a processing device is a microprocessor. Alternatively, various other processing devices may also be used including central processing units ("CPUs), microcontrollers, programmable logic devices, field programmable gate arrays, digital signal processing ("DSP") devices, and the like. Processing devices may be of any general variety such as reduced instruction set computing (RISC) devices, complex instruction set computing devices ("CISC"), or specially designed processing devices such as an application-specific integrated circuit ("ASIC") device. A more detailed explanation of an example architecture of computing device 120 is provided below with reference to FIG. 52.

Examples of memory include volatile (such as RAM), and non-volatile (such as ROM and flash) memory. In some embodiments, memory is part of the processing device, while in other embodiments memory is separate from or in addition to that of the processing device.

In some embodiments, computing device 120 also includes one or more additional storage devices. Storage devices typically store digital data. For example, some embodiments of computing device 120 include removable storage or non-removable storage, including, but not limited to, magnetic or optical disks or tape.

In some embodiments, memory and/or the storage device store data instructions including one or more of an operating system, application programs, other program modules, and program data. Modules 900, 902, and 904 are instructions stored in memory, the storage device, or other computer-readable storage media in some embodiments.

Figure 10:
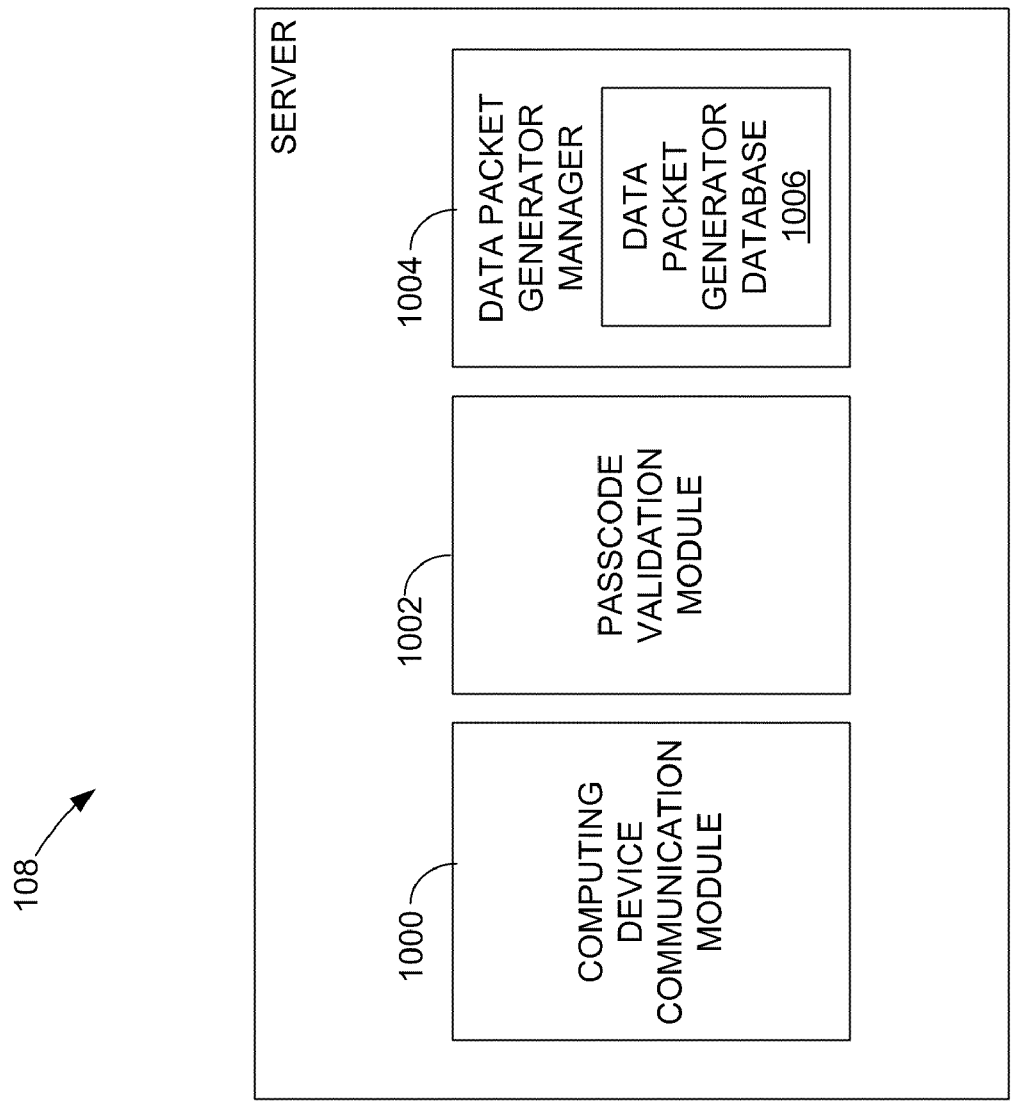
FIG. 10 is a functional block diagram of an exemplary server of the authentication system shown in FIG. 1.

FIG. 10 is a functional block diagram of an exemplary server 108. In some embodiments, server 108 includes computing device communication module 1000, passcode validation module 1002, and data packet generator manager 1004. Data packet generator manager 1004 includes data packet generator database 1006.

Computing device communication module 1000 is a module that communicates with computing devices, such as computing devices 120 and 130 (shown in FIG. 1). In some embodiments, computing device communication module 1000 is a Web server that communicates data to computing devices that is displayed as a Web page by a Web browser. In other embodiments, computing device communication module 1000 is a custom software module that communicates with a computing device according to a defined network communication protocol Passcode validation module 1002 operates to receive a passcode, such as from the computing device communication module 1000 (which itself typically receives the passcode from a computing device), and to determine whether the passcode is valid. In some embodiments passcode validation module 1002 utilizes data packet generator manager 1004 and data packet generator database 1006 to determine if a passcode is valid. In some embodiments passcode validation module 1002 generates a validation output or a non-validation output and communicates that output to computing device communication module 1000, where it is in turn communicated to the respective computing device to inform the computing device whether or not the passcode was validated. In some embodiments passcode validation module 1002 accesses a lookup table in data packet generator database 1006 to determine if the passcode is valid. In other embodiments, passcode validation module computes the current passcode for a particular data packet generator (such as based on the known or expected location of the data packet generator, or based on the serial number or other identifier of the data packet generator) and compares the current passcode with the received passcode to determine whether or not the passcode is valid. Other embodiments of passcode validation module operate in other manners, such as discussed herein.

Data packet generator manager 1004 operates to manage data packet generators. In some embodiments the data packet generator manager 1004 operates to oversee all active data packet generators, such as to maintain a list of all active data packet generators. In some embodiments data packet generator manager 1004 is used to initialize a data packet generator to define the passcodes that will be generated by the data packet generator. Some embodiments control or change the operation of a data packet generator by communicating with the data packet generator through computing device communication module 1000 and a computing device. Data packet generator manager 1004 operates in some embodiments to deactivate data packet generators (either by causing server 108 to no longer validate passcodes generated by the data packet generator, or by communicating with the data packet generator to cause the data packet generator to stop generating passcodes), such as if tampering is detected or suspected, or if appropriate subscription fees have not been paid. Other management features are performed by data packet generator manager in some embodiments.

In some embodiments data packet generator manager 1004 includes data packet generator database 1006. Data packet generator database includes an identifier of all active data packet generators (such as a serial number) and includes data relating to the passcodes generated by the respective data packet generator. Further, some embodiments include an identification of the location of the data packet generator (such as a room number, address, or other identification). In some embodiments data packet generator database 1006 includes a list of all passcodes that will be generated by the data packet generator. In other embodiments the data includes an algorithm for computing the passcodes. In yet other embodiments, the data includes parameters that are used with an algorithm for computing the passcodes. An example of a parameter is a seed. In some embodiments, data packet generator database includes additional or different information, such as a log of all attempted passcode validations, user information, data packet generator information (such as when the data packet generator first began operating), or any other desired information. One example of a data packet generator database is a CAFM system. CAFM systems are used, in some embodiments, to record the location of data packet generators, or other data from data packet generators.

As noted above, in some embodiments server 108 is a computing device having a hardware configuration as discussed above with respect to computing device 120. Other embodiments have other configurations.

Figure 11:
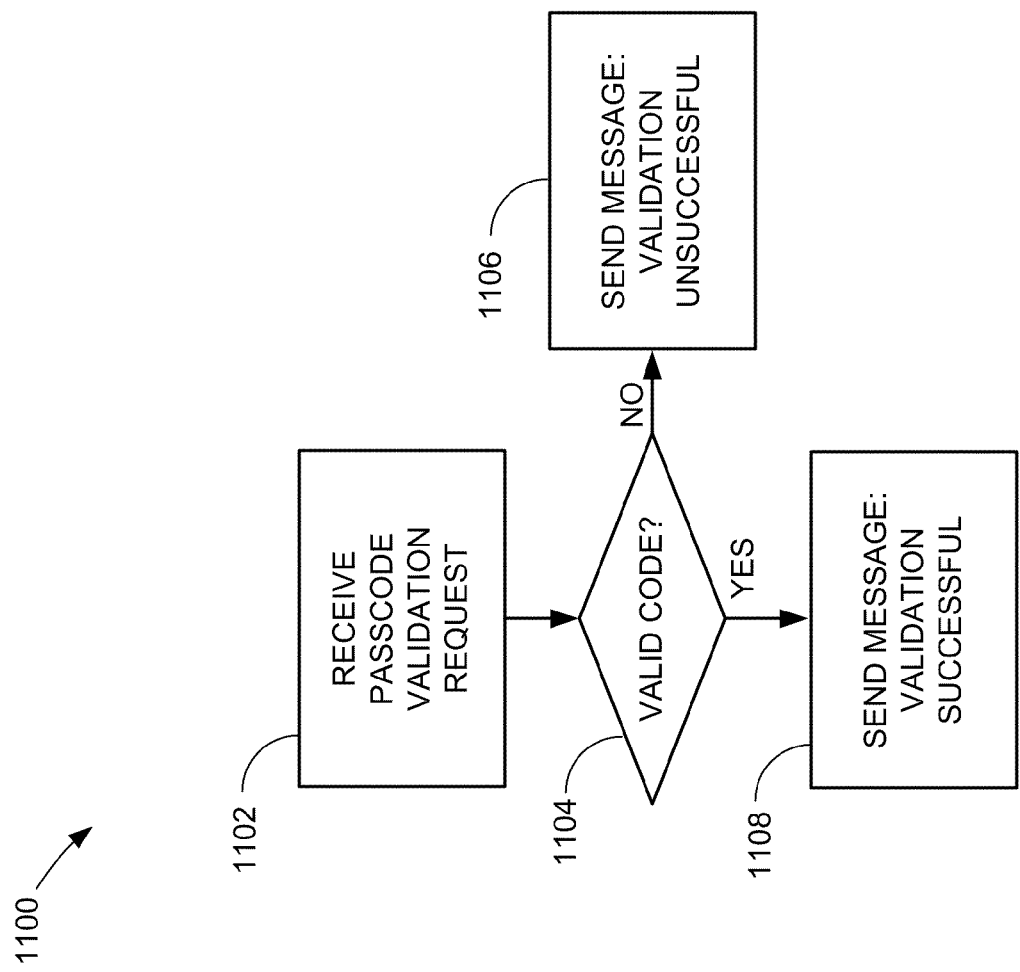
FIG. 11 is a schematic flow chart of an exemplary method of operating a server of the authentication system shown in FIG. 1.

FIG. 11 is a flow diagram of an exemplary method 1100 of operating server 108 (shown in FIG. 10). For example, method 1100 is performed by passcode validation module 1002 (also shown in FIG. 10) in some embodiments. Method 1100 includes operations 1102, 1104, 1106, and 1108.

Method 1100 begins with operation 1102 when a passcode validation request is received. In some embodiments, the passcode validation request includes a passcode. In some embodiments the passcode validation request is received from a computing device (e.g., 120). For example, the authorization module 902 generates the request and communicates the request to server 108 through server communication module 900 (shown in FIG. 9). In some embodiments either the passcode or the passcode validation request are encrypted.

Operation 1104 is then performed to determine whether the passcode is valid. In some embodiments, operation 1104 involves comparing the passcode with a set of passcodes in a lookup table of a data packet generator database. Other validation processes are used in other embodiments, such as described herein. If the passcode or passcode validation request are encrypted, operation 1104 involves decrypting of the passcode or passcode validation request.

If operation 1104 determines that the passcode is invalid, operation 1106 is then performed. During operation 1106, a response is sent to the initiator of the passcode validation request to inform the initiator that the passcode validation was unsuccessful.

If operation 1104 determines that the passcode is valid, operation 1108 is then performed. During operation 1108, a response is sent to the sender of the passcode validation request informing that the passcode validation was successful. In some embodiments a key, password, or other information is communicated with the response. In some embodiments granting access to resources is itself a communication of successful passcode validation.

Method 1100 is typically performed when a protected resource resides on or is accessible through a computing device.

Figure 12:
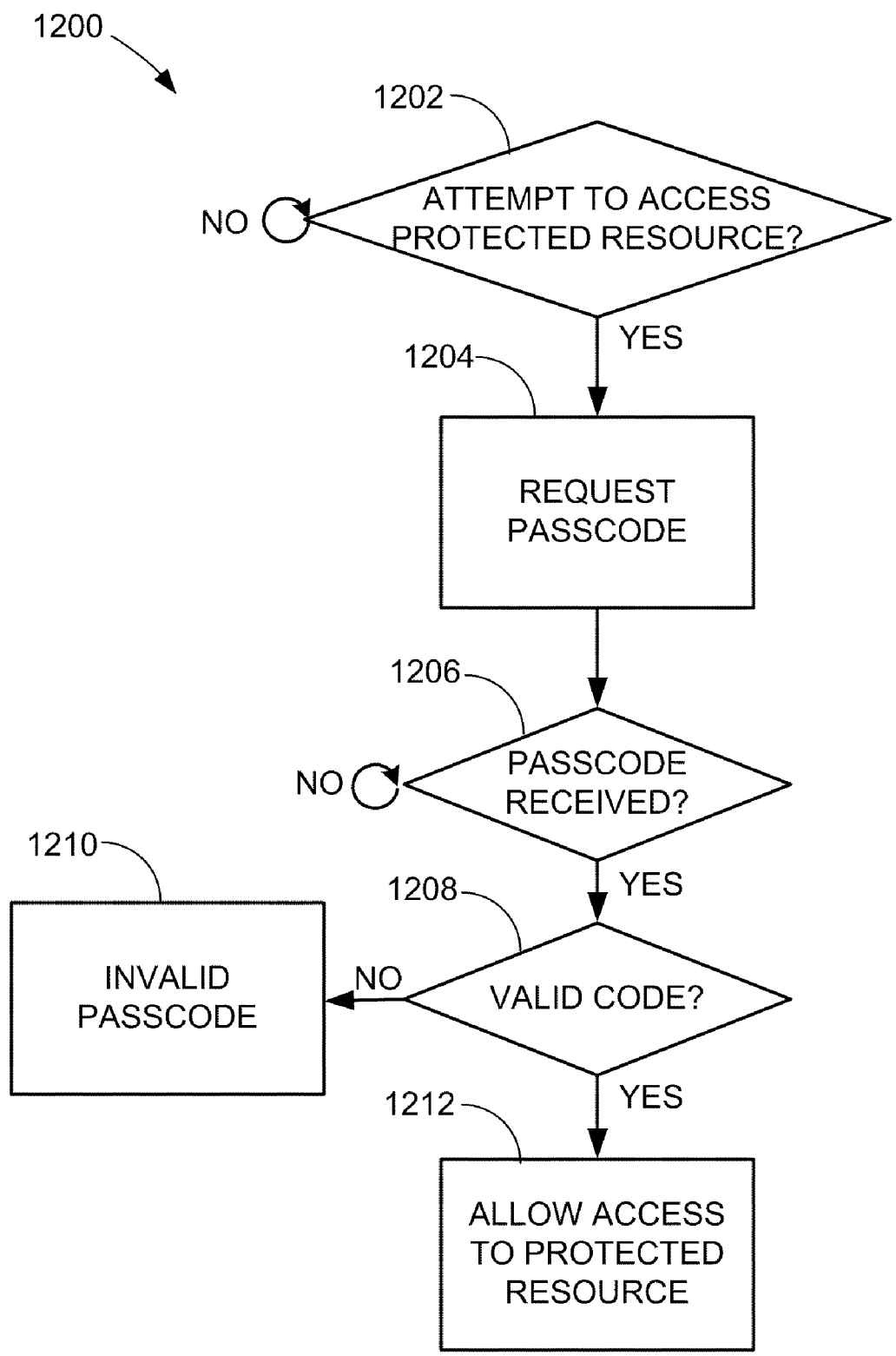
FIG. 12 is a schematic flow chart of an exemplary method of controlling access to a protected resource according to the present disclosure.

FIG. 12 is a flow chart of an exemplary method 1200 of controlling access to a protected resource. Method 1200 includes operations 1202, 1204, 1206, 1208, 1210, and 1212. In some embodiments, method 1200 is used when a protected resource is located on a server, such as server 108 (shown in FIG. 1).

Method 1200 begins with operation 1202 to detect an attempt to access a protected resource. In some embodiments, logging into a private Web site is an attempt to access a protected resource. In other embodiments, a request to open or otherwise access or modify a file is an attempt to access a protected resource. A protected resource is, for example, a computing device function or data accessible through a computing device that is not generally available to the public and therefore has at least some access restrictions. Operation 1202 continues until an attempt to access a protected resource is detected.

Operation 1204 operates to request a passcode before allowing access to the protected resource. In some embodiments, operation 1204 involves generating a login request that is displayed as a Web page including a field in which a user is prompted to enter a passcode displayed by a nearby data packet generator. In other embodiments, the passcode request is a message that is sent across a network causing a computing device to prompt the user for a passcode.

After the passcode is requested in operation 1204, operation 1206 is performed to wait for the passcode to be received. For example, upon being prompted to enter the passcode, a user uses an input device of a computing device to enter the passcode currently displayed on a data packet generator. In another embodiment, a user presses a button on the data packet generator to cause the data packet generator to send the passcode to a server. In yet another embodiment, the computing device communicates with the data packet generator to receive the passcode directly from the data packet generator. In any event, the passcode from the data packet generator is communicated back to the server.

After the passcode is received, operation 1208 is performed to determine whether the passcode is valid. If operation 1208 determines that the passcode is not valid, operation 1210 is performed in some embodiments. Operation 1210 typically includes informing the user that the passcode was incorrect. Operation 1204 is then performed to again request a passcode from the user. Additionally, operation 1210 may operate to block access to the protected resource. In another embodiment, method 1200 flows directly from operation 1208 to operation 1204 without operation 1210 upon a determination that the passcode is not valid.

If the passcode entered is determined valid in operation 1208, then operation 1212 is performed to allow access to the protected resource. In some embodiments, operation 1212 operates to communicate the requested data to a computing device, or to perform a requested function.

In a further embodiment, access to protected resources is controlled based on a security level of the respective protected resource. In some embodiments, if a protected resource has a low security level, for example, the method does not prohibit access to the protected resource due to an invalid passcode entry. If the protected resource has a high security level, the method does prohibit access to the protected resource due to an invalid passcode entry.

Some embodiments of method 1200 do not involve operation 1210, and do not require that a user reenter a passcode after determining that a passcode entered is incorrect. Such an embodiment, for example, stores information for any valid data code entered, but ignores invalid data code entries. The data is useful, for example, for providing general space utilizing information as discussed in more detail below.

Figure 13:
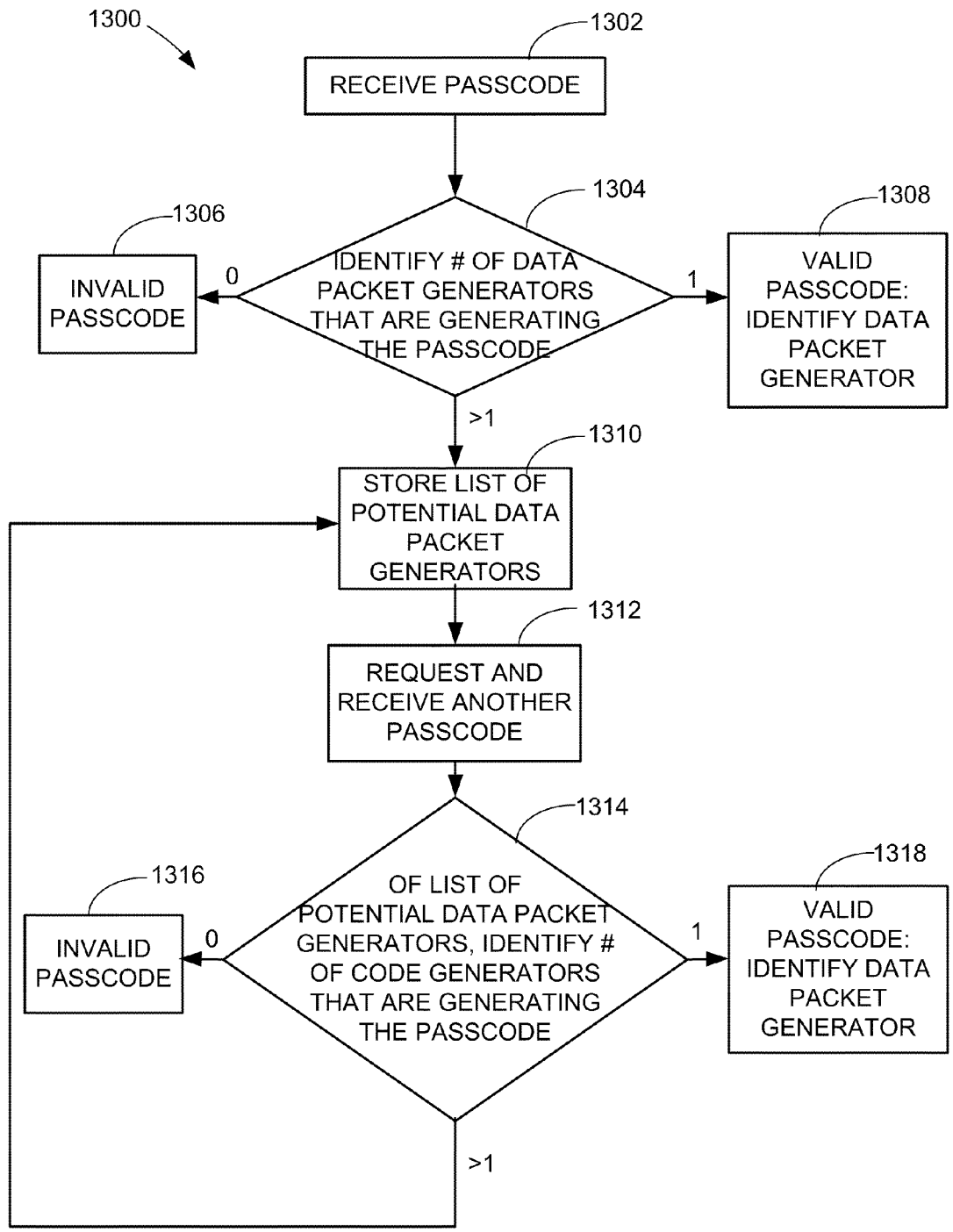
FIG. 13 is a schematic flow chart illustrating an exemplary method of identifying a data packet generator according to the present disclosure.

FIG. 13 is a flow chart illustrating an exemplary method 1300 of identifying a data packet generator. Method 1300 includes operations 1302, 1304, 1306, 1308, 1310, 1312, 1314, 1316, and 1318. In some embodiments, passcodes generated by more than one data packet generators have a potential of being the same code at the same time. As a result, method 1300 is used in some embodiments to identify a particular data packet generator from multiple possible data packet generators.

Method 1300 begins with operation 1302 in which a first passcode is received.

Operation 1304 is then performed to identify the specific data packet generators that are currently generating that passcode. If no data packet generators are generating the passcode, operation 1306 is performed. If exactly one data packet generator is generating the passcode, operation 1308 is performed. If more than one data packet generator is generating the passcode, operation 1310 is performed.

Operation 1306 is performed to identify the passcode as an invalid passcode if no data packet generators are currently displaying the passcode. In some embodiments, a user is prompted to reenter the passcode.

Operation 1308 is performed to identify a valid passcode if only a single data packet generator is currently generating the passcode. In that case, the particular data packet generator is then identified.

If more than one data packet generator is currently generating the passcode received in operation 1302, then operations 1310, 1312, and 1314 are performed.

In operation 1310 a list of all data packet generators that are currently generating the passcode is stored to identify all of the potential data packet generators associated with the passcode.

Operation 1312 is then performed to request and receive an additional passcode. In some embodiments a user may need to wait for a period of time until the next or another passcode is displayed.

Operation 1314 is then performed to evaluate the second passcode. In particular, operation 1314 determines the specific data packet generators that are currently generating the second passcode from the narrowed list of potential data packet generators that had previously generated matching codes. If no data packet generators are generating the second passcode, then operation 1316 is performed. If only a single data packet generator is generating the second passcode, then operation 1318 is performed. If more than one data packet generator is currently generating the second passcode, then method 1300 returns to operation 1310.

If no data packet generators are generating the second passcode, operation 1316 is performed to identify the second passcode as an invalid passcode. In some embodiments, a user is then prompted to reenter the passcode. In other embodiments, method 1300 terminates and the user has the option of resubmitting a new passcode to restart method 1300 at operation 1302.

If only a single data packet generator is generating the second passcode, operation 1318 is performed to identify the passcode as a valid passcode. In addition, operation 1318 identifies the data packet generator.

If more than one data packet generator is generating the second passcode, then method 1300 returns to operation 1310 to repeat operations 1310, 1312, and 1314 until the data packet generator is uniquely identified. In some embodiments, the reduced list of potential data packet generators (the list previously stored in operation 1310) is analyzed to determine when an additional passcode sampling can be taken without encountering additional duplications.

In some embodiments, once a data packet generator is identified, additional information about the data packet generator is also known. For example, in some embodiments the location of the data packet generator is retrievable from a data packet generator database (e.g., 1006, shown in FIG. 10).

An alternative embodiment can be used to uniquely identify a person that is transient. For example, if a security guard is walking around a building while using the authorization system, it may be impractical to require the security guard to return to a previous location to enter a second or subsequent passcode in operation 1312. This alternative embodiment allows the user to enter a second or subsequent passcode from another location, provided that the next location is within a particular range from the first location. For example, after a user enters a first passcode, the system then prompts the user to enter a second passcode (e.g., via a handheld computing device). The user then locates a nearby data packet generator and enters the associated passcode. The server determines the amount of time between the first passcode entry and the second passcode entry and, using an estimated maximum walking speed, determines whether or not the second passcode entry is within a range that the user could have walked to. If so, the second passcode entry is accepted. Since it is unlikely that two or more data packet generators would both (i) display the same passcode at the same time, and (ii) have a nearby data packet generator that displays the same second passcode at the same time, the server will typically be able to uniquely identify the data packet generators that are being used. However, if the server is unable to uniquely identify the data packet generators, the process is repeated with additional passcodes until the data packet generators are uniquely identified.

In another possible embodiment, a passcode received in operation 1302 is compared with known information. For example, if the user also provides a user ID, known information about the user can be compared with the list of data packet generators that are generating the passcode (operation 1304). For example, if multiple data packet generators are generating the same passcode provided by the user, but one of the data packet generators is located within the user's private workspace, some embodiments will not require additional passcodes. Rather, the system will assume that the user is working from the private workspace. Similarly, if one data packet generator is located in the user's home facility in Minneapolis and another passcode is located in Phoenix, some embodiments will assume that the user is in the home facility and will not require additional passcodes.

In some embodiments, a data packet generator is first identified by receiving the serial number from the data packet generator. The serial number provides a preliminary indication of the identity of the data packet generator. The passcode is then evaluated and a determination is made as to whether the passcode matches a passcode that is expected from the data packet generator having the provided serial number. If so, the data packet generator is uniquely identified and no further evaluation may be needed. Alternatively, the evaluation of the serial number can be performed after the initial evaluation of the passcode, such as after operation 1304 has identified that more than one data packet generator is expected to be generating the passcode at a given time.

FIG. 14 is a screen shot of an exemplary user interface 1400 according to some embodiments of the present disclosure. User interface 1400 is, for example, a user interface as displayed by computing device 120 to a user. User interface 1400 includes a username prompt 1402, password prompt 1404, and passcode prompt 1406. Each prompt includes a corresponding data entry field 1412, 1414, and 1416. User interface 1400 also includes buttons, such as submit button 1420 and cancel button 1422. In some embodiments user interface 1400 further includes a message display window 1430.

User interface 1400 is typically displayed by an output device, such as a computer monitor, although other output devices are used in some embodiments. User interface 1400 is a Web page displayed by a Web browser application in some embodiments. In other embodiments user interface 1400 is a screen of a software application other than a Web browser. In yet other embodiments, user interface 1400 is a screen generated by an operating system.

In some embodiments, user interface 1400 is displayed to a user to request the user's username and password. The username is entered into username field 1412 and the password is entered into password field 1414. User interface 1400 further requests that the user enter the passcode from a nearby data packet generator. The passcode is entered into passcode field 1416.

After entering data into the appropriate fields, the user clicks on submit button 1420 to submit the information. In some embodiments, clicking on the submit button causes the computing device (e.g., computing device 120, shown in FIG. 1) to transfer the data to a server (e.g., server 108, shown in FIG. 1).

Alternatively, cancel button 1422 is selected to cancel submission of data. In some embodiments, a user is then returned to a prior user interface window, or the user interface 1400 is closed.

In some embodiments, message display window 1430 is included in user interface 1400. Message display window 1430 operates to display a message to the user. An example of such a message is a request to reenter a passcode, such as upon entry of an invalid passcode. Any other desired message may be displayed in message display window 1430.

In some embodiments, user interface 1400 is a virtual wall. The virtual wall is activated when a user attempts to access a protected resource on the computer system or on the network. For example, if the user attempts to access a protected file, software application, computer, device, or other protected resource, a virtual wall such as user interface 1400 is displayed. In some embodiments the virtual wall is a pop-up window that fills the entire screen. The virtual wall requires the user to enter information sufficient to validate that the user is authorized to access the protected resource, or to cancel the attempt to access the protected resource. Data is logged in some embodiments to record a potential attempt to access the unauthorized protected resource.

In some embodiments the passcode (or other data) is provided automatically by the data packet generator, such that the user does not need to enter the passcode into field 1416. Some embodiments do not prompt the user for one or more of the username, password, or passcode. Other embodiments include other or additional fields or prompts as desired.

In some embodiments the username of the user is acquired for subsequent use. The username can be acquired in a number of possible ways. One way is to receive the username with user interface 1400 either at login and/or at another time after login. In another possible embodiment, the username is acquired by acquiring other data and looking up that data in a lookup table to find the associated username. For example, in some embodiments an identifier of a smartphone (or other mobile device) is obtained. The identifier of the smartphone is then compared to a lookup table that maps identifiers with usernames. The username is therefore identified. Other identifiers are used in other embodiments, such as a computer identifier, a data packet generator identifier, or other identifier. The identifier is then compared to a lookup table or other database that maps the identifier to a user identifier. In this way a common identifier can be used for a single user, rather than separately using a user identifier when the user is using a computing device and another identifier when the user is using another device, such as a smartphone.

Figure 15:
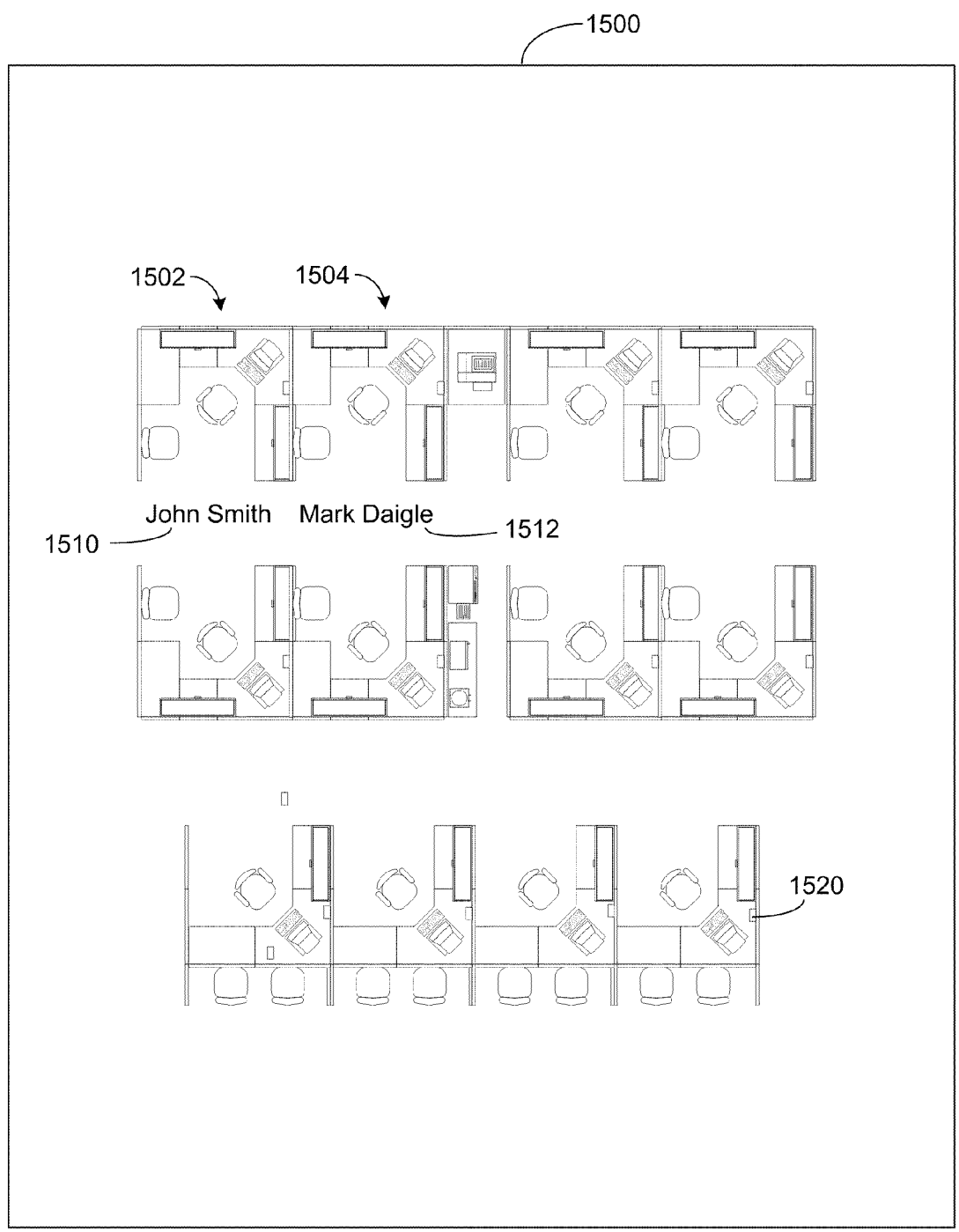
FIG. 15 is a schematic screen shot of another exemplary user interface according to the present disclosure.

FIG. 15 is a screen shot of an exemplary user interface 1500. User interface 1500 shows a floor plan for a particular building. The floor plan includes a plurality of workstations, including workstation 1502 and workstation 1504. User identifiers are associated with some of the workstations, such as user identifiers 1510 and 1512. An example graphical representation of a data packet generator 1520 is shown.

In some embodiments, user interface 1500 is a screen displayed by a Computer-Aided Design (CAD) software application configured for use in facilities management.

In some embodiments, user interface 1500 is dynamically updated to show current data. For example, a user identifier 1510 or 1512 is updated to show the name of the user that is currently using the respective workstation. In this example, John Smith (user identifier 1510) is currently using workstation 1502 and Mark Daigle is currently using workstation 1504. If either user switches to a different workstation, the user identifiers are updated to reflect the change. In addition, if no user is associated with a particular workstation, the workstation is so identified. This allows a user to be instantly located within a building and for associated records to be dynamically updated. For example, internal mail routes are updated to deliver mail to the user at their current workstation. Therefore, in some embodiments, data displayed on user interface 1500 represents real-time data. In some embodiments, real-time data includes data that was acquired within the past 24 hours. In other embodiments, real-time data includes data that was acquired within the past 12 hours, 6 hours, 4 hours, 2 hours, 1 hour, 30 minutes, 15 minutes, 10 minutes, 5 minutes, 1 minute, 30 seconds, 15 seconds, or 1 second. In other embodiments, user interface 1500 displays information based on compiled or historical data over a period of time. In yet another embodiment, user interface 1500 displays projected data, such as determined by extrapolating or projecting from real-time data and/or compiled or historical data.

In some embodiments, an occupancy field is updated with a code representing whether the workstation is unoccupied (e.g., "0" for a vacant workstation) or occupied (e.g., "1" for an occupied workstation). Further, in some embodiments real estate utilization records are updated according to the occupancy information. In some cases the capacity of a station is also considered. In this case the facilities manager typically defines the capacity. For example, a certain cubicle can house two contractors, that cubicle is assigned a capacity of two (2). Location authentication data can then be used to reveal when this cubicle is occupied but not at full capacity.

Some embodiments include a data packet generator layer in a CAD system. The data packet generator layer identifies all of the data packet generators present in a floor plan, and includes information about the data packet generators, such as an identifier of the data packet generator (e.g., a serial number), an identification of the location of the data packet generator, a graphical representation of the data packet generator (e.g., 1520 shown in FIG. 15), and any other desired information. An example of a CAD program is a Computer Aided Facility Management (CAFM) application. Examples of commercially available CAFM systems include Tririaga, Manhattan CenterStone, FM: Systems, Archibus, and others. Some embodiments utilize or interface with Integrated Workplace Management Software (IWMS). Some embodiments are Web based CAFM applications, other embodiments are local software applications. In some embodiments, one or more CAFM drawings are geospatially aligned in a GIS program. When the data packet generators are recorded as a layer in a geospatially aligned CAFM program, the latitude, longitude (and sometimes altitude) of those data packet generators can then also be known. This is useful, for example, to permit the data from data packet generators to be used by other location based applications, or vice versa. This CAFM method of retrieving real-time latitude, longitude (and sometimes altitude) allows an internal continuation of exterior GIS applications. The geospatially aligned CAFM method is used in some embodiments to acquire real-time latitude and longitude (and in some cases altitude) of a user or device or object without requiring GPS data (or in concert with GPS data), which is especially useful inside of buildings.

In some embodiments, historical trends are recorded according to user location information. Historical trend information is very valuable to a business, as it allows a business to most effectively utilize their space. Since real estate is the second largest expense for many companies, improved space utilization will sometimes save a company a large amount of money. For example, historical trend information is used to determine that a particular workstation was only occupied 10% of the time. As a result, the space may be reassigned to another user or group of users that will better utilize the space. In another example, a large space may be identified as being a candidate for subleasing opportunities if the space is only rarely used. As another example, it may be determined that a particular group needs a larger space, while another group could make due with a smaller space. A software program is used in some embodiments to automatically evaluate historical trend information to suggest improvements in space utilization efficiency.

Employee/user privacy is an important consideration. In some embodiments occupancy is tracked without identifying the particular employee. For example, in some embodiments a passcode (or data packet) is requested or received without a username or password. As a result, the occupancy, vacancy, and remaining capacity information for the station is obtainable without requiring that the employee identify themselves.

In another embodiment, user location information is tracked without storing time information. For example, some embodiments operate to avoid storing data that would identify a login and a logout time of an employee. For example, data is stored to identify occupancy information without storing the beginning and ending times that the space was occupied. Other privacy concerns should be carefully weighed to prevent employee or user privacy from being invaded.

In some embodiments, an authentication system includes a moves/adds/changes (MAC) management system. The MAC management system processes data relating to planned moves and work orders within a facility. Location information is used, for example, to identify vacant spaces as spaces to which an employee can move. It is also useful to identify potential move collisions before they occur, such as when an employee is scheduled to move into a space that is currently occupied and not itself scheduled to be vacated.

In some embodiments, an authentication system is used to identify a location for a work request. For example, when the work request is made a data packet or passcode is also obtained automatically. Alternatively, when the work request is made, the requester provides the passcode with the request. The passcode is used to identify the location where the work is required. For example, the work request is a request for technical support made to an IT specialist. As another example, the work request is a request for medical attention. As yet another example, a work request is a request for office supplies or furniture. The person or software program receiving the request uses the passcode to identify the location for the work.

In some embodiments, location information is not used to update information dynamically, but rather to provide general space utilization data. For example, data may be gathered over a period of time (e.g., 24 hours) and then compiled into space utilization summaries over the period of time. In this example, incorrect passcode entries could be ignored as it would likely not have a significant impact on the overall utilization statistics, at least not in a large organization.

Figure 16:
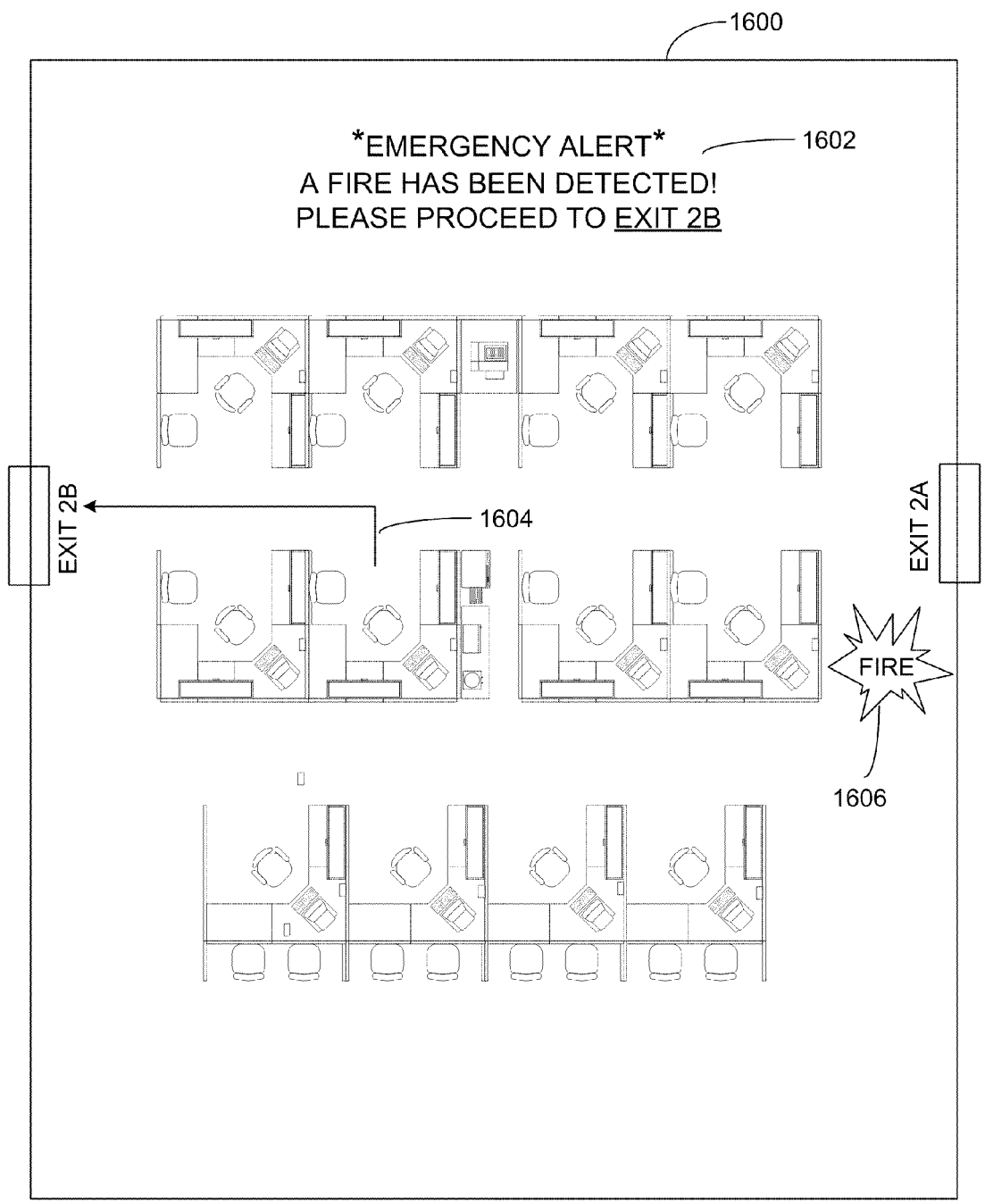
FIG. 16 is a schematic screen shot of another exemplary user interface according to the present disclosure.

FIG. 16 is a screen shot of an example user interface 1600 displaying an emergency alert. This example illustrates an embodiment which provides wayfinding, and more particularly interactive wayfinding. The user interface 1600 includes an emergency message 1602, custom evacuation directions 1604, and other emergency information, such as a graphic 1606. In some embodiments a software application generates and displays user interface 1600 on a computer screen of a user when an emergency is detected. The user interface provides customized information to the user to guide the user in the safest way to evacuate the building. The location of the user is determined, in some embodiments, by the server receiving a passcode that originated from a data packet generator at the user's location.

When an emergency is detected, such as a fire, user interface 1600 is displayed on the screen of the user. In some embodiments, user interface 1600 is a popup window. In other embodiments user interface 1600 is a full screen display that obscures all other information displayed on the computer screen.

The user interface 1600 may include emergency message 1602. The emergency message warns the user of the emergency and provides instructions to the user explaining what the user should do. For example, the emergency message 1602 says "EMERGENCY ALERT—A fire has been detected! Please proceed to Exit 2B." Some embodiments provide detailed evacuation directions (e.g., exit your office to the left, proceed to the end of the hall and exit through door 2B"). Any other information may be displayed. In this embodiment, user interface 1600 also includes custom evacuation directions 1604, which in this example provides the directions graphically, indicating that the user should exit through Exit 2B and showing the best path to take to get to the exit. The directions are customized for each user, in some embodiments. Customization may take into consideration various factors, such as the location of the fire, the number of people in a given area, and the path that others will be taking to evacuate the building. In this way, for example, a user is guided to go to Exit 2B rather than Exit 2A, because the fire is near Exit 2B (as illustrated by a "FIRE" graphic 1606). As another example, the customized directions for neighboring workspaces may also direct the users to Exit 2B so that all of the people are moving in the same direction, rather than going against the flow of evacuation. In some embodiments the evacuation plan is customized to evacuate a maximum number of people as quickly and safely as possible.

User interface 1600 may also include other information 1606, such as an identification of the location of the fire, or any other emergency information that may be helpful in safely evacuating people from the building.

In addition to guiding tenants and users, user interface 1600 is also or alternatively used in some embodiments to provide wayfinding for third parties. For example, first responders or other emergency personnel uses user interface 1600 to determine what instructions have already been given, and/or to guide them to a place where their assistance is needed. In some cases the first responders may be granted independent access to the remote server (such as when an IT system at the emergency site is not operational.)

Other embodiments are used for other purposes. For example, security guards are required to enter passcodes as they perform their security checks within a building. By doing so, the security guard confirms that the security guard was at a particular location at a particular time. Alternatively, the passcodes are obtained automatically by a computing device, such as a smart phone, that is carried by the security guard. This provides a method of verifying, for example, that routine security checks are performed. Similarly, other embodiments are used to confirm that a person made it to a particular location (e.g., a user made it to a location for a treasure hunt, or made it to the top of Mt. Everest, etc.).

In some embodiments a computing device is identified by a unique identifier. When a user logs into the network, for example, the server determines what device is logging in by checking the unique identifier. For example, a computer may have an identifier "473.AXZ.127.839JK8." The computer automatically communicates the identifier without requiring a user to manually enter the identifier. Once both the identity of a device is known and a passcode of an associated data packet generator are known, the location of a particular device is also known. As noted above, computing devices are not only computers, but also include mobile devices such as cell phones. Further, if a computing device has a way of determining what other devices or objects are around it (such as with an RFID system, barcode scanner, etc.), this information may also be communicated to a server to identify the location of the other devices or objects as well.

Figure 17:
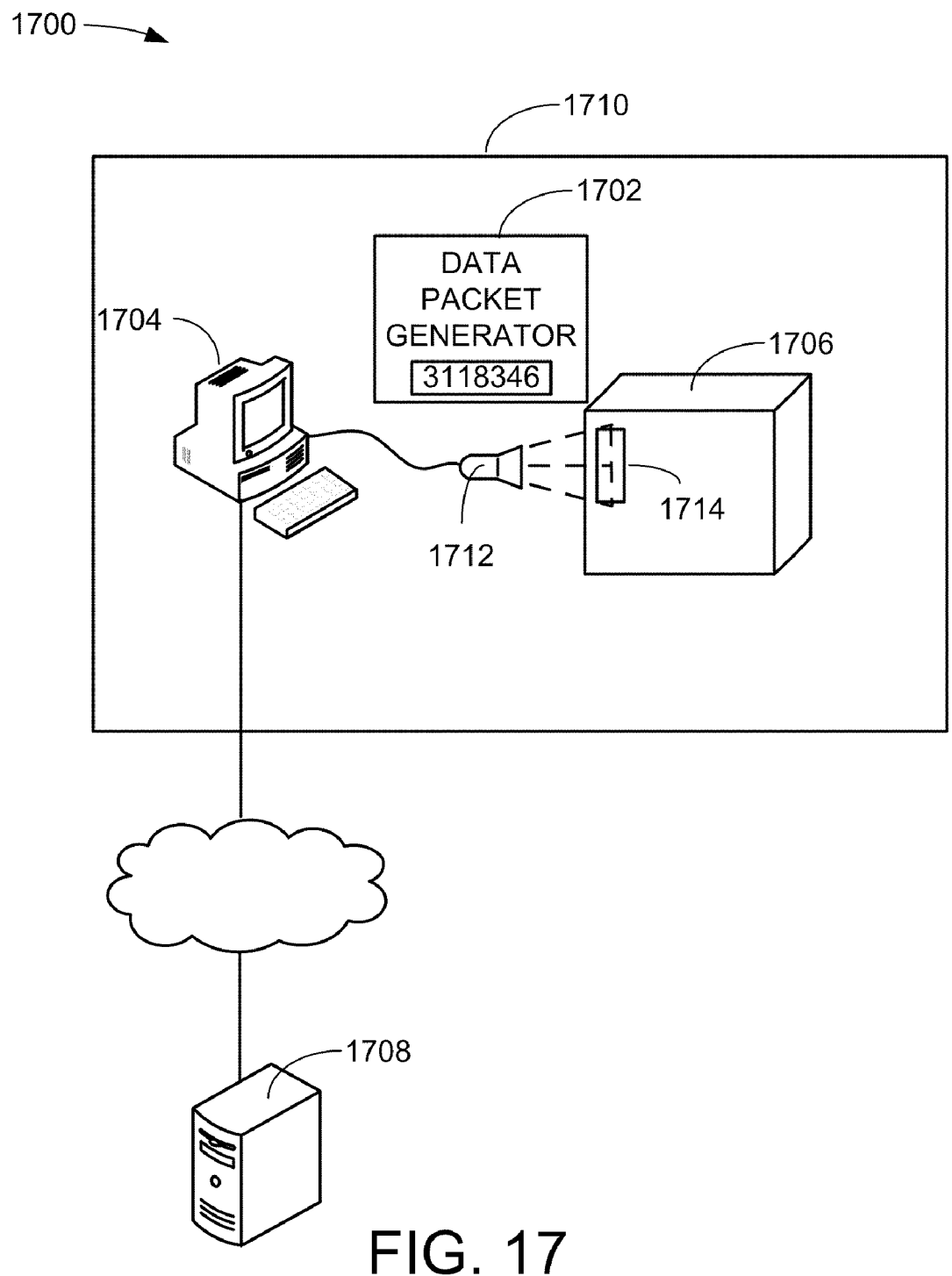
FIG. 17 is a schematic block diagram of another exemplary authentication system according to the present disclosure.

FIG. 17 is a block diagram of another exemplary embodiment of an authentication system 1700. Some embodiments are alternatively referred to herein as asset management systems. Assets may include any object or device. Specifically, in some embodiments, authentication system 1700 is used to authenticate the location of something other than a user or a computer, and/or in addition to a user or a computer.

Authentication system 1700 includes data packet generator 1702, computing device 1704, object 1706 and server 1708. Data packet generator 1702, computing device 1704, and object 1706 are located within workstation 1710 in some embodiments. Server 1708 is typically not located within workstation 1710. Computing device 1704 includes an input device 1712. Object 1706 includes an identifier 1714. In some embodiments, the identifier 1714 is an asset tag 1714. In other embodiments, authentication system 1700 is used to authenticate an object, identify an object, obtain additional information about an object, or for other purposes.

In some embodiments, data packet generator 1702 operates to generate a code periodically, such as described herein. In some embodiments, data packet generator 1702 displays the code on a display that is visible to a user. In other embodiments, a code or data packet is generated by the data packet generator 1702 and communicated automatically (such as across one or more data communication wires or wirelessly) to computing device 1704 or server 1708. Data packet generator 1702 is typically attached to workstation 1710 or to a device or object within workstation 1710. In some embodiments, the location of data packet generator 1702 is known by server 1708. For example, in some embodiments the location of the data packet generator 1702 is recorded in a CAFM system when the data packet generator 1702 is installed, or in a table or database at the server 1708. In some embodiments the location is identified and/or confirmed through the use of a mesh network of data packet generators, as described in more detail herein.

In some embodiments data packet generator 1702 is integrated with computing device 1704. In other embodiments data packet generator 1702 is in data communication with computing device 1704. In yet another embodiment, data packet generator 1702 is a software module operating on computing device 1702. In another embodiment, data packet generator 1702 is in data communication with server 1708 across the network. In a further embodiment, data packet generator 1702 is a material that is configured to provide a value to computing device 1704, and computing device 1704 uses the value and the current time to compute a passcode. Examples of such a material are described below. Some of these embodiments benefit from an automated process of providing a passcode to (or generating a passcode with) a computing device without the need for a user to manually enter the passcode.

Examples of computing devices 1704 are described herein, but one example of a computing device is a handheld device (such as a handheld device used for computer aided facility management). Computing device 1704 is configured to communicate with server 1708, such as across a network. Computing device 1704 includes an input device 1712 that is used to read an identifier 1714 associated with object 1706. In the illustrated embodiment, input device 1712 is a barcode reader. In other embodiments, input device 1712 is another input device, such as a keyboard, mouse, touch screen display, charge-coupled device (CCD), scanner, RFID reader, or other input device.

Object 1706 is any movable object where the location of the object 1706 is desired to be known or tracked. Examples of object 1706 include a box, sheet of paper, piece of mail, printed document, file, electronic device (such as a monitor, television, video projector, VoIP telephone, etc.), artwork, workstation component, machine part, machine, etc.

Object 1706 includes an identifier 1714. An example of identifier 1714 is a barcode. Other examples of identifier 1714 include an identification number, a serial number, a symbol, a name, or any other identifier. In some embodiments the identifier is a part of object 1706, in other embodiments the identifier is printed on object 1706, printed on a label adhered to object 1706, or stored within a device in or attached to object 1706 (such as an RFID tag), or otherwise associated with object 1706.

In some embodiments identifier 1714 is an asset tag, such as an RFID tag or an asset tag configured to communicate according to one or more of the 802.11 wireless communication protocols.

Examples of server 1708 are described herein. Server 1708 operates to validate a passcode as being generated by data packet generator 1702.

In some embodiments, location authentication system 1700 operates to authenticate the location of object 1706. Some embodiments include a method of authenticating the location of object 1706 including some or all of the following operations.

In this example, object 1706 is first brought into or near to workstation 1710. In some embodiments a computing device is initially authenticated as being at a particular location, such as by entering a passcode into the computing device. Once the location of the computing device is known, then the objects (e.g., object 1706) may also be authenticated as being at that location. For example, a user operates computing device 1704 to input object identifier 1714 into computing device 1704. Alternatively, if the location of the computing device is not initially authenticated, the user may also enter a passcode along with the object identifier to provide location information. In some embodiments, barcode reader 1712 is used to scan identifier 1714 to input the object identifier 1714 into computing device 1704.

In another embodiment, a passcode is automatically provided by data packet generator 1702 into computing device 1704. In another embodiment, data packet generator 1702 is a software module operating on computing device 1704 that generates the passcode. The passcode is authenticated by server 1708.

Upon validation of the passcode from data packet generator 1702 and receipt of a valid object identifier 1714 (which in some embodiments is itself validated by server 1708), the location of object 1706 is validated as being within workstation 1710. In some embodiments, a check-in process is used when an item arrives at the workstation. In other embodiments, a check-out process is also or alternatively used to identify when an item leaves the workstation.

In another possible embodiment, the data packet generator 1702 is configured to receive a message from server 1708 (such as across the network, via computing device 1704, or from another data packet generator) to check for asset tags 1714 in the vicinity of the data packet generator 1702. Upon receipt of the message, data packet generator 1702 checks for asset tags 1714. Alternatively, data packet generator 1702 is configured to automatically check for asset tags periodically or at a predetermined time.

To check for asset tags 1714, in some embodiments the data packet generator 1702 transmits a message wirelessly and monitors for a response. Alternatively, rather than transmitting a message, data packet generator 1702 monitors for a wireless transmission from asset tags 1714, which operate to broadcast information periodically or at a predetermined time. The received information is then stored by the data packet generator 1702, and in some embodiments is transmitted back to server 1708.

If object 1706 is moved to another location, any of the processes described above are used to update the location of the object as being at the new location.

Authentication of the location of an object is useful in many applications. For example, it is used in some embodiments to track the location of a file, a piece of mail, furniture, or any other object. The location may be tracked within a building, or anywhere in the world, so long as components of the location authentication system 1700 are available at the location of the object. It is recognized that the process may be automated in some embodiments, such that a user does not need to manually enter data.

Some embodiments include other features. For example, in some embodiments the system 1700 receives an input identifying where an object should be delivered to, this information is stored on the server for subsequent use. In some embodiments server 1708 retrieves the delivery information when an object is checked in and indicates at the point of delivery whether or not the object has been delivered to the correct location. Further, a summary of move information is provided to a move coordinator at the end of the move that acknowledges that every object was picked up and that every object was delivered to the appropriate location. Additional details may be stored for further reports, such as the details of when an object was picked up, who picked it up, when it was picked up, where it was delivered to (and any intermediate stops along the way), who delivered it, and what time it was delivered. If any object has not been properly moved, the information is available immediately in some embodiments, so that the object may be located.

Some embodiments of authentication system 1700 (or other embodiments described herein) are implemented in a virtual reality environment. Various virtual reality environments are currently in existence. One example is the SECOND LIFE® world. In a virtual reality environment, devices are implemented as objects in the virtual reality environment by data instructions executed by a tangible computing device, such as the computing device shown in FIG. 54 herein. The objects perform the functions described herein, but do so in some cases in the virtual reality environment, rather in the tangible world. In some embodiments portions of authentication system 1700 (or other embodiments described herein) are at times tangible while other portions are at times objects in the virtual reality environment. Any of the objects described herein (and other objects) can similarly be represented in some embodiments as virtual objects in a virtual reality system, and utilize the systems and methods described herein.

In some embodiments the virtual reality environment is configured to display a passcode directly with a three-dimensional object. Due to the fact that computers operate to generate the three-dimensional environment, the functions of a data packet generator may be performed without the need for a virtual three-dimensional representation of a physical data packet generator. Rather, the code may be output directly, such as so that it is visible on a surface of the object. For example, a passcode is associated with a pet in some embodiments so that the passcode is visible upon close inspection of the pet. The passcode is then used in one of the various manners discussed herein, such as to determine the owner of the pet and return the lost pet to the owner.

Another possible alternative to the system illustrated in FIG. 17 is a system in which data packet generator 1702 is itself attached to or integrated with object 1706. For example, equipment in a hospital may be equipped with a data packet generator. The passcode generated by data packet generator 1702 is entered into computing device 1704 at various possible times (such as when the object is brought to a new location or when the object leaves a location). In this way the location of the object may be tracked throughout the hospital. Alternatively, the code may be provided directly to a server whenever the equipment is turned on. In some embodiments, the passcode or other data is transferred automatically from the data packet generator 1702, as discussed herein.

As employees become increasingly mobile, some employees are no longer assigned to a particular office space. Such employees may, however, wish to store a small amount of their belongings at the facility, rather than transporting everything with them each time they leave. To accommodate this, some embodiments include hoteling packages. Hoteling packages are enclosures that are each assigned to a particular person. The person can store items (including writing instruments, books, calculators, rulers, documents, or any other personal belongings or business items) in the hoteling package. In some embodiments the hoteling package includes an asset tag that identifies the hoteling package. In some embodiments the asset tag is an active device (such as a device that wirelessly transmits asset tag information), or a passive device (such as one that displays asset tag information in the form of a code or barcode). Server 108 monitors the locations of the hoteling packages using the asset tags, according to the methods described herein. In this way, the employee can leave the hoteling package at the facility when the employee leaves, and can quickly locate the hoteling package again the next time he or she returns (or remotely via a computing device). In some embodiments the hoteling package includes a slot for receiving mail, such that the hoteling package can provide the additional function of receiving mail, such as when stored in a mail room.

As mentioned above, systems and methods disclosed herein are used in some embodiments to identify the location of a telephone, such as a voice over Internet protocol (VoIP) telephone. For example, a data packet generator is integrated with a VoIP telephone or in data communication (either wirelessly or via one or more wires) with a data packet generator. Accordingly, using the systems and methods disclosed herein, the location of the VoIP telephone can be identified. This location is used to inform an emergency responder, telephone company, 911 emergency system, caller ID system, (or other person or system) of where the call originated from.

Figure 18:
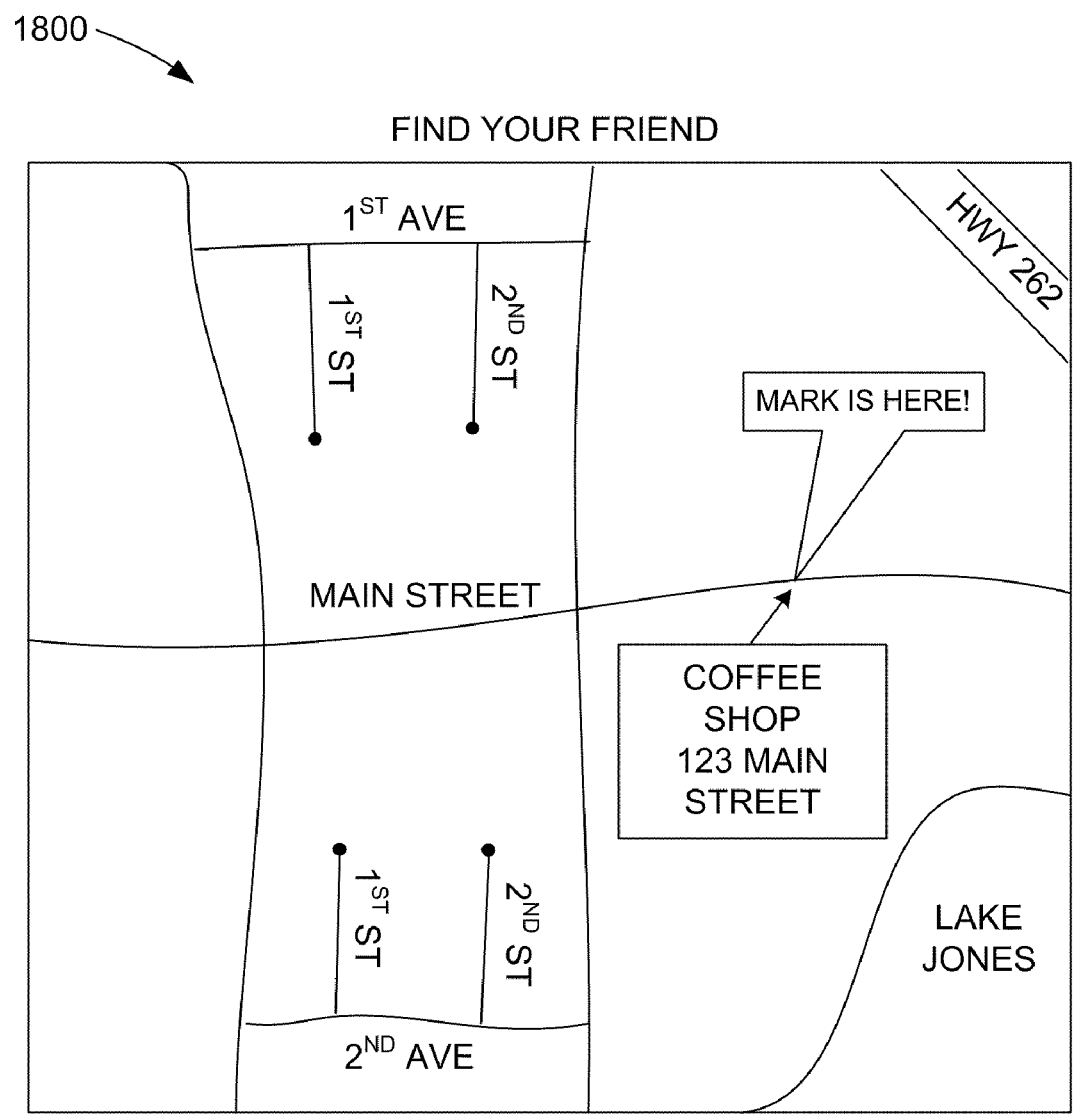
FIG. 18 is a schematic screen shot of another exemplary user interface according to the present disclosure.

FIG. 18 is a screen shot of a user interface 1800 generated by another exemplary embodiment of a location authentication system. In this example, a location authentication system is used to show the location of a person through a user interface, such as a Web site.

An example location authentication system will first be described. The location authentication system includes in some embodiments a data packet generator located at a retail establishment, such as a coffee shop. The data packet generator is, for example, hung on the wall so that it is easily visible by customers in the coffee shop. The system also includes a computing device, such as a public computer terminal supplied by the coffee shop, or a device carried by the user, such as a laptop, PDA, cell phone, or other computing device. The user uses the computing device to log into a social networking Web site, for example. In some embodiments the login process requests a username and password (although login is not needed in all embodiments, such as if the computing device has previously recognized the user) but other login processes are used in some embodiments. The login process is used to identify a user (e.g., Mark), or typically at least to associate the user with a username or other identifier. Once logged in, the site includes a module that allows the user to enter a passcode to identify the user's current location. The user initiates the module and enters the passcode displayed by the data packet generator. The Web site then validates the passcode and determines the location of the user as being at the coffee shop.

User interface 1800 is an exemplary user interface displayed by a social networking Web site. The user interface is displayed to a user of the social networking Web site, such as a friend (e.g., Sally) after the friend has logged into the Web site and initiated a module to locate Mark. The Web site includes, for example, a map displaying the location of Mark at the coffee shop located at 123 Main Street. Sally may now use this information to meet up with Mark at the coffee shop. The location authentication system may also be useful for a child to confirm their location to a parent. It is also possible for the coffee shop to have three or four of our devices next to three or four common social phrases. For example. One data packet generator is next to a phrase that says "Come meet me at this location". Another data packet generator says, "I'm leaving this location now". Then, when the user enters that passcode it not only authenticates that the user was at the location but it also communicates a message simultaneously. Alternatively, in some embodiments a software application identifies the available phrases automatically, such as by receiving a data packet from the data packet generator wirelessly (or via one or more communication wires). The data packet includes the respective code and the associated phrase. The software then displays the available phrases to the user, who selects the message to be communicated. In this example, the user does not have to manually enter the passcode.

Due to privacy considerations, it is strongly preferred that embodiments for locating people do so only when a person specifically wants to be located, such as when the person himself enters a code indicating a desire to be located. In addition, it is strongly preferred that such location information be provided only to a select group of people, such as a trusted group of friends. In some embodiments the information is communicated only to a single person or group of people that have been identified by the user as intended recipients of the information.

Although user interface 1800 is described above as a user interface of a Web site, other embodiments communicate information in other manners, such as through an e-mail message, a text message, and the like. Similarly, the information is used in some embodiments to communicate a message across an existing system, such as Twitter, Facebook, other social networking sites, or other communication systems.

In some embodiments described above, authentication systems are used to authenticate a location of something. Other possible embodiments involve an object identification system that may be used to authenticate the identity of an object. In such an embodiment, for example, a data packet generator is attached or otherwise connected or associated with an object. The code generated by the data packet generator may be entered into a computing device and sent to a server for validation. The server validates the code as a valid code and then retrieves an identity of the object associated with the data packet generator that generated the passcode from a database. Other information may also be associated with the object in the database, if desired. Such an object identification system is useful in a wide variety of applications. For example, a data packet generator may be connected to or integrated into a piece of artwork. The object identification system operates to authenticate the object as being a particular object, such as an original painting or sculpture by a particular artist, or a pallet used in shipping applications. In some embodiments the retrieval of data packets from data packet generators associated with the object is performed automatically. Nearly any object can be associated with a data packet generator.

Another example of an object authentication system involves a sheet of electronic paper or other display system. The electronic paper displays a document, for example and/or also operates as a data packet generator to display a code that is updated periodically. The code may be used to authenticate the identity of the document displayed by the electronic paper. In some embodiments, the electronic paper may be used to bridge the gap between digital data on a computer and physical documents or objects. In other embodiments, a document may be printed having a static passcode printed thereon. The passcode may be used to authenticate the source of the document or other information about the document known by the server (such as the time it was printed, who printed it, etc).

As just one example, electronic currency could be displayed on electronic paper in the form of tangible currency. The currency displays a passcode that is updated periodically that may be used to authenticate the currency. In some embodiments the tangible currency displayed on electronic paper is converted into electronic currency, such as by transferring an equation or other digital data relating to the currency to another electronic device and removing the equation or other digital data from the electronic paper. The electronic currency is transferable, such as by transmitting the equation or other digital data across a network, such as the Internet or a telephone network. Similarly, the electronic currency is then converted back to tangible currency by transferring the equation or other digital data back to the electronic paper.

In other possible embodiments, a Web address (e.g., uniform resource locator) is printed on the document. The Web address points to a Web site that displays a dynamic passcode associated with the document. The dynamic passcode may be used for authentication as described herein. In another possible embodiment, a Web address and a code or value is printed on the document. Upon accessing the Web site identified by the Web address, the code or value is entered to enable the passcode to be displayed or generated.

Another exemplary application for an object authentication system is an Internet based lost and found. When an item is found that contains a data packet generator, the code is used to return the lost item to its rightful owner. For example, the person that finds the item (sometimes referred to herein as the finder) may read a label printed on the item that directs the finder to log onto a particular Web site. The finder does so and is then prompted to enter the code currently displayed by the data packet generator. Upon entering the code, the item is identified by a server. The server may also request information about the finder, such as a telephone number, e-mail address, or mailing address where the finder can be contacted. The server then identifies contact information associated with the original owner in the database. This information was, for example, previously provided by the original owner. The server then sends the finders contact information to the original owner to allow the original owner to contact the finder to arrange for pickup or delivery of the object. Examples of tangible objects include electronics (computers, MP3 or MP4 players, stereos, DVD players, telephones, smart phones, etc.), valuables jewelry, money/currency, gold, antiques), pet collars, boxes, furniture, pens, wine bottles, artwork, pavement, credit cards, currency, vehicles, phones, shoes, medical equipment, car keys, documents, chairs, pallets, cubicle parts, bricks, plates, toys, or a wide variety of other objects. Some embodiments of the Internet based lost and found operate to maintain the privacy of the original owner by not disclosing information about the owner to the finder.

Other possible embodiments involve a person or company authentication system. In this embodiment, a person or group of people can be authenticated to another person or group of people. For example, in some embodiments a person uses the authentication system to authenticate communications as being from a vendor that the person has contracted with. The vendor agrees to provide either a dynamic or static passcode in all communications with the person as a way for the person to ensure that the communication is coming from the vendor. For example, an e-mail may include a dynamic passcode (e.g., one that changes periodically) while a document may include a static passcode. When a vendor e sends an e-mail message, for example, a passcode is supplied to the computing device, which is inserted or embedded into the e-mail message. When the e-mail message is received, the passcode is continually shown in the e-mail message whenever that message is read by the person. The passcode is then validated as a valid passcode by comparing the passcode shown in the e-mail to a passcode shown on the person's device. No data entry is required in some embodiments (such as if only a visual comparison is made to reassure the person). If the comparison is successful, the e-mail message is determined to have come from the vendor. Other communications may also be used. For example, a vendor employee reads the passcode into a telephone to initiate a telephone conference with the person or the vendor sends a document that shows a timestamp and a passcode that was valid at that time. Whenever the person wants to change vendors, all vendors need to be notified and the person's data packet generator needs to be updated via an input device or replaced with new data packet generators. In this way the person remains in control of which vendors know their current passcodes.

Yet other embodiments include a time verification system. The time verification system utilizes a data packet generator to authenticate a time at which an event occurs. The time verification system includes a data packet generator in which a passcode generated by the data packet generator changes periodically, such as once per minute. In some embodiments the data packet generator is integrated into another device. One example of a device is a digital camera. When the digital camera is used to take a photograph, the digital image is stored along with a passcode provided by the data packet generator. The passcode may subsequently be used to verify the time of an event shown in the photograph. Examples of such events include a car accident to prove the time the accident occurred to an insurance company, and a wide variety of other possible events.

Many of the embodiments described herein may also be used for time verification in addition to or as an alternative to the particular uses described herein.

Yet further embodiments involve authentication of a right to access information. For example, a digital data sharing system is provided by some embodiments. In this example, a user desires to purchase a digital copy of a song from a distributor, such as through the distributors Web site. The Web site includes an option to purchase a right to share the music with friends, such as to purchase three sharing credits to allow the user to share the song with three friends (or one friend three times, etc.) The user then downloads a digital copy of the song. The song display on the MP3 player then shows changing code next to the title. That code is unique not only to the song purchased but also to the original buyer (in other words somebody else purchasing sharing rights to the same song would not have the same code for the same song). Whenever the owner of the song feels so inclined, they can share the current code shown next to the title of the song with a friend. The friend enters the current code into their own device. Once the code has been authenticated by the server, the friend's device is given access to stream (not download or own) the song (such as one time during the next three days. In some embodiments, the friend cannot subsequently share the song with anyone else because the code is only valid for a short period of time. The transfer of passcode information can happen in person via text message, over the phone, etc.

In some embodiments, sharing is initiated by the user selecting a share icon in the music library (e.g., their iTunes music library) to initiate legal sharing. Upon selecting the share icon, a message is sent to a server (e.g., the iTunes server) that indicates an intent to share a song (or collection of songs) as well as the current rolling passcode associated with the song. In some embodiments the user also enters an identifier (such as an e-mail address) of a person that the song should be shared with. The server then authenticates the rolling passcode including the original purchasers name and whether their account is active for a charge. Once authenticated, the server then returns a message to the user's computing device, including a sharing passcode, which the user can give to a friend or other person. Alternatively, the server sends the passcode directly to the person that the song is to be shared with. In some embodiments the passcode is embedded in a link. In some embodiments the passcode is valid for a limited period of time, such as a predetermined number of minutes, hours, or days. If the passcode is used by the recipient to access the song, the sharer's account is charged and limited rights to access the music are granted to the recipient.

Some embodiments described above utilize a data packet generator that generates codes using a random number generation algorithm. In some embodiments the algorithm uses one or more input variables as inputs to the equation to calculate a passcode. The input variables are stored in memory, for example. Another possible embodiment, however, receives the input variables from another object, material, or device.

For example, if a data packet generator is attached to a desktop (such as illustrated in FIGS. 2 and 6), some embodiments of the data packet generator operate to receive an input variable from another object, such as the desktop itself. In this way the data packet generator is able to read input variables specific to the location of the data packet generator. The input variables are integrated, printed, embedded, or formed into the object, such as a desktop.

In one example, at least part of the desktop surface includes an at least partially conductive material. The conductivity of the desktop surface is made to match a predetermined conductivity (or range of conductivities). Probes from the data packet generator contact the desktop to measure a resistance between the probes, such as by applying a voltage between the probes. The resistance is measured and converted into an input variable that is then used by the random number generator. In some embodiments the data packet generator also uses the current time as an input to the random number generator, such that the result is a pseudorandom number that identifies the desktop to which the data packet generator is attached.

Another possible embodiment involves a series of dots on the surface of the object, such as a desktop. The dots are made of conductive polymers (such as polythiophenes, polypyrroles, etc.) or nonconductive polymers. The conductivity (or lack thereof) between any two of the dots is used to encode a value onto the surface which is read by the data packet generator as an input to the random number generation algorithm. Pins from the data packet generator contact each of the dots to determine whether the dot is conductive or non-conductive (or whether a resistance is above or below a predetermined threshold). If a dot has a low resistance, for example, the dot encodes a "1" value and if the dot has a high resistance, the dot encodes a "0" value. Any number of dots may be used to encode any number of binary digits. The binary digits may be converted into base 10 or another base if desired to provide an input value to the random number generator. In some embodiments the value is known by a server and is associated with a desktop that is known to be in a particular location. When the passcode is received at the server, the server is able to calculate the value that was used to generate the passcode, because the server knows the random number algorithm and the time at which the passcode was generated. Once the value is known, the location of the data packet generator is also known by matching the value with the stored location associated with the value. In some embodiments, then, simply placing the data packet generator onto a surface having the encoded value allows the server to identify the location when the passcode is received. Alternatively, the data packet generator itself is programmed to identify its own location upon detection of the value from the surface. The value may also be encoded in other locations, such as on a label affixed to an object or surface, or in a material printed onto a surface. In some embodiments different ranges of resistances are used to represent a particular value. For example, three values are encoded into a particular dot by using a material having a low resistance to represent a first value, a moderate resistance to represent a second value, and a high resistance to represent a third value. Any number of values may be encoded in a single dot by defining different ranges of resistances for each value.

In another possible embodiment, a value is encoded into a surface by dots that reflect different wavelengths of electromagnetic radiation. An ultraviolet (UV) camera is included in the data packet generator in some embodiments. The UV camera detects a color of light reflected from one or more of the dots when exposed to UV light. In this way the data packet generator need not be in physical contact with the surface or object. In some embodiments a material, such as a polymer, is used that degrades over a predetermined period of time to limit the usable lifetime of the material or perhaps to limit the readable period to within a particular window of time.

Figure 19:
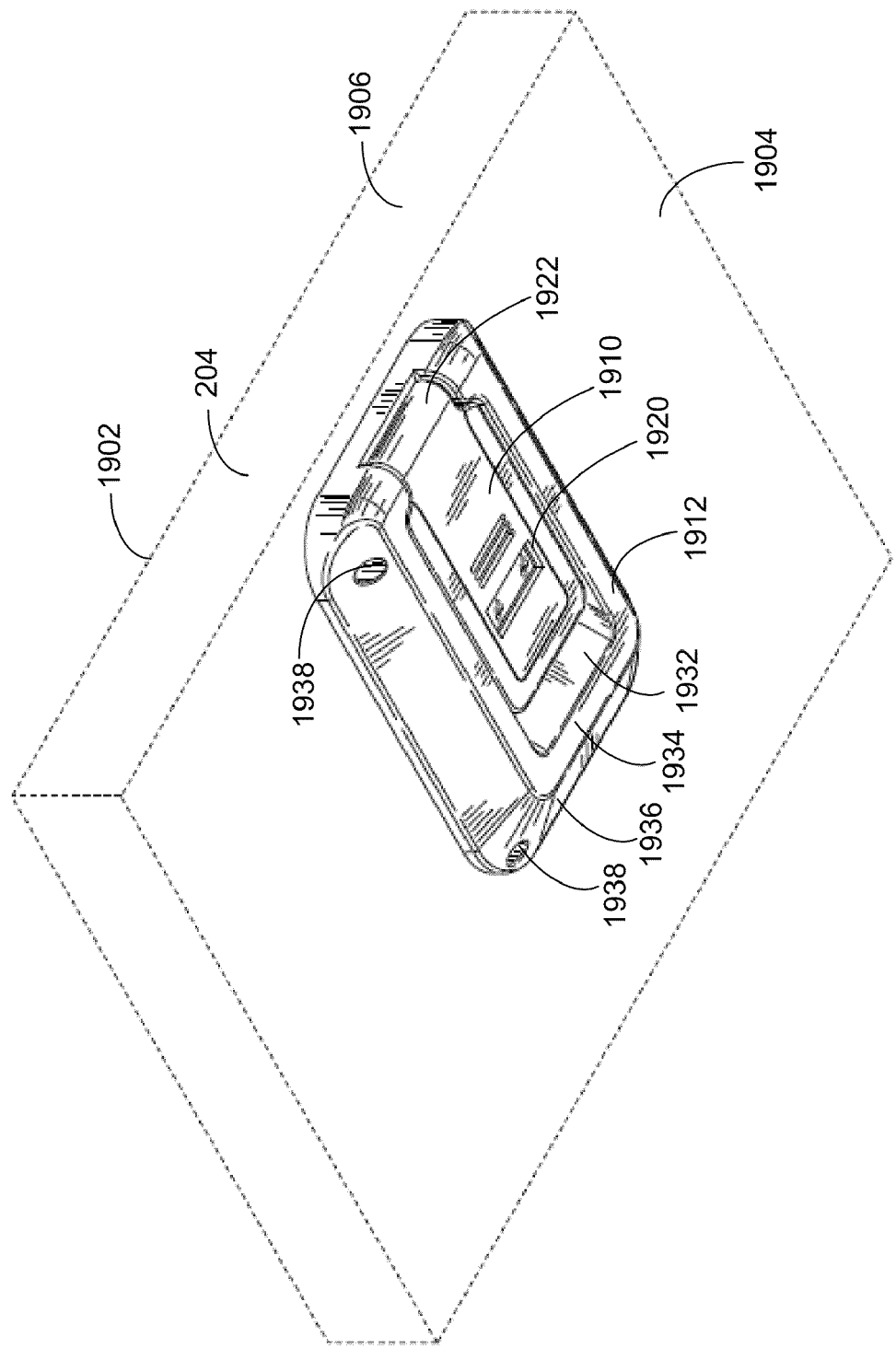
FIG. 19 is a bottom perspective view of another example data packet generator according to the present disclosure.

FIG. 19 is a bottom perspective view of another example data packet generator 1900 configured in a closed position. In some embodiments data packet generator 1900 is configured for connection to another object, such as desktop 204. In this example, desktop 204 includes a top surface 1902, a bottom surface 1904, and a front edge 1906.

In this example, data packet generator 1900 includes a housing having a first housing member 1910 and a second housing member 1912. First housing member houses a display 1920 that operates to display a passcode. First and second housing members are pivotally connected to each other at hinge 1922. When in the closed position, data packet generator 1900 is recessed from a lower surface 1934 of second housing member 1912 to protect the first housing member (and components contained therein) from inadvertent contact, such as from impact with a person's knee or leg, a vacuum cleaner, or any other object.

Second housing member 1912 includes a recessed region 1932 that is configured to receive the first housing member therein when in the closed position. Second housing member 1912 also includes a lower surface 1934 that protrudes beyond the recessed region and in some embodiments protrudes slightly beyond the lowermost surface of first housing member 1910. In some embodiments second housing member 1912 further includes tapered sidewalls 1936. Tapered sidewalls 1936 provide gradually sloping edges, rather than sharp corners, to prevent or reduce damage to a person, person's clothing, or another object that may come into contact with data packet generator 1900.

In some embodiments second housing member 1912 is an attachment device that allows data packet generator 1900 to be fastened to another object, such as bottom surface 1904 of desktop 204. Any suitable fastener can be used, such as a screw, nail, bolt, or adhesive. For example, screws are inserted into fastener holes 1938 to secure data packet generator 1900 to desktop 204. Data packet generator 1900 is preferably mounted slightly behind front edge 1906 to reduce inadvertent impact with a person or object, and in some embodiments to obscure or partially obscure the data packet generator 1900 from view under the desktop.

Recessed region 1932 typically includes a space between an end of first housing member 1910 (the end located opposite hinge 1922) and the adjacent edge of recessed region 1932. In some embodiments first housing member 1910 also includes a taper at that end (e.g., tapered end 1940 shown in FIG. 20) that further increases the space between first housing member 1910 and second housing member 1912. To remove first housing member 1910 from recessed region 1932, a user grasps first housing member 1910 (such as by inserting a finger into the space) and applies a force to first housing member 1910 away from second housing member 1912. The force causes the first housing member 1910 to pivot at hinge 1922 to advance first housing member to the open position illustrated in FIG. 20.

Figure 20:
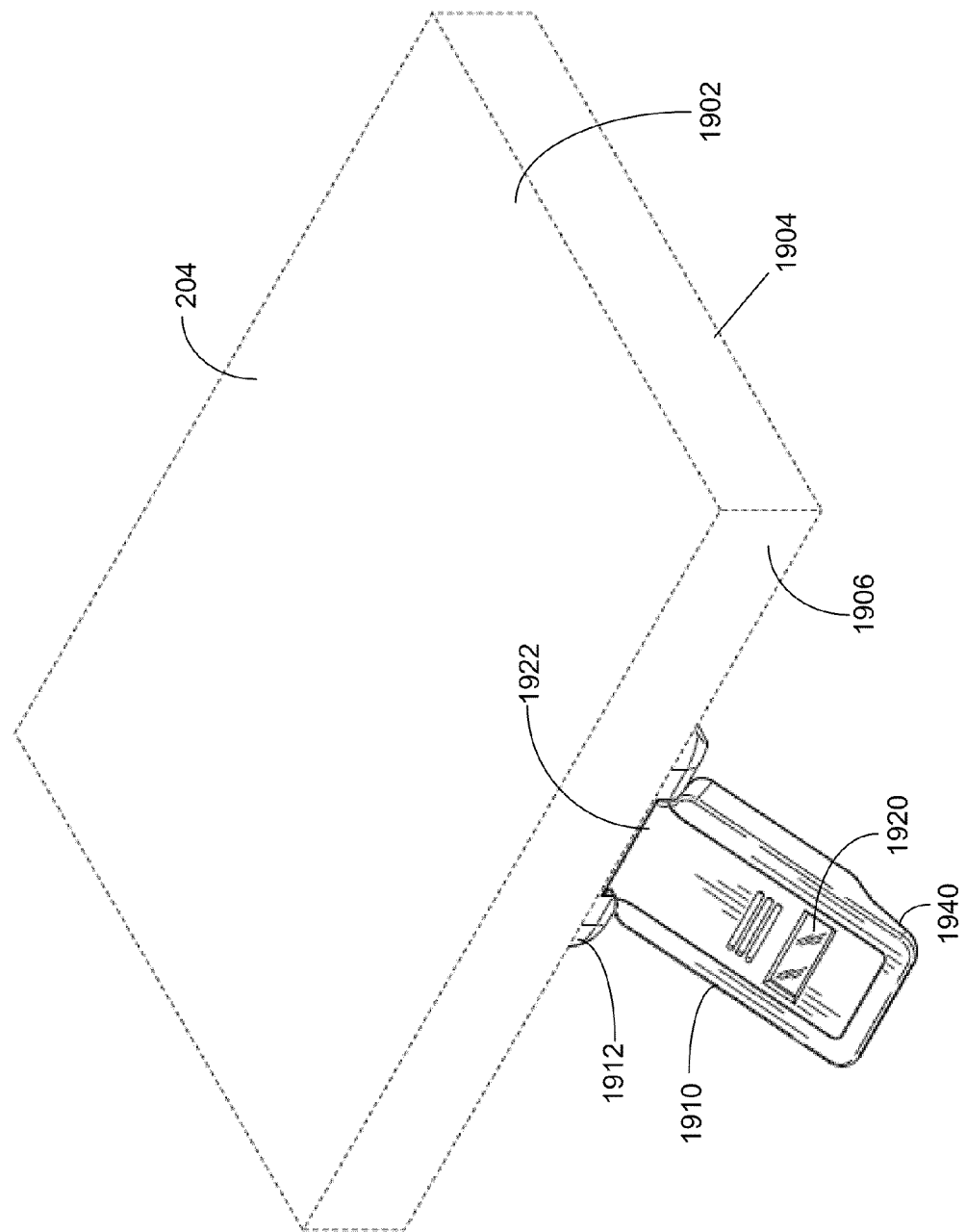
FIG. 20 is a top perspective view of the data packet generator shown in FIG. 19.

FIG. 20 is a top perspective view of the data packet generator 1900, shown in FIG. 19, arranged in an open position. Data packet generator 1900 is partially obscured in FIG. 19 by desktop 204, including a top surface 1902, bottom surface 1904, and front edge 1906. Data packet generator 1900 includes first housing member 1910 and second housing member 1912.

As discussed above, first housing member 1910 houses a display 1920 that operates to display a passcode. First and second housing members are pivotally connected to each other at hinge 1922. When in the open position first housing member 1910 extends out from second housing member 1912, and preferably extends beyond edge 1906 of desktop 204. In this way, a user in the vicinity of data packet generator 1900 can view a number displayed by display 1920, without the displaying being obscured by desktop 204.

Data packet generator 1900 is returned to the closed position shown in FIG. 19 by applying a force to first housing member 1910 toward second housing member 1912. The force causes first housing member 1910 to pivot about hinge 1922 until first housing member 1910 is arranged in recessed region 1932 (shown in FIG. 19).

Figure 21:
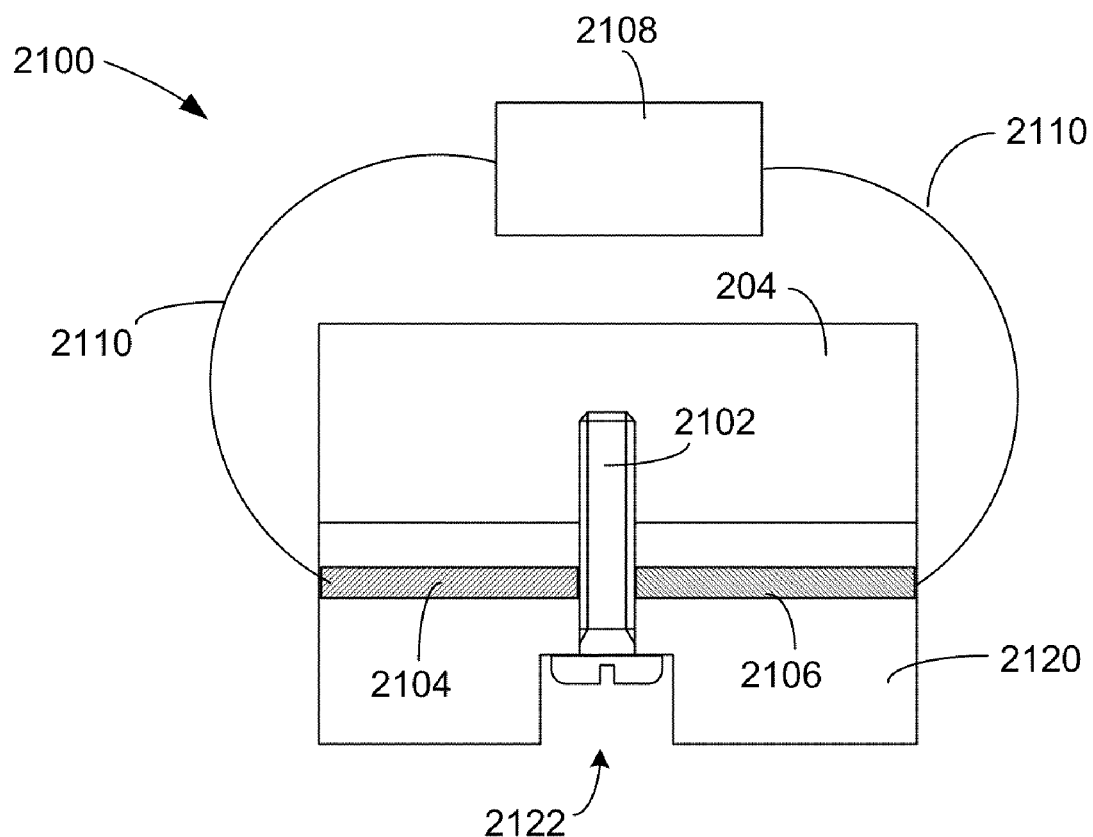
FIG. 21 is a schematic side view of an example tamper sensor according to the present disclosure.
Figure 22:
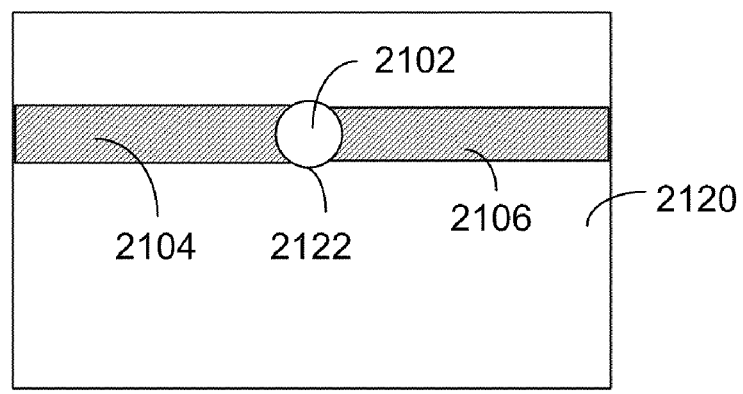
FIG. 22 is a schematic plan and cross-sectional view of the example tamper sensor shown in FIG. 21.

FIGS. 21-22 illustrate an example of a tamper sensor 2100. In this example, tamper sensor 2100 operates to detect tampering with a fastener, such as a screw 2102. FIG. 21 is a schematic side view of the example tamper sensor 2100. FIG. 22 is a schematic plan and cross-sectional view of the example tamper sensor 2100. Tamper sensor 2100 includes screw 2102, first conductive element 2104, second conductive element 2106, sensor 2108, and electrical conductors 2110. Tamper sensor 2100 is built into a data packet generator (such as data packet generator 1900). A portion of the data packet generator housing 2120 is shown including a fastener 2102 (e.g., fastener hole 1938).

A fastener hole 2122 is formed in the portion of housing 2120. Conductive elements 2104 and 2106 are formed on either side of fastener hole 2122, such that edges of conductive elements 2104 and 2106 extend to fastener hole 2122. Conductive elements 2104 are spaced from each other across hole 2122. Typically conductive layers 2104 are arranged in a common plane and spaced horizontally from each other. However, in another possible embodiment, conductive elements 2104 and 2106 are vertically spaced from each other. In yet another possible embodiment, conductive elements 2104 and 2106 are both horizontally and vertically spaced from one another.

When an electrically conductive fastener is inserted into fastener hole 2122, first conductive element 2104 and second conductive element 2104 become electrically connected through the adjacent portion of screw 2102. Sensor 2108 is also electrically connected to conductive elements 2104 and 2106 and operates to detect whether the conductive elements 2104 and 2106 are electrically connected to each other or not. After installation of a data packet generator, such as to desktop 204 (or another object), sensor 2108 is able to detect if one or more screws 2102 are removed, such as by applying a small current through conductive elements 2104 and 2106. When screw 2102 is removed, the current flowing through conductive elements 2104 and 2106 stops flowing. The sensor 2108 communicates this information to the microprocessor (e.g., 304, shown in FIG. 3), which determines whether action is necessary in response to potential tampering.

In some embodiments, such action includes recording the status of the one or more screws in memory. For example, when a change in status is identified, the status is stored in memory (e.g., screw 2102 not installed) along with a time stamp of when the change occurred. In some embodiments, this status information is subsequently transmitted to a server or other computing device, such as in a data packet.

Although fastener 2102 is described as a screw that mounts the body of data packet generator to another object, such as desktop 204, other fasteners can also be used. For example, in some embodiments the housing of the data packet generator is formed of two shells. Sensor 2108 can be used to detect tampering with fasteners used to connect the shells together. Fasteners can also be used to secure a battery compartment. Any such fastener may be monitored with sensor 2108 to detect tampering.

Other embodiments include other mechanisms for detecting tampering with fasteners. In some embodiments sensor 2108 operates to detect a change in resistance between conductive elements 2104 and 2106. When screw 2102 is removed, the resistance increases. Other embodiments of sensor 2108 use an alternating current (AC) signal rather than a direct current (DC) signal. A high frequency signal is applied to first conductive element 2104 and the resulting signal is detected at conductive element 2106. A change in one or more of various electrical characteristics can be detected to alert sensor 2108 to potential tampering. In other embodiments sensor 2108 monitors for any changes in static electricity. Magnetic or electric fields are generated and monitored by sensor 2108 in other embodiments.

In some embodiments, the data packet generator (e.g., data packet generator 1900, shown in FIG. 19) operates to take one or more actions upon the detection of a potential tampering event. Some possible actions include: entering a hibernation mode to cease generating subsequent passcodes; erasing data stored in memory, such as the algorithm used for generating passcodes, algorithm seed data, identifying information, or any other data stored in memory; sending a communication to another data packet generator or computing device; a combination of these actions; or other actions. In some embodiments the event is recorded in memory, and subsequently communicated via a data packet.

Examples of potential tampering events include: movement of the device (such as measured by an accelerometer or other motion sensor) that exceeds a certain threshold of time, distance, or intensity; absence of one or more fasteners from the data packet generator; retraction of a fastener beyond a threshold (such as if the fastener is retracted beyond one or both of first and second conductive elements 2104 and 2106); a lack of communication between the data packet generator and another device (such as another data packet generator, an RFID reader, or a computing device) for more than a predetermined period of time; or other measurable or detectable events.

Figure 23:
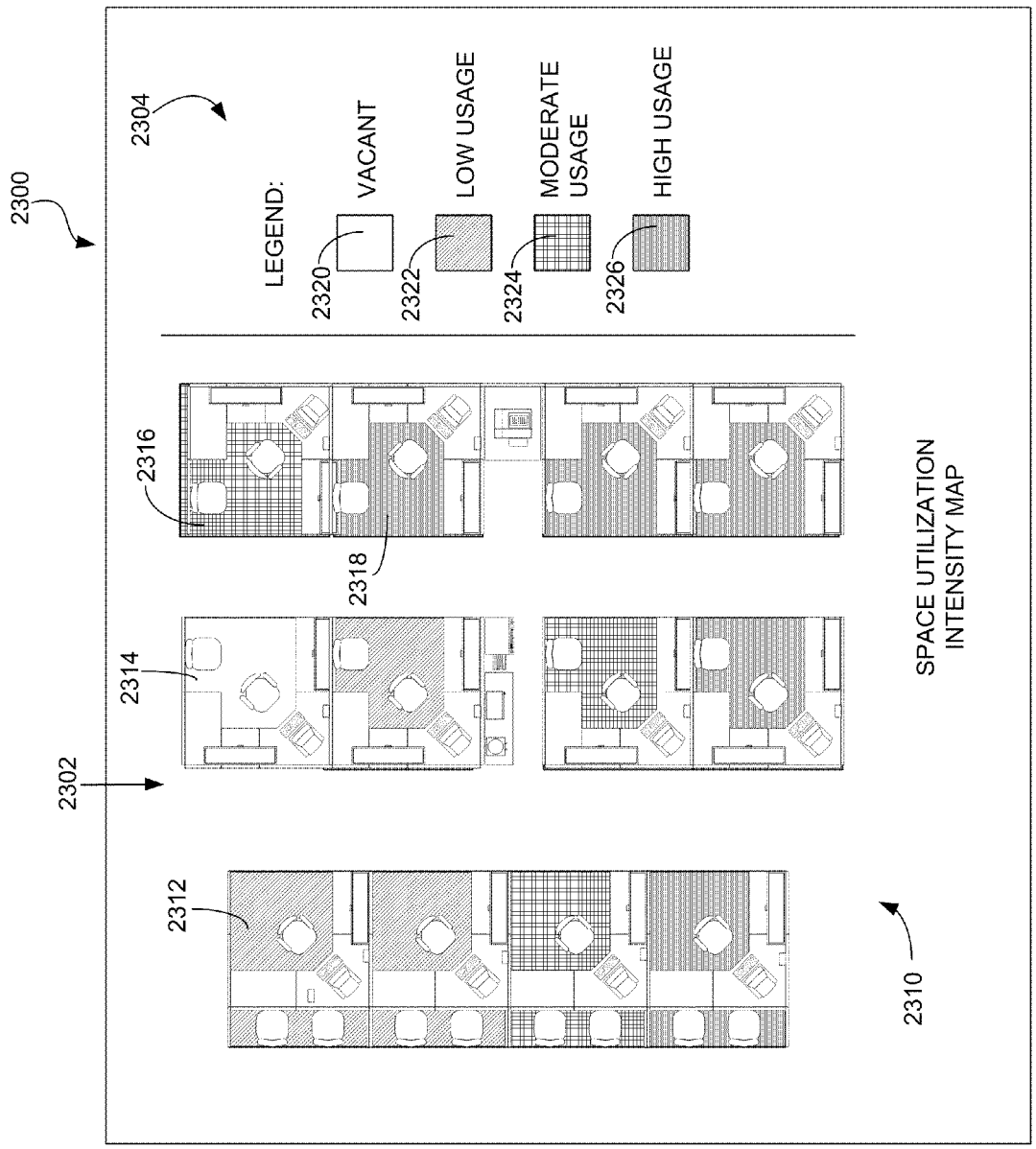
FIG. 23 is a screen shot of an example user interface displaying a space utilization intensity map according to the present disclosure.

FIG. 23 is a screen shot of an exemplary user interface displaying space utilization intensity map 2300. The intensity map 2300 provides a graphical representation of space utilization data gathered by a location identification system, which allows a user to quickly visualize the how space is being used.

In some embodiments, intensity map 2300 includes floor plan display 2302 and legend 2304. Floor plan display 2302 illustrates the location of a plurality of workstations 2310 (including workstation 2312, workstation 2314, and workstation 2316, and workstation 2318) at a particular location, such as on a first floor of a building.

A color is associated with each workstation 2310. Each color represents a different space utilization intensity level, as shown in legend 2304. Legend includes white background 2320, green background 2322, yellow background 2324, and red background 2326. White background 2320 is associated with a vacant workstation. Green background 2322 is associated with a low usage intensity. Yellow background 2324 is associated with a moderate usage intensity. Red background 2326 is associated with a high usage intensity. Any number of colors may be used in various embodiments, and any color can be associated with any usage intensity or range of usage intensities. Further, some embodiments use colors, text, patterns, textures, images, graphics, sounds, multimedia, or various other identifiers to indicate usage intensity or ranges of usage intensities.

Using data stored in the location authentication system database, intensity map 2300 is generated to visually depict the space utilization intensity of each workstation. In some embodiments, background colors are determined based on the percentage of normal business hours that a space is occupied. For example, a vacant space is a space that is used less than 5% of normal business hours. A low usage space is a space that is used from 5% up to 50% of normal business hours. A moderate usage space is a space that is used from 50% to 95% of normal business hours. A high usage space is a space that is used more than 95% of normal business hours. Other embodiments define space utilization intensities based on other percentages or on other periods of time.

In yet another embodiment, space utilization is defined by the number of people that utilize a space in a particular period of time, or at a particular time (e.g., whether a space is typically or currently occupied by one person, two people, three people, etc.). Further, some embodiments display usage statistics for larger spaces or groups of workspaces, such as entire floors, entire departments, entire buildings, or define other spaces other than single workspaces. Some embodiments display usage statistics for common spaces, such as conference rooms, hallways, reception areas, restrooms, or other common spaces. Further embodiments display usage statistics based on the percentage of the available space that is utilized, such as the percentage of space that is utilized for storage in a storage room, file room, closet, or computer room.

In this example, the background color of each workstation 2310 is displayed in a color representing the space utilization intensity. For example, workstation 2312 is displayed having a green background 2322, showing that workstation 2312 has a low usage intensity. Workstation 2314 is displayed having a white background 2320, showing that workstation 2314 has not been used during the observation period. Workstation 2316 is displayed having a yellow background 2324, showing that workstation 2316 has a moderate usage intensity. Workstation 2318 is displayed having a red background 2326, showing that workstation 2318 has a high usage intensity.

Usage data is gathered in some embodiments whenever a user logs into a computing device. For example, when a user logs into a computing device, the device prompts the user for a passcode. The user enters the passcode displayed on the data packet generator located in the workspace. The passcode is communicated to a server, which identifies the workspace and identifies the workspace as being in use.

In other embodiments, space usage data is compiled in other ways. For example, space utilization is tied to light usage in some embodiments. If the lights are on, the space is considered to be in use. Motion detectors are used in other embodiments. Yet other embodiments utilize other sensors. For example, a motion or weight sensor can be associated with a chair to detect when a user is sitting in the chair. The usage data is then communicated to a server using one or more communication devices. The usage data is then stored for subsequent use, such as to generate space utilization intensity map 2300.

As noted above, user privacy is an important consideration. It may be desirable to impose restrictions or limitations to data collection to protect user privacy. For example, in some embodiments, detecting when a user is sitting in a chair is limited to only short durations of time at infrequent intervals. Alternatively, though data collection may not be limited, the generation of reports can be limited to protect user privacy. However, it is noted that although some embodiments do collect space utilization data, some embodiments do not identify the user that is occupying the space. In these embodiments the data that is collected may only show that the space was used without providing any information to identify the particular user or users that were utilizing the space.

Space utilization intensity map 2300 is an example of a possible user interface display of a handheld inspection and maintenance device. Such an inspection and maintenance system is typically a portable device including a display, a data packet generator communication device, a network communication device, an input device (such as a touch screen or keypad), a processor and memory (e.g., a computing device). In some embodiments the handheld inspection and maintenance device displays a floor plan of a facility where the inspector is currently located. Location information is determined, for example, by receiving communications from nearby data packet generators that (e.g., through communication with the server) identify the location, or by receiving GPS signals with a GPS receiver, or both. In some embodiments the floor plan display automatically pans as the inspector moves throughout the building to continually display a current floor plan for the location that the inspect is in. For example, if the inspector moves one way, the floor plan scrolls to the left. If the inspector moves another way, the floor plan scrolls down. In some embodiments the inspection device also detects elevation or determines what floor the inspector is on, and automatically adjusts the display accordingly.

Other embodiments of the handheld inspection and maintenance device include other user interface displays. For example, a real-time CAFM display is provided in some embodiments. Other user interfaces or dashboard displays are included in other embodiments, such as those described herein. In some embodiments the handheld inspection and maintenance device is a smart phone, such as an iPhone. In some embodiments the smart phone includes a handheld inspection and maintenance device software application running thereon. In some embodiments the handheld inspection and maintenance device includes an electronic compass or global positioning system that provides information on orientation, position, location, or movement to the handheld inspection and maintenance device.

Other embodiments include other user interface displays to communicate information to a user. In some embodiments, such displays of information are referred to as dashboard displays. Examples of alternative dashboard displays include tables (including spreadsheets), charts, bar charts, gauge charts (e.g., having the appearance of a gas gauge or speedometer), pie charts, line charts, XY plots, or other dashboard displays useful for communicating data visually to a user.

Further examples of alternative dashboards or data displays are as follows: estimated greenhouse gas emissions per square foot/meter hour of utilization, utility cost per square foot/meter hour of utilization, location of important documents and/or assets, security guard locations on rounds, IT threat management by internal location, IT threat management by percentage of network requests that do not include an authenticated data packet, VoIP locations, average working distance between a defined group, chargeback rates based on actual utilization of space (among other factors), temperature by defined area, humidity by defined area, location of personal items with asset tags (possibly accessed with a user defined password), reconfiguration activity for space planners, estimated carpet usage based on utilization, building maintenance required/performed, status of the data packet generators (including information from data packet generators such as battery life), model of data packet generators, height of worksurfaces (obtainable with a sensor if the data packet generator is installed under a worksurface facing the floor), insurance claims compared to ergonomic height of worksurfaces (or other factors), reconfigure frequency between industries, groups, regions, etc, community area space utilization rates (via heat, sound or motion sensors typically), projections of non-network related occupancy (statistically based on manual studies of various worker types), find my friend/colleague app(s), historical bandwidth requirements per username (tied to real-time location), automated consulting, square foot/meter total cost per employee hour of utilization, any location based geospatial apps (Google Apps, iPhone apps, Blackberry apps), reservations fulfillment percentage, demographic information compared to utilization and/or patterns of use, find my computer, find all of the computers in my department before a move, emergency responder locations, disaster Recovery reports indicating who was in a space just prior to a disaster, business continuity reports indicating nearby locations to report to work after a disaster, smoke detection view (smoke detection can be a part of a data packet, space heater view, high temperature view during emergencies, social view in hoteling environments (patterns of use), contractor view (where and how many people are using space even if usernames are not known), strategic level (executive level) dashboards that integrate space utilization information with dashboards relating to the availability of qualified labor around the globe such as for projections on occupancy, firmware updates received, devices set on an approved storage module, missing/disconnected data packet generators, (CAFM), proposed floor plan with real-time data feed (so that space planners can view the results of a floor plan prior to building it), performance chart (showing the general patterns of high performing people), cubicle pac man and other gaming functions, box move view (pre-move and post-move), tampered devices view, alternative roll-call (sending out a message between devices that propagates through mesh network), auto updates (such as high vacancy warnings via Twitter or text message), current mail drop location, update printer settings, firmware or software version being used, churn (industry term for employees moving from one assigned place to another), location of hot/cold calls, PoE active/inactive, log file view of what has happened to an individual device, date of last confirmed synchronization, Ethernet port locations, artwork view (can include a picture of the artwork if drilled down), total value of actions taken, qualification level of a given property (e.g., not every site is well suited to be optimized due to a variety of reasons such as parking, sublease market, etc., but this display provides a map-type of view of the worldwide sites with the qualification level indicated), virtual walls between departments by color code (for setting up internal Virtual Walls), virtual wall protected files, risk level associated with various actions (list powered by algorithms/statistics) (e.g., because things change daily, deciding to vacate a floor may have an 80% probability of being a profitable move and a 20% chance of costing more when all factors are considered), phone locations compared to login locations (list), energy cost per square foot/meter hour of occupancy, synergy view (links people in a group by distance or walking time), assigned locations vs. actual locations (e.g., including a simple mechanism to update actual location from the assigned location), assigned locations abandoned list (people who haven't shown up anywhere for x days—including a simple mechanism to delete their assignment at a location), a personal log of historical space utilization that includes goals set personally and/or by management, and an ultra compact hoteling view. As mentioned above, many of these data displays (and others described herein) can operate in more than one format. Real-time, compiled, and predictive views are typical for all such data displays. Performance goals can be associated with many of these (or other) data displays. Some data displays combine data between multiple data displays. Some data displays can also cause automated response(s) (such as building control responses or newspaper hiring ads that get automatically published in regions with workers who historically utilize less space). Various access levels to view these (and other) data displays is typically required. In some cases it is helpful to allow users to create their own themes for the data display, while preventing them from changing the contents of the display.

Some further examples of possible applications for one or more of the systems or methods disclosed herein are as follows. Some embodiments are used to identify a location of a person or device, or multiple people or devices. Accordingly, a wide variety of applications utilize these locating features. For example, applications include systems to identify a particular direction, provide directions, and display the current location on a map, chart, display, CAFM display, or other user interface. A nearest place of business is identified in some embodiments, such as a store, dentist, doctor, hospital, gas station, movie theater (such as a theater playing a particular movie), gym, taxi, Wi-Fi hotspot, restaurant, bar, or coffee shop. A location of a lost item is identified in some embodiments, such as a car, phone, person, tree stand, lost object or pet, etc. Some embodiments are position based games, such as a scavenger hunt or obstacle course. Some embodiments display coupons for use at your current location. Some embodiments are used for real estate, such as to display information about the property, make an offer or inquiry relating to a property, identify a needed repair or make a maintenance request. Some embodiments are used to track a position during a golf game (or distance to the pin), identify altitude or altitude changes, or distances traveled. Some embodiments include travel guides that provide information about a current location, such as historical information, places to stay, places to eat, entertainment options. Some embodiments provide a weather forecast based on a current location. Some embodiments are part of or interface with a graphical information system (GIS). In some embodiments, such data is stored in memory and/or included as content in a data packet. In other embodiments the data is displayed in a user interface, or used to generate a user interface display.

Some embodiments include a smartphone-off application. This application allows a user to select one or more locations or regions where a smartphone (or other device) should be turned off. When the smartphone-off application detects that it is in the location or region, the application turns off the smartphone, or causes the smartphone to enter a non-active state (e.g., a hibernation mode). In example embodiments, the location is at or around the users home or office. In other embodiments, the volume and/or operation of the smartphone is adjusted based on the location, such as to mute the volume or to turn on/off a vibration feature. Other features are adjusted based on location in other embodiments.

Some embodiments of the systems and methods described herein utilize smart dust. For example, a data packet generator is incorporated into a smart dust device (i.e. mote). The motes are used for a variety of possible applications. For example, a large quantity of motes is released into a weather formation. Each mote is authenticated using the processed described herein (such as method 1300) operating at high speeds. Accordingly, data about the location of each mote (or other data) is compiled and processed. Such data is used to view weather patterns, for example. In another example, motes are released into a fluid to monitor fluid flow, such as through a pipeline system.

Figure 24:
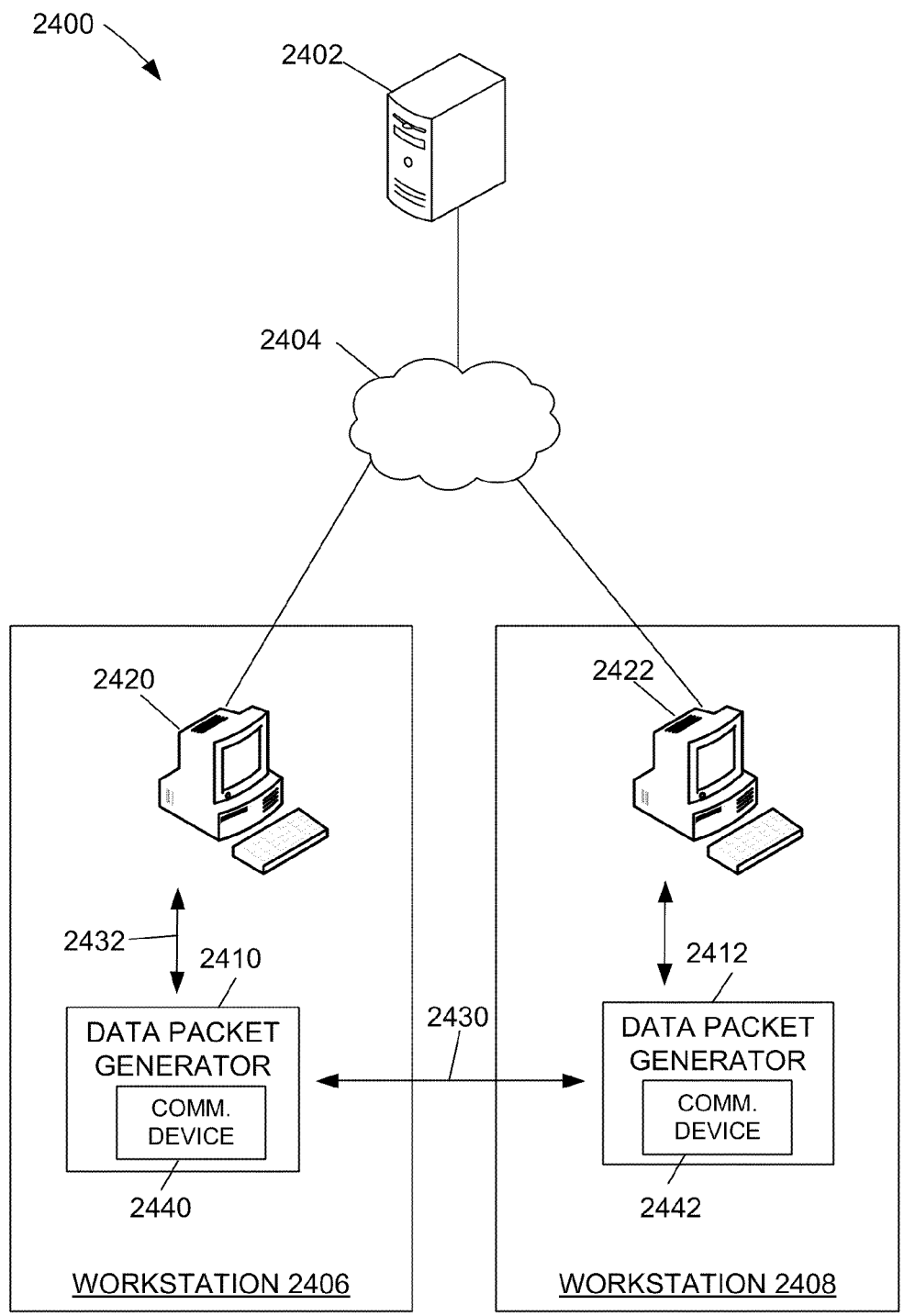
FIG. 24 is a schematic block diagram of an example authentication system according to the present disclosure.

FIG. 24 is a schematic block diagram of an example authentication system 2400. Authentication system 2400 includes server 2402, network 2404, data packet generator 2410, data packet generator 2412, computing device 2420, and computing device 2422. In this example, data packet generator 2410 and computing device 2420 are located within workstation 2406, and data packet generator 2412 and computing device 2422 are located within workstation 2408.

Server 2402 typically operates to authenticate a passcode generated by one of data packet generators 2410 or 2412 as being a valid and current passcode. Communication with server 2402 occurs across network 2404. Computing devices 2420 and 2422 are at least sometimes configured to communicate with network 2404.

In this example, data packet generator 2410 includes communication device 2440 and data packet generator 2412 includes communication device 2442. Communication devices 2440 and 2442 allow data packet generators 2410 and 2412 to communicate with each other as well as with a computing device. For example, data packet generator 2410 is able to communicate with data packet generator 2412 as shown by communication path 2430. Data packet generator 2410 is also able to communicate with computing device 2420 as shown by communication path 2432. In some embodiments only one communication path is used. In other embodiments, additional communication paths are used, such as to communicate with other objects, people, or devices.

Some embodiments of data packet generator 2410 are configured to communicate across network 2404, such as to communicate with server 2402.

Examples of communication devices 2440 and 2442 include radio frequency communication transmitters, receivers, or transceivers; infrared communication devices; or other wireless communication devices. In some embodiments communication devices 2440 and 2442 are wired communication devices, such as an Ethernet communication device.

In some embodiments, communication devices 2440 and 2442 have two or more communication modes, such as a short range communication mode and a longer range communication mode. The short range communication mode is typically used for communication between the data packet generator (e.g., data packet generator 2410) and a computing device (e.g., computing device 2420) that is located within the same workspace, such as illustrated by communication path 2432.

When the communication device 2440 is operating in the short range communication mode, communication is limited to a short range. In some embodiments the short range is about the distance across the workspace in which the data packet generator is located, such as workstation 2406 for data packet generator 2410. In some embodiments the short range is from about 2 feet to about 10 feet, and preferably from about 2 feet to about 6 feet. In other embodiments, the short range is less than about 100 feet. Other embodiments include other ranges.

The short range communication mode prevents communication from occurring across a distance greater than the short range. As a result, when a computing device (or other device) is able to communicate with the communication device 2440 while it is operating in the short range communication mode, the location of the computing device is known to be within the short range of the associated data packet generator. If the location of the data packet generator is also known, then the location of the computing device is also known.

In some embodiments, the data packet generator 2410 communicates a passcode (or other data) using the short range communication mode. The short range of the short range communication mode prevents the passcode from being received by a computing device that is outside of the short range of the communication device 2440, but allows the passcode to be received by a computing device that is within the short range of the communication device 2440.

In some embodiments computing device 2420 is programmed to automatically detect a communication from data packet generator 2410 across communication path 2432. Once detected, the passcode (or other data) is received from the communication and may be used for an automated login with the server. For example, when a user starts a computer, the user can enter a username and password (if desired by the administrator). Before proceeding with the login, however, the computing device waits to receive a passcode from a nearby computing device. If the passcode is received, the computing device proceeds to use the username, password, and passcode to gain access the system (or just the passcode in some embodiments). If a passcode is not received within a predetermined period of time, the user is prompted to manually enter a passcode.

An alternate embodiment does not require a user name or password. Rather, software runs in the background on the computing device. The software periodically receives a passcode (or other data) from a data packet generator and provides that passcode to a server without requiring user intervention. Further, in some embodiments the software does not act to control access to protected resources.

Some computing devices use identifiers other than usernames and passwords to confirm the identity of a user. For example, a biometric identification system is used to identify a user according to one or more biometric identifiers. Examples of biometric identifiers include fingerprint scanners, eye scanners (e.g., iris scanners), face identifiers, voice identifiers, etc. Ultimately each organization will typically determine the identification method or methods that are best for that organization.

In some embodiments the username is obtained automatically for use as disclosed herein, such as by utilizing a software application running on the computing device to read the user name from the operating system (such as from the operating system registry file).

When the communication device 2440 is operating in the longer range communication mode, communication is possible across a longer distance than is possible in the short range communication mode. In some embodiments the longer distance is in a range from about 10 feet to about 30 feet, and preferably from about 15 feet to about 25 feet. In other embodiments, the longer range is greater than about 100 feet. Other embodiments include other ranges.

In some embodiments, a data packet generator utilizes the longer range communication mode of the communication device 2440 to communicate with neighboring data packet generators, such as across communication path 2430. A neighboring data packet generator is a data packet generator that is within the longer range of another data packet generator, when the data packet generator is communicating in the longer range communication mode. For example, when data packet generator 2410 is operating the communication device 2440 in the long range communication mode, data packet generator 2410 is able to communicate with neighboring data packet generators, such as data packet generator 2412, if the data packet generator 2412 is a distance away that is less than the longer range of communication device 2440. This can include, for example, any data packet generators located within one or more neighboring workspaces, such as workstation 2408.

In some embodiments, communication device 2440 is used to communicate a passcode (or other data in a data packet) to a computing device or to another data packet generator without requiring a user to manually read the passcode (or other data) from the display of the data packet generator and manually enter the passcode into a keypad. As a result, such communication of the passcode (or other data) is sometimes referred to herein as automated communication. Further, in some embodiments additional information is also communicated along with the passcode. In some embodiments, such information is transmitted as, or as part of, a data packet.

One example use of the longer distance communication mode is to communicate passcodes among neighboring data packet generators. For example, in some embodiments each data packet generator is programmed to broadcast a data packet to neighboring data packet generators periodically, such as once per day. The data packet includes various information, such as a serial number of the data packet generator or a passcode generated by the data packet generator (or other data described herein). The neighboring data packet generators receive the data packet that is broadcast and store some or all of the data in memory. For example, in some embodiments the serial numbers and/or passcodes of each of the neighboring data packet generators are stored in memory. Later, when the data packet generator transmits a data packet to a computing device (or the server), the data packet generator also retrieves from memory the data from the neighboring data packet generators and transmits such data as well. If sent to the computing device, the computing device then transmits the data to the server (e.g., server 2402). The server then stores the data packet information in memory for subsequent or immediate use.

For example, in some embodiments the server utilizes neighboring passcode information to confirm the location of the data packet generator, by verifying that the neighboring passcodes were in fact generated by the known neighbors of the data packet generator. If a data packet generator is unable to supply the serial numbers or passcodes from neighboring devices, the server determines that either the data packet generator has moved (or malfunctioned) or that one or more of the neighboring data packet generators have moved (or malfunctioned). By similarly receiving such data from all other data packet generators, the locations of all (or at least some) of the data packet generators in a facility are verified or are flagged as requiring review, investigation, or other action. The interconnected network of data packet generators is sometimes referred to herein as a mesh network. The mesh network permits data packet generators to be moved (e.g., semi-transient), while the server maintains an accurate identification of the location (or approximate location) of the moved data packet generator. For example, if a reconfiguration of office space occurs, the movement of the data packet generators is reported to the server to inform space planners of the reconfiguration and present locations of the data packet generators. In some embodiments information is communicated to the space planners in an automated communication, such as via an e-mail or text message. In other embodiments a message is displayed on a user interface of a computing device.

In some embodiments communication 2430 is used by a data packet generator 2410 to determine the distance that the data packet generator 2410 is away from a neighboring data packet generator 2412. One exemplary method of determining the distance between data packet generators is to measure a signal intensity of communication 2430 received from data packet generator 2412. The attenuation of the signal from a known original intensity can be used to approximate the distance. In another embodiment, data packet generator 2410 determines a change in signal intensity among multiple communications 2430. A drop in signal intensity of a communication 2430 from the intensity of a previously received communication indicates that the data packet generator 2412 may have been moved away from data packet generator 2410. Another method of determining the distance between data packet generators is to measure the time the signal takes to propagate to a nearby data packet generator and to receive the response from the data packet generator. Another embodiment uses triangulation between multiple data packet generators to determine distances and/or specific locations of neighboring data packet generators.

In some embodiments a periodic location check is performed. The periodic location check occurs periodically, such as once per minute, hour, day, or month. The location check is initiated, in some embodiments, by a single data packet generator that emits a first location check message. The location check message is received by neighboring data packet generators that in turn emit a subsequent location check message. This is an example of viral communication. The message continues to propagate through the entire area until all data packet generators that are within range of another data packet generator have issued a location check message. The location check messages are also received by neighboring data packet generators. The neighboring data packet generators use the location check messages to estimate the distances between themselves and the neighboring data packet generators. The distance information is then stored in memory, such as for subsequent communication back to the server (such as using a passcode alert message described below). In another possible embodiment, instead of a location check, a presence check is performed that verifies the presence of a data packet generator, rather than the location of the data packet generator.

Viral communication is used in some embodiments to communicate additional information or data among data packet generators. For example, firmware updates are transmitted through the data packet generators using viral communication in some embodiments, where the firmware update is distributed to one or more selected data packet generators, which in turn send the firmware update to the neighboring data packet generators until all interconnected data packet generators have received the update. Security measures are put into place in the preferred embodiments to ensure that an actual virus or other malicious firmware or software cannot propagate in this manner.

In another possible embodiment, the presence check is performed at a predetermined time, where all data packet generators are configured to wake up during that time to perform the presence check. In some embodiments the data packet generators remain active for a period of time, such as about ten minutes, to allow all of the presence checks to be performed, before returning to a normal mode of operation. In some embodiments the operation of the data packet generator during this period is referred to as a presence check mode of operation.

Figure 25:
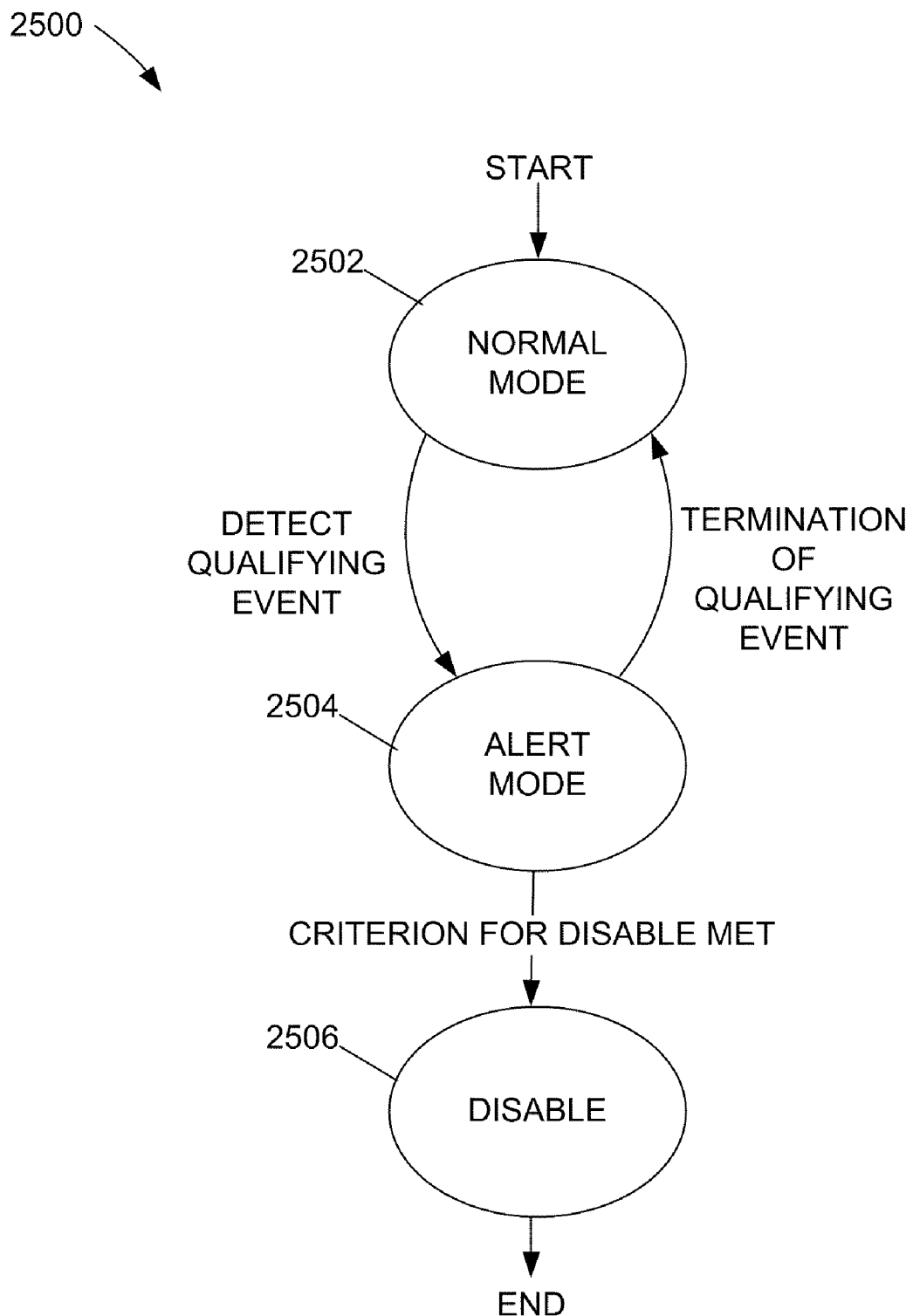
FIG. 25 is a state diagram illustrating an example method of operating a data packet generator according to the present disclosure.

FIG. 25 is a state diagram illustrating an example method 2500 of operating a data packet generator. Method 2500 includes normal mode 2502, alert mode 2504, and disable 2506.

Method 2500 begins in normal mode 2502. In normal mode, the data packet generator generates and outputs a current passcode or data packet periodically, such as once per minute. In some embodiments the current passcode is displayed by a display of the data packet generator. In other embodiments the current passcode (or other data) is transmitted in a data packet using a communication device. Other embodiments do both. Normal mode 2502 continues until a qualifying event is detected.

An example of a qualifying event is the detection of potential tampering, such as by a tamper sensor. Another example of a qualifying event is the receipt of an alert message from a neighboring data packet generator. Other examples of qualifying events are described herein. Other qualifying events can include any event that is measurable, detectable, or determinable by a data packet generator. Examples of data that can be included in the data packet are described herein, such as in table 2 below.

Upon the detection of a qualifying event, method 2500 begins to operate the data packet generator in alert mode 2504. While operating in alert mode, the data packet generator continues to generate a current data packet periodically. However, the data packet generator now adds additional information to the data packet in an effort to communicate information regarding the qualifying event that has been detected. An example of the alert mode 2504 is described in more detail herein with reference to FIGS. 26-30.

In some embodiments, the alert mode 2504 adds to the data packet information about the event that has occurred. Other embodiments take additional action.

After operating in the alert mode 2504, method 2500 either returns to normal mode 2502 upon termination of the qualifying event, or operates to disable the data packet generator 3506 if one or more criteria for disable are met.

In some embodiments, some qualifying events terminate after a passage of time. Other qualifying events terminate once the qualifying event has been rectified, such as if a missing screw is replaced. Other qualifying events terminate upon receipt of a wireless or wired communication from an administrator, security personnel, or server informing the data packet generator that the event should be terminated. In some embodiments some qualifying events terminate when the data packet generator is placed into a known "safe zone," such as by returning the data packet generator to a docking station or particular storage room. In some embodiments the location of the data packet generator can be determined by the data packet generator by receiving a known passcode (or other data, such as a serial number or other data packet generator identifier) from another data packet generator that is known to be in a particular location, such as the storage room. In some embodiments, after an alert is sent, neighboring data packet generators respond to the alert to inform the alerting data packet generator that the alert has been received. The receipt of this message from one or more neighboring data packet generators terminates the qualifying event in some embodiments. Other embodiments terminate qualifying events in other manners.

Alternatively, in some embodiments, method 2500 proceeds to disable the data packet generator after operating in the alert mode 2504 if one or more criteria for disable are met. An example of a criterion for disable is the passage of a period of time following a qualifying event. Another example of a criterion for disable is the inability to communicate with previously neighboring data packet generators for a period of time. Another example of a criterion for disable is tampering that exceeds a predetermined threshold (e.g., a screw is removed, two or more screws are removed, if screws are removed in a certain order, if screws are not removed in a certain order, if screws are removed within a certain time period, if screws are not removed in a certain time frame, if a detected impact exceeds a predetermined impact threshold, if a temperature advances out of a safe operating range, etc.).

In some embodiments, disable 2506 operates to put the data packet generator into a hibernation mode, such that the data packet generator ceases generating and outputting passcodes. In another embodiment, disable 2506 operates to cause the data packet generator to clear data stored in memory, such as a passcode generation algorithm, passcode seed information, software, data regarding neighboring passcodes, or any other data stored in memory. In another possible embodiment, disable 2506 causes the data packet generator to begin generating a different set of passcodes that appear to be valid passcodes but are valid or invalid passcodes that the server knows to be related to a disable event.

In some embodiments, an administrator or other authorized user can reset a data packet generator to return the data packet generator to normal mode 2502 following alert mode 2504 or disable 2506. In some embodiments resetting the data packet generator involves restoring data previously erased from memory, such as by transmitting the data to the data packet generator. Alternatively, new data can be transmitted to the data packet generator, which stores the data in memory.

Figure 26:
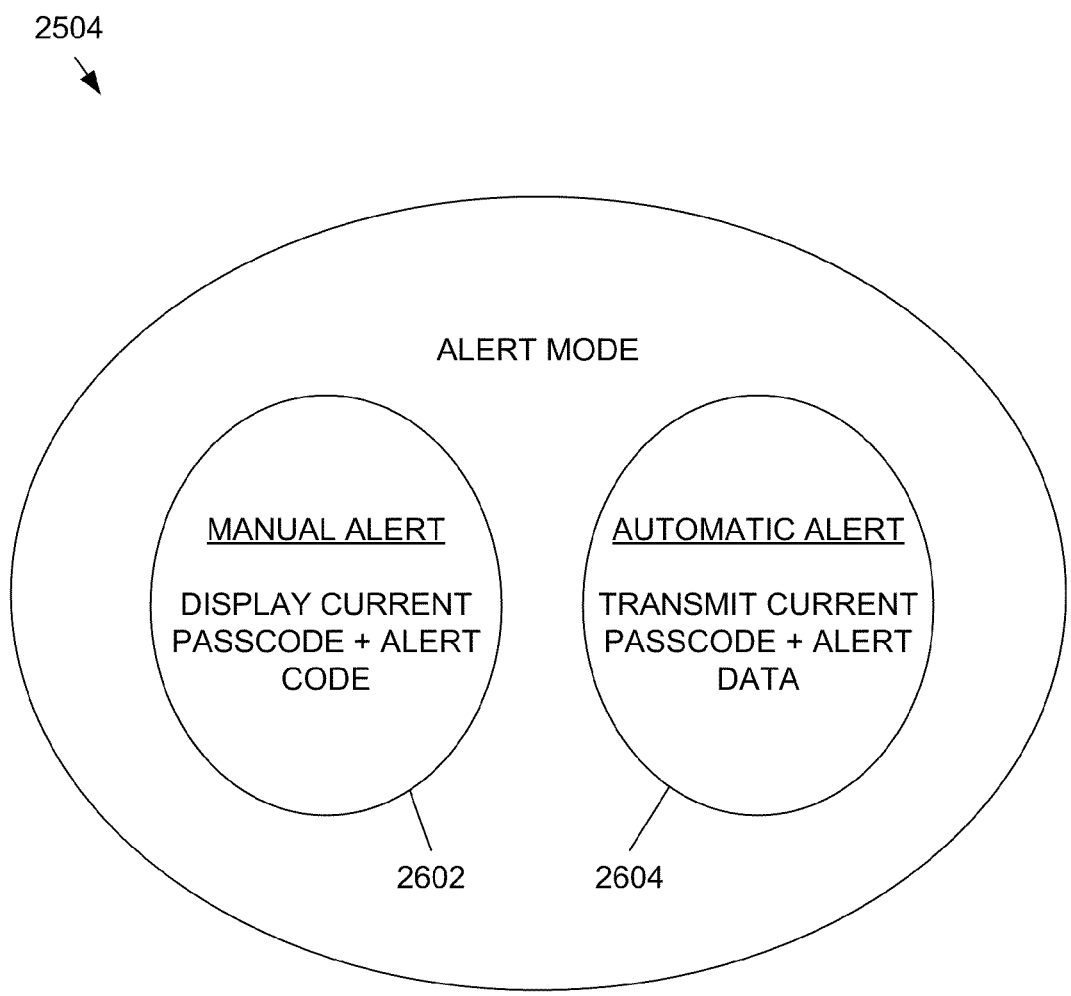
FIG. 26 is a state diagram illustrating an example alert mode of the method shown in FIG. 25.

FIG. 26 is a state diagram illustrating an example of alert mode 2504 of method 2500 previously described with reference to FIG. 25. Alert mode 2504 includes manual alert 2602 and automatic alert 2604. In some embodiments alert mode 2504 operates to perform both manual alert 2602 and automatic alert 2604 simultaneously. In other embodiments, manual alert 2602 is performed continuously, while automatic alert 2604 is performed only periodically. In yet further embodiments, only one of manual alert 2602 or automatic alert 2604 are performed.

Manual alert 2602 operates to display a manual alert passcode using a display (e.g., display 1920, shown in FIG. 20). The manual alert passcode includes the current passcode and also includes one or more alert codes. An example of manual alert 2602 is illustrated and described in more detail with reference to FIGS. 27 and 28. The manual alert passcode is manually viewed by a user and entered into a computing device. The computing device then communicates the manual alert passcode to a server, which validates the current passcode and extracts the alert code. In some embodiments the server performs a subsequent action based on the alert code received.

Automatic alert 2604 operates to transmit an alert message, such as using a wired or wireless communication device. In some embodiments, the alert message (which, in some embodiments is part of the data packet) includes the current passcode and also includes alert data that contains information about the qualifying event that has been detected. Other data is also included in some embodiments, such as described herein. An example of automatic alert 2604 is illustrated and described in more detail with reference to FIGS. 29 and 30.

In some embodiments, the automatic alert message is communicated to a computing device, which in turn communicates the automatic alert message to a server, which validates the current passcode and extracts the alert message. In other embodiments, the automatic alert message is communicated to another data packet generator, which itself communicates the alert message either to a computing device or to another data packet generator. Once the alert message has been received by a computing device, the computing device communicates the alert message to a server. In some embodiments the server performs a subsequent action based on the alert message received. In some embodiments, the data packet generator sends the alert message directly to the server across a communication network.

In some embodiments the alert message is a data packet that includes at least one piece of data relating to the alert. Examples of data that can be included in the data packet are described herein. In some embodiments the alert message is the same as a data packet communicated at non-alert times, except that specific alert data is included in the data packet.

FIG. 27 is a flow chart of an example method 2602 of operating a data packet generator in a manual alert mode. Method 2602 includes operations 2702, 2704, 2706, and 2708.

Method 2602 typically begins with operation 2702 to determine a current passcode. A current passcode is determined, for example, by retrieving the passcode from a lookup table, or by generating the passcode using a predetermined algorithm.

In some embodiments, the data packet generator is configured to selectively determine current passcodes based on two or more processes. For example, the data packet generator initially generates passcodes according to a first algorithm, but upon the receipt of a message from the server (or occurrence of another event), the data packet generator switches to a secondary process for generating passcodes, such as a second algorithm or based on a lookup table stored in memory.

After a current passcode has been determined, operation 2704 is performed to determine an alert code. The alert code is typically associated with the qualifying event that was detected. In some embodiments the alert code identifies the qualifying event. In other embodiments, the alert code provides at least some information regarding the qualifying event. In yet other embodiments the alert code means that a qualifying event has occurred without providing additional information.

Operation 2706 is then performed to determine an alert code digit. The alert code digit is a number (or set of numbers) that identifies the location within the manual alert passcode where the alert code is inserted.

In some embodiments, a variable alert code digit acts to prevent a user from intentionally omitting the alert code when manually entering the passcode into a computing device. When the position of the alert code is variable, the user doesn't know which digit of the manual alert passcode is the alert code. As a result, the entire manual alert passcode must be entered.

In other possible embodiments, operations 2702, 2704, and 2706 are performed in a different order. For example, method 2602 begins with operations 2704 or 2706 in other embodiments.

Once the current passcode, alert code, and alert code digit have been determined, operation 2708 is then performed to generate and display the current manual alert passcode. The current manual alert passcode includes the current passcode, as well as the alert code inserted into the passcode at the alert code digit to form a combined code having a length equal to the sum of the current passcode and the alert code.

FIG. 28 provides an example of method 2602 shown in FIG. 27. During operation 2702 a current passcode is generated. In this example, the current passcode is "6179847", which includes seven total digits. (Other embodiments include passcodes having a different number of digits.) In this example, each digit is numbered sequentially from 1 to 7, starting with the first digit (6) and ending with the seventh digit (7). The passcode is generated, for example, using a predetermined algorithm that is also known by a server.

During operation 2704, an alert code is generated. In this example, the alert code is a number from 0 to 9, having a single digit, but other embodiments include other characters or symbols and include one or more digits. Specifically, in this example the alert code is "0". In some embodiments each alert code is associated with a particular qualifying event. Table 1 provides an example set of alert codes and associated qualifying events.

TABLE 1

TABLE OF ALERT CODES AND ASSOCIATED QUALIFYING EVENTS

| ALERT CODE | DESCRIPTION OF QUALIFYING EVENT |
|---|---|
| 0 | A security guard or furniture installer has been in this area |
| 1 | A nearby data packet generator has sensed motion exceeding 3 seconds in duration |
| 2 | A nearby data packet generator has had all four screws removed from it |
| 3 | A nearby data packet generator has had all four screws removed from it and experienced motion exceeding 3 seconds in length |
| 4 | This data packet generator has experienced motion exceeding 3 seconds in duration and will emit a signal once every 24 hours for the next 72 hours requesting a reentry response from new or existing neighboring devices. If no response is received within 72 hours, memory will be erased |
| 5 | A data packet generator has reentered near this data packet generator |
| 6 | This data packet generator has reentered and been found by nearby data packet generators within the 72 hour time period |
| 7 | This data packet generator has been placed in a secure area and recognizes the verifying signal that is sent from the docking station or storage room |
| 8 | This data packet generator has just emitted a previously scheduled floor scan signal that will spread like a virus to every device currently on the floor |
| 9 | This device just received a floor scan signal and is "present" on the floor |

In other possible embodiments the alert codes change according to a predetermined algorithm. This prevents a user from looking for a particular alert code in the current manual alert passcode, and then omitting that alert code from the passcode. The algorithm for changing the alert codes is typically also known by the server.

During operation 2706 an alert code digit is determined. The alert code digit is typically a number indicating the digit in the manual alert passcode where the alert code should be inserted. The alert code digit is typically a number between 1 and the sum of the number of digits in the current passcode and the number of digits in the alert code. In this example the passcode includes seven digits and the alert code includes one digit, such that the alert code digit is a number between 1 and 8.

In some embodiments the alert code digit is fixed. For example, in some embodiments the alert code digit is always the number of digits in the passcode plus one. In this way the alert code is appended to the end of the passcode. Other embodiments use a predetermined algorithm to determine the alert code digit. Preferably the algorithm is also known by a server. In this example the alert code digit is computed to be "3".

The alert code digit is then inserted into the current passcode at the alert code digit. For example, the alert code "0" is inserted into the third digit of the current passcode, resulting in a manual alert passcode of "61079847".

Although not required in all embodiments, it is preferable that the current passcode and the manual alert passcode be kept relatively short. The reason for this is that in the manual alert mode the manual alert passcode must be viewed by a user and manually typed into a computer. A relatively short passcode makes it easier for a user to enter the passcode and reduces the chance of the passcode being entered incorrectly. It is preferred that the passcode be in a range from about 5 characters to about 15 characters, and preferably from about 7 characters to about 8 characters. It is also preferable that the manual alert passcode also be kept to about these ranges. Although a longer passcode can be used in some embodiments, a long passcode such as having 30 digits will typically be more difficult and cumbersome for a user to enter manually. Alternatively, a longer passcode may be formed of two or more sequential passcodes having a relatively short length.

Since it is desirable to limit the length of the manual alert passcode, the amount of information that may be conveyed by the alert code is also limited. An example of the information that can be conveyed by the alert code is provided in table 1 herein.

There are multiple reasons for including a manual mode of operation in a data packet generator. First, some computers may not be configured to receive automatic alerts (such as if they do not include a wireless communication device). Second, in the event that a communication device on either the data packet generator or the computing device malfunctions, the manual mode is available as a backup method. This, for example, ensures that no user is prevented from accessing system resources due to a malfunctioning communication device. Third, the manual mode can be used as a higher security mode, such as by disabling wireless communication of passcodes, to prevent unauthorized or inappropriate receipt of passcodes. A particular user may not have access to a computing device, but still need to access a passcode. For example, a box mover, first responder, or other transient user can utilize the manual mode to obtain a passcode.

Figure 29:
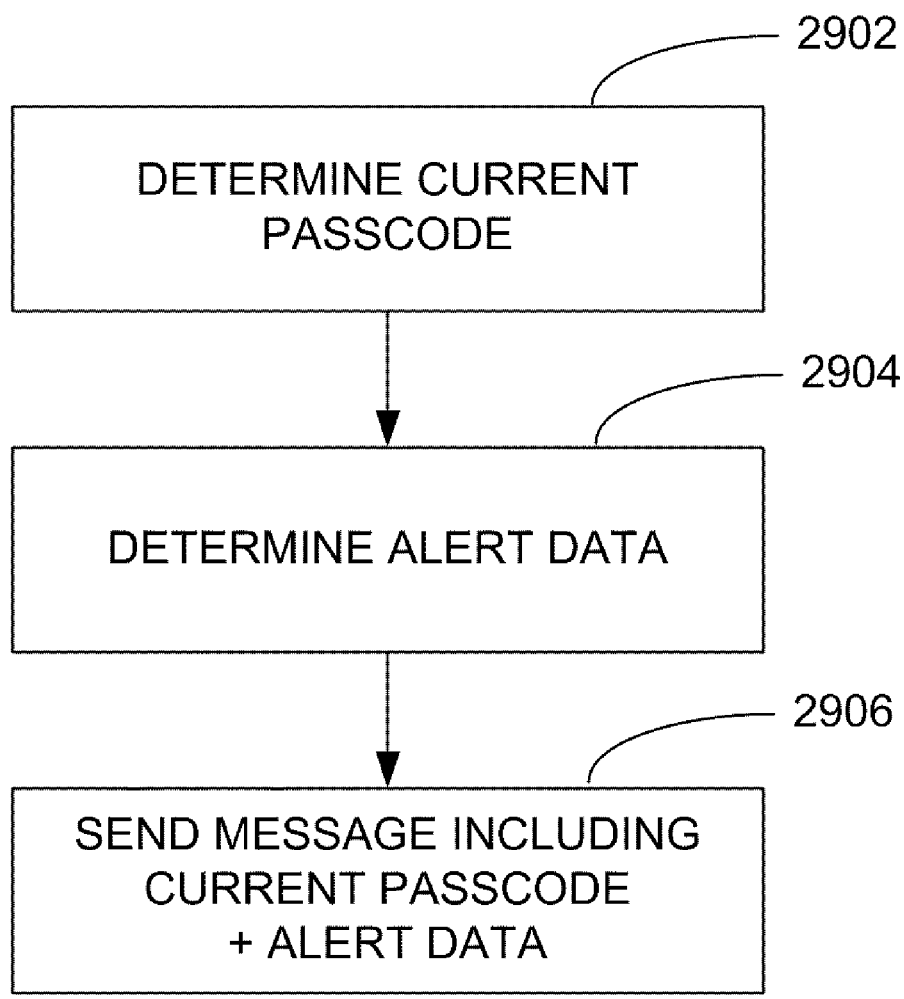
FIG. 29 is a flow chart of an example method of operating a data packet generator in an automatic alert mode of the alert mode shown in FIG. 26.

FIG. 29 is a flow chart of an example method 2604 of operating a data packet generator in an automatic alert mode. Method 2604 includes operations 2902, 2904, 2906, and 2908.

Method 2604 typically begins with operation 2902 to determine a current passcode. The current passcode is typically determined according to a predetermined algorithm, or is retrieved from a lookup table.

Operation 2904 is then performed to determine alert data. Alert data is typically data associated with the qualifying event that caused the data packet generator to enter the alert mode. A wide variety of data can be provided. A few examples are described with reference to FIG. 30. In some embodiments operation 2904 is performed before operation 2902.

Operation 2906 is then performed to generate and send an alert message including the current passcode and the alert data. In some embodiments the alert message is sent to a computing device, which relays the information to a server. In other embodiments the alert message is sent to a neighboring data packet generator, which then sends the message to a computing device that in turn relays the message to a server.

FIG. 30 provides an example of method 2604 shown in FIG. 29.

During operation 2902 a current passcode is generated. Methods of generating a current passcode are described herein. For example, a predetermined algorithm is used in some embodiments to generate the current passcode. In this example, the current passcode is "6179847".

During operation 2904 alert data is gathered. Alert data typically includes data associated with a qualifying event. In addition, any other detectable, measurable, or determinable information may also be provided. Examples of alert data include an alert code (see table 1 herein), a description or code identifying the triggering event, a time stamp that the triggering event occurred, an identification of one or more passcodes from neighboring data packet generators, a description of a qualifying event that has occurred on a neighboring data packet generator, an identification of a distance that the data packet generator is away from a neighboring data packet generator (such as determined by measuring the signal intensity of a communication received from a neighboring data packet generator), subsequent triggers or qualifying events that were detected, an identification of any actions that have been taken, or other information.

In other possible embodiments, data collected during the alert mode is inserted into a data packet, such as one or more of the example data packets described herein, such as shown in table 2. In some embodiments such data is gathered even when the data packet generator is not operating in an alert mode.

In some embodiments, alert data is compiled into a series of numbers that encode data therein. As discussed below, the alert data can be added to the passcode to form an alert message. In some embodiments, then, the alert message is essentially a longer passcode including a first series of numbers identifying the current passcode and a second series of numbers encoding the alert data. As a result, the alert message can form a passcode having a long length, such as in a range from about 10 digits to about 1 million digits, or more. For example, an image captured by a digital camera of the data packet generator can be encoded as part of the alert message in some embodiments. Some embodiments encode data in a binary form.

Once the current passcode and the alert data have been compiled, operation 2906 is performed to generate and send an alert message. The alert message includes the current passcode and the alert data. In some embodiments the message includes a header at the beginning of the message, such as the headers described herein. The header identifies, for example, the number of bytes contained by the following message or an identification of the content of the message.

Figure 31:
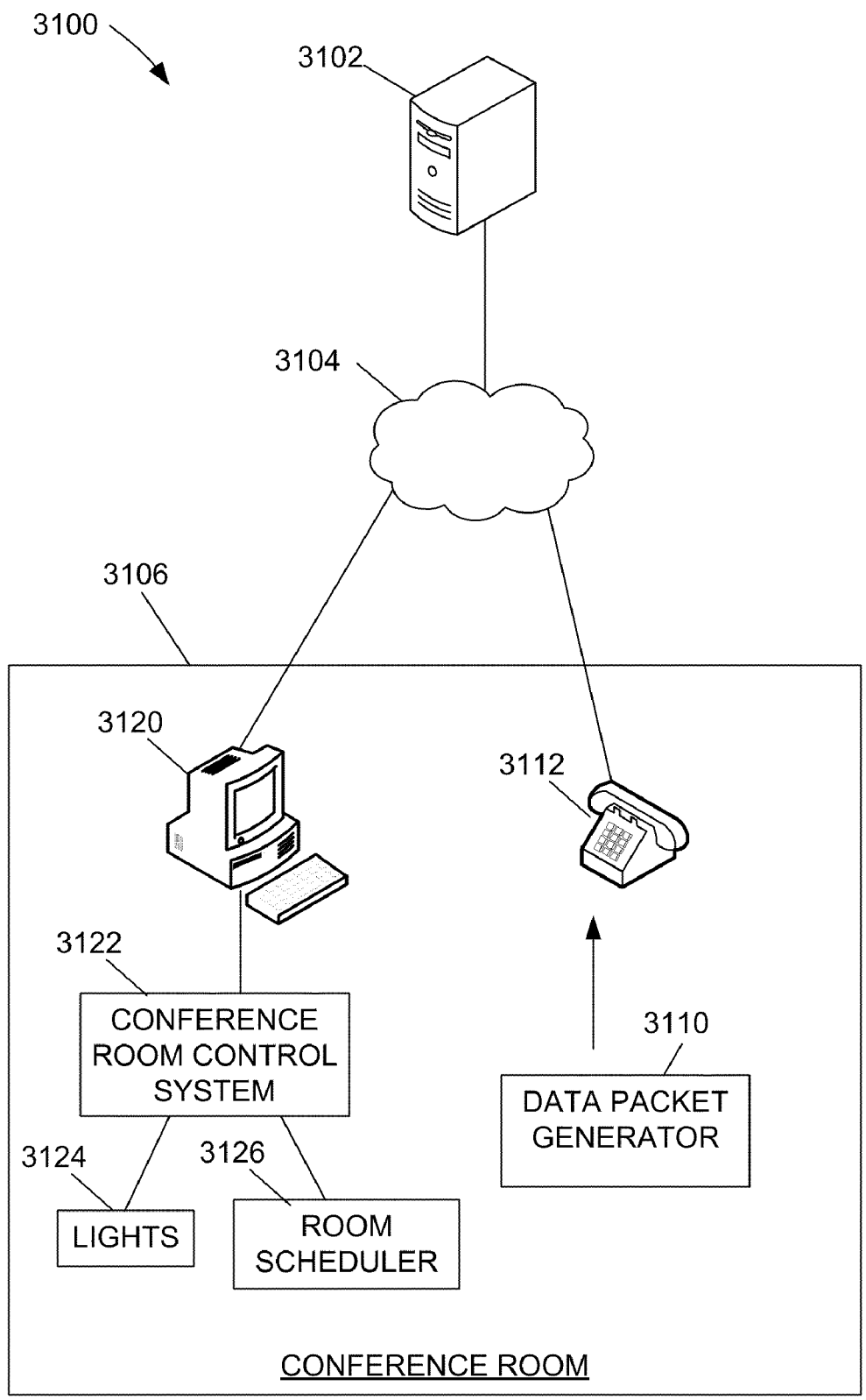
FIG. 31 is a schematic block diagram of an example authentication system according to the present disclosure.

FIG. 31 is a schematic block diagram of an example authentication system 3100 that controls access to a protected resource. In this example the protected resource is a conference room 3106. System 3100 includes server 3102, network 3104, data packet generator 3110, telephone 3112, computing device 3120, conference room control system 3122, and room resources, such as lights 3124, and room scheduler 3126.

An exemplary method of using authentication system 3100 begins with a user scheduling conference room 3106 through room scheduler 3126. For example, a user utilizes a computing device (not shown) to check room availability and reserve the conference room for a particular time and duration. When the time for the conference room use arrives, a user uses the authentication system 3100 to show that they are actually going to use the conference room within a predetermined period of time, such as within five or ten minutes after the scheduled start time of the conference.

One example method of confirming use of the room is as follows. First, the user enters the room and dials a telephone number to access an automated conference room confirmation system. The system asks the user to enter the passcode provided by data packet generator 3110. The user then types the code into the telephone keypad. The passcode is communicated to server 3102 which validates that the passcode is a valid code. The validation is then communicated through computing device 3120 to conference room scheduler 3126, which confirms that the conference room is being used. In some embodiments the conference room scheduler 3126 operates on a server, such that information about conference room availability is available to other users.

If such confirmation is not received, room scheduler 3126 releases the conference room reservation to make the conference room generally available for any other user that needs a conference room.

In the event that a conference was not previously scheduled and the conference room is not currently being used, some embodiments also allow a user to reserve a conference room using a similar process. The user enters the room and turns on the lights, dials a telephone number, and enters the passcode from data packet generator 3110. The system may also prompt the user for other information, such as a user ID number, the duration of the conference, or any other information. The system then updates the room scheduler 3126 to show that the conference room is in use.

If the user does not reserve the room in this way, the conference room control system will automatically shut off the lights after a period of time, in some embodiments, assuming that the conference room is not currently being used. Some embodiments include motion detectors, sound detectors or decibel meters, or other sensors to determine if a conference room is in use.

In some embodiments, after validating the passcode entered into telephone 3112 as being valid, the server 3102 orally issues a sister passcode to the user. The user enters the sister passcode into computing device 3120 or uses an input device of data packet generator 3110 to enter the sister passcode into data packet generator 3110. If entered into the data packet generator 3110, the data packet generator then validates the sister passcode and sends an alert message (such as via a wireless communication device) to the conference room control system 3122. In either case, the conference room control system 3122 operates to grant access to room resources, such as the lights (e.g., turn on the lights) or any other desired resources.

Some embodiments conserve energy by shutting down lights or other resources when not in use (e.g., temperature control systems) or by opening or closing curtains or blinds appropriately.

Some embodiments work to create a high performance building where resources are automatically made available if they are not being used. For example, if a conference room has been reserved but is not occupied within a period of time, the conference room is released from the reservation so that the space is made available to others.

In some embodiments an authentication system is used to determine the location of a device (such as a computing device), even if the device is currently turned off. To do so, the device is equipped with a remotely controllable power switch. The server issues a request to turn on the device. The request is received by the remotely controllable power switch (such as via a wireless or wired communication signal), which causes the device to turn on. The device is then programmed to automatically search for a data packet generator communication including a passcode. Once received, the device sends a data packet to the server across a network, such as including a passcode. The server receives the data packet and uses data within the packet, such as the passcode, to identify the location of the device. Subsequent action may then be taken, such as to physically collect the missing device or to record the current location of the device in memory of the server. In some embodiments if a device is not located within a period of time, a long distance signal is broadcast (such as a worldwide data signal) that instructs the device to erase its memory.

Some embodiments require that multiple passcodes be received from multiple data packet generators. For example, if a vehicle is driving down the road and is equipped with a computing device, the computing device receives passcodes or data packets from multiple data packet generators arranged along the road. The passcodes or data from data packets are stored in memory and in some embodiments are communicated to another device, such as a server. The passcode information identifies not only particular locations, but shows a path that was taken by the vehicle. This information may then be compiled for subsequent use, such as to determine payments that need to be made (e.g., a toll way), to pay taxes, or for a variety of other uses. Similarly, this information is used in some embodiments to control a fleet of moving vehicles, such as to control the speeds, orientations, directions, or routes of the vehicles. Data packets from the data packet generators are collected by each vehicle as it moves.

Similarly, if a person walks down a hallway, multiple passcodes from multiple data packet generators arranged along that hallway can be collected. In some embodiments access to a protected resource is not granted unless a particular set of passcodes has been received within a period of time, such as to prove that a person walked down the hallway. If another path is taken (such as by walking around the outside of the building), access to the protected resource is not granted.

In some embodiments the identity of a device and the location of a device are merged to create another type of passcode. For example, a tank could integrate an authentication code as a way to prove that the tank is in fact a particular tank. Further, a motion sensitive GPS unit is stationed nearby the tank (e.g., five feet away). A communication device receives passcodes from both the tank and the GPS unit and generates a merged passcode from the combination of the two passcodes. If the communication device is unable to generate the merged passcode, an alert is issued (e.g., to Homeland Security).

In some embodiments look up charts are provided by the server to a security department periodically, such as once per hour, minute, hour, day, year, etc. The look up charts provide passcode information for a particular set of data packet generators over that period of time. In some embodiments, each data packet generator is associated with a set of passcodes that the data packet generator will generate during that period. One method of identifying if this information is mishandled is to insert known misinformation into the lists occasionally. If the misinformation is detected by a server, the server is alerted that a potential security breach had occurred. For example, each data packet generator is, in some embodiments, programmed to generate two passcodes at a time. Only one of the passcodes is used for communication. The other passcode is used, for example, to identify the particular data packet generator that is being targeted, and acts to alert the server that a potential security breach had occurred.

Figure 32:
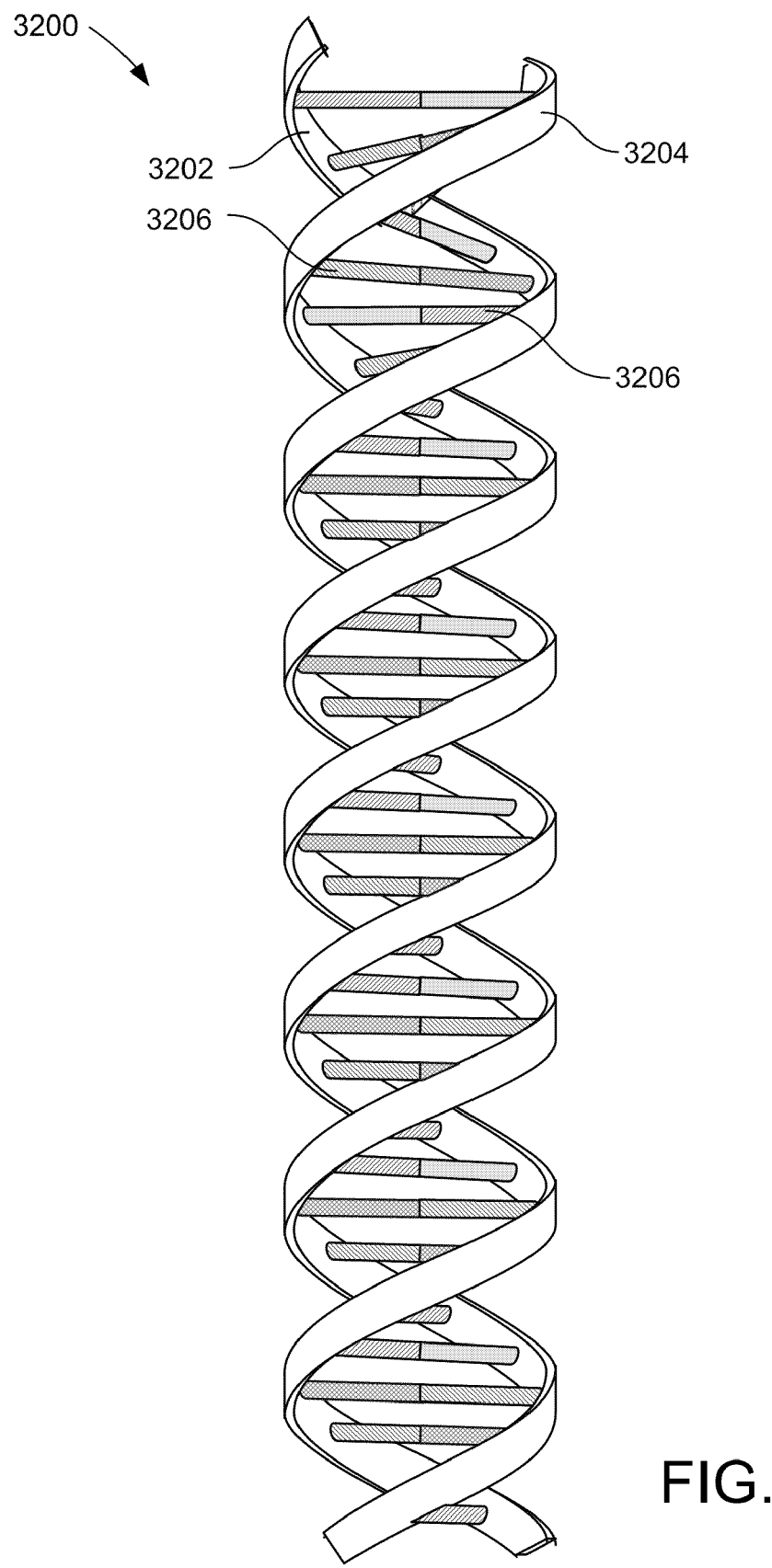
FIG. 32 is a schematic diagram of an example DNA strand for illustrating an embodiment of identification according to the present disclosure.

FIG. 32 is a diagram of a DNA strand 3200. Living organisms can be identified by genetic codes stored in DNA 3200 (deoxyribonucleic acid). DNA typically includes two strands 3202 and 3204 that are united together by chemicals, known as bases 3206. Unique characteristics of DNA make identification of a living organism possible. Some embodiments according to the present disclosure provide a biomimic of such a DNA structure using numerical codes in place of chemicals, and time in place of distance, as discussed below.

Figure 33:
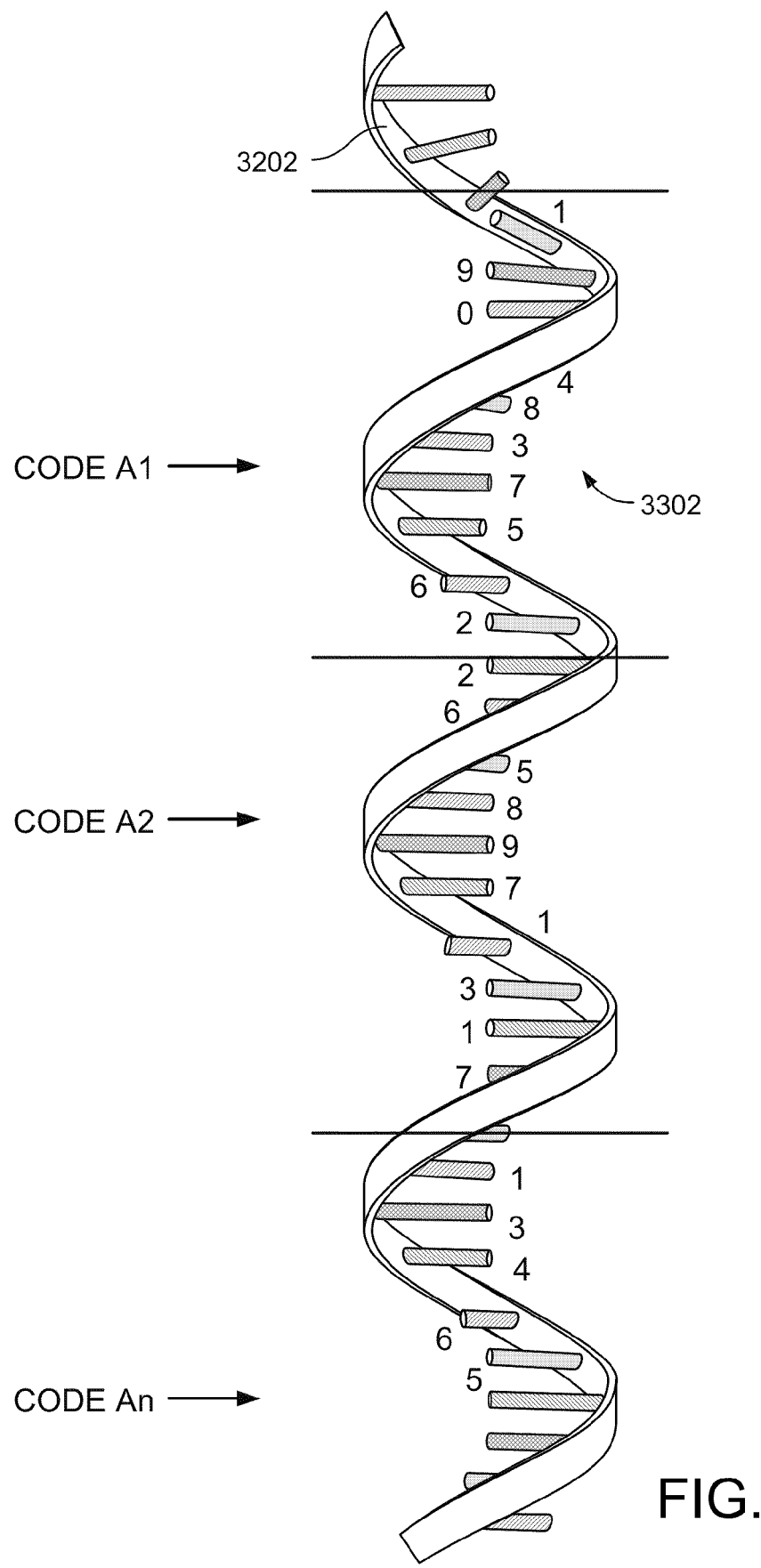
FIG. 33 is a schematic diagram providing a comparison between a single DNA strand and a numerical code.

FIG. 33 is a schematic diagram providing a comparison between a single DNA strand 3202 (and associated chemicals) and a numerical code 3302. Numerical code 3302 includes a plurality of codes A1, A2, . . . , An. In this example, each code includes ten digits. Code A1 is made up of the following ten digits arranged in a particular sequence: "1904837562." Code A2 is also made up of ten digits: "2658971317." Numerical code 3302 can include any number (n) of codes.

A data packet generator operates in some embodiments to generate a code that is analogous to a DNA strand and can be used in the identification of anything associated with the code, whether living, non-living, physical (e.g., an object or location), or non-physical (e.g., information stored in digital form). Accordingly, some embodiments are a biomimic of DNA. In some embodiments, a process for authenticating using numerical codes is referred to as dynamic numeric authentication, and can also be abbreviated with the acronym DNA. In contrast to identification through natural DNA, dynamic numeric authentication uses numbers in place of chemicals and time in place of length in some embodiments. Accordingly, an advantage of dynamic numeric authentication is that authentication can be achieved without the identifier having to take up space (e.g., the size of time, numbers, and the sequence of numbers themselves is nothing). The only space consumed is that needed by hardware. Furthermore, when a code generator algorithm is used, an advantage of some embodiments is that the current codes disappear (or are deleted) once their time has expired, leaving no room for duplicating later on or elsewhere (and even if duplicated, the code is no longer valid after expiration). Further, such past codes do not have to continue to consume space in memory, in some embodiments.

In some embodiments, each code (e.g., A1) generated is only a portion of an overall numerical code 3302 (e.g., each code is a segment of numerical code 3302). If a particular code (e.g., A1) is not sufficient to provide a unique identification, an additional code (e.g., A2) or set of codes can be used until the combined codes (e.g., A1 and A2) provide a unique identifier.

As previously illustrated in FIG. 32, natural DNA typically includes two uniting strands. In a similar manner, some embodiments of dynamic numeric authentication unite two or more identifiers to generate a combined identifier. As one example, a first data packet generator is in data communication with a nearby data packet generator (such as via wireless communication). The second data packet generator communicates a code to the first data packet generator. The first data packet generator then combines the received code with its own code and uses the combined code for identification.

Figure 34:
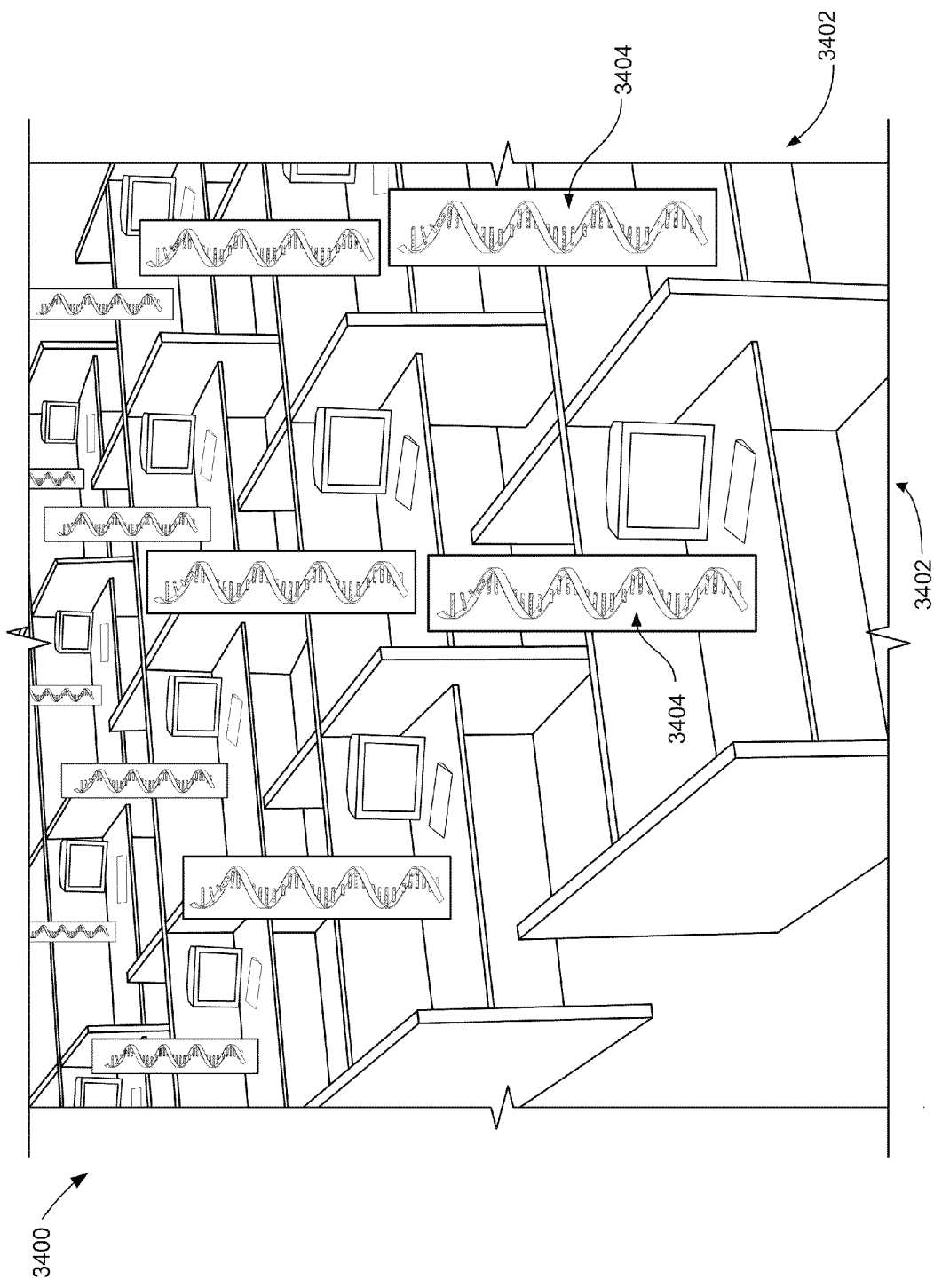
FIG. 34 is a schematic diagram illustrating an example facility according to the present disclosure.

FIG. 34 is a schematic diagram illustrating an example facility 3400. Facility 3400 includes a plurality of workspaces 3402. FIG. 34 provides a visual depiction of dynamic numeric authentication according to some embodiments. Each workstation is associated with a numerical code 3404 (schematically illustrated as a single DNA strand). In some embodiments the numerical code 3404 is generated by a data packet generator as described herein. In some embodiments, the numerical code 3404 provides an identifier that can be used to identify a location, such as a particular workstation in facility 3400. In other embodiments, the identity of a data packet generator is identified. The expected location of the data packet generator is then determined. The actual location (or approximate location) of the data packet generator is then verified (or determined) by use of the mesh network described herein and, in some embodiments, a geospatially aligned CAFM system.

Figure 35:
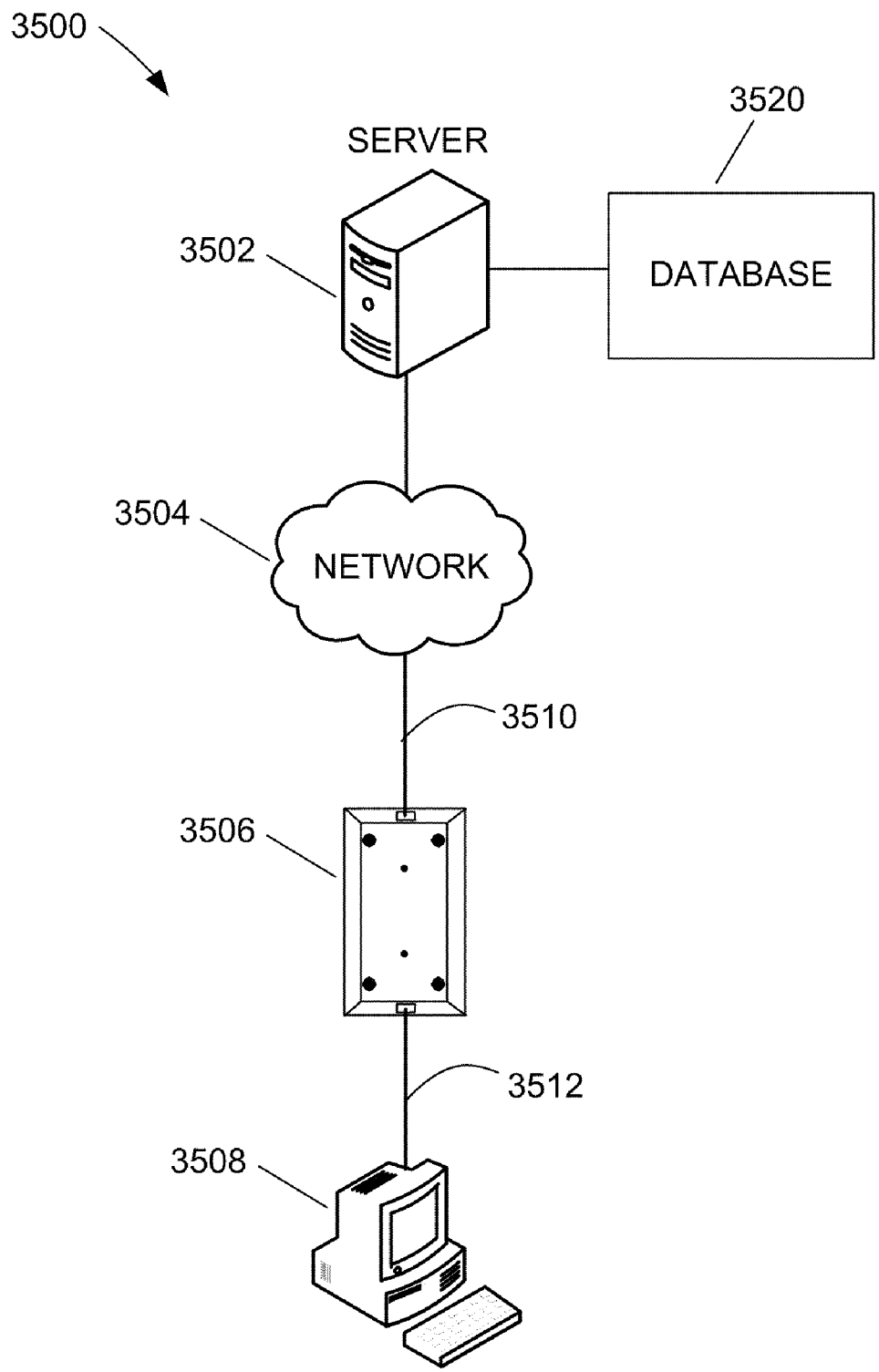
FIG. 35 is a schematic block diagram of another example system including a data packet generator.

FIG. 35 is a schematic block diagram of another example system 3500. In this example, system 3500 includes server 3502, network 3504, data packet generator 3506, and computing device 3508. System 3500 also includes a communication path 3510 and a communication path 3512. In some embodiments server 3502 includes database 3520.

In this example, server 3502 is configured to communicate across network 3504, such as the Internet or other data communication network. The server 3502 includes or is in data communication with database 3520. In some embodiments, server 3502 includes one of a variety of possible server software applications, such as Microsoft Exchange Server, Microsoft SQL Server, and DHCP server. In some embodiments, server 3502 further includes one or more database software applications that implement database 3520.

Data packet generator 3506 is also configured to communicate across network 3504 by way of communication path 3510. One example of communication path 3510 is a wire or set of wires, such as an Ethernet cable or telephone cable that permit wired communication with network 3504. Another example of communication path 3510 is a wireless communication path, such as through a wireless access point that permits wireless communication with network 3504. In some embodiments wireless communication occurs according to a wireless communication protocol, such as one of the 802.11 protocols, or another wireless data communication protocol.

In some embodiments, data packet generator 3506 is fastened to another object, such as a top or bottom of a work surface, a wall, a cabinet, or other object. Some embodiments are semi-permanently fastened to the object, requiring at least one tool to disconnect the data packet generator 3506 from the object. In some embodiments, data packet generator 3506 can be removed from the object to which it is fastened, or alternatively, the object to which it is fastened can itself be moved. As a result, data packet generator 3506 is semi-transient in some embodiments, such that the location of the data packet generator 3506 can change.

In some embodiments, data packet generator 3506 is also configured to communicate with computing device 3508 across data communication path 3512. Data communication path 3512 is wired in some embodiments, wireless in other embodiments, and a combination of wired and wireless in yet other embodiments. Examples of wired and wireless communication paths are discussed above.

Computing devices 3508, such as desktop computers and laptop computers, are commonly configured to connect to a network, such as the Internet or a local area network, through an Ethernet cable. The combination of wired communication paths 3510, data packet generator 3506, and wired communication path 3512, acts in some embodiments as an enhanced Ethernet cable, which permits computing device 3508 to communicate with network 3504 by sending and receiving messages through data packet generator 3506.

Figure 36:
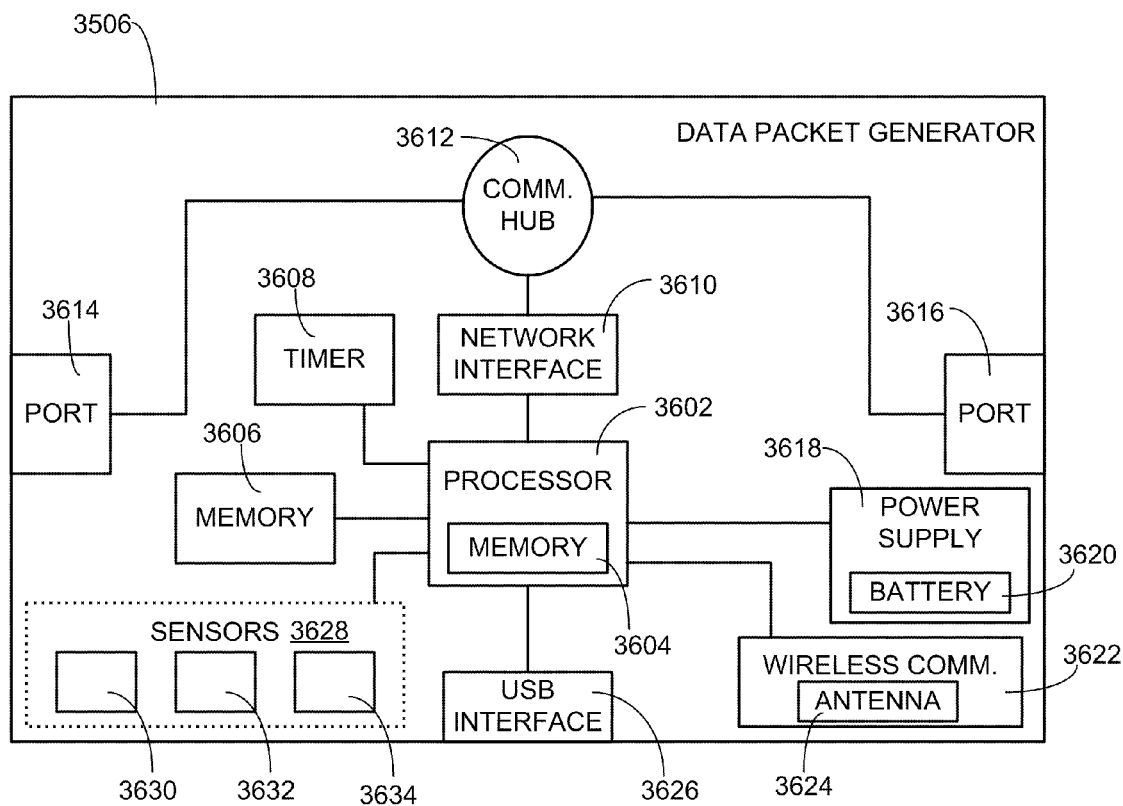
FIG. 36 is a schematic block diagram of an example data packet generator.

FIG. 36 is a schematic block diagram of the example data packet generator 3506, shown in FIG. 35. In this example, data packet generator 3506 includes processor 3602 (including memory 3604), memory 3606, timer 3608, network interface 3610, communication hub 3612, network port 3614, computer port 3616, power supply 3618 (including battery 3620), wireless communication device 3622 (including antenna 3624), USB interface 3626, and sensors 3628 (including sensors 3630, 3632, and 3634).

Processor 3602 is a physical component that operates to process data instructions. In addition to the other examples described herein, another example of processor 3602 is an ultra low power Wi-Fi chip, such as the GS1010 or GS1011, manufactured by GainSpan Corporation located in Los Gatos, Calif., US.

Memory 3604 and 3606 is provided for storage of digital data. Examples of memory are discussed herein. In some embodiments, memory 3604 and/or 3606 contains data instructions, which when executed by the processor, cause the processor to implement one or more of the methods, modules, operations, or functions described herein. For example, in some embodiments the data instructions cause processor 3602 to generate a data packet. The data packets are generated periodically in some embodiments, such as described herein. In some embodiments the data packet includes a serial number of data packet generator 3506, one or more passcodes, or other data. Examples of data that can be included in data packet generator 3506 are described herein.

One or more timers 3608 are included in some embodiments to provide timing signals. In some embodiments there are two or more timers. A first timer provides timing systems for general operation of data packet generator 3506. A second timer is used for a real-time clock. The real-time clock is used to keep the data packet generator 3506 synchronized with other data packet generators, such as to identify a common wake up time.

Network interface 3610 provides a data communication interface between processor 3602 and communication hub 3612. An example of network interface 3610 is an Ethernet interface device.

Communication hub 3612 is a network hub that permits data communication between network port 3614 (which can be connected to a network, such as the Ethernet, for receiving network communications), network interface 3610, and computer port 3616 (which can be connected to a computing device, such as a personal computer). An example of communication hub 3612 is an Ethernet communication hub. Communication hub 3612 is, in various embodiments, a passive hub, an active hub, or an intelligent hub. When a packet is received at communication hub 3612 from ports 3614, 3616 or network interface 3610, the package is communicated to the other ports 3614, 3616 or network interface 3610. A header of the package is read by the receiving devices to determine if the package is addressed to that device. If so, the package is received and processed by that device. If not, in some embodiments, the package is ignored (or discarded) at that device.

In some embodiments, data packet generator 3506 further includes an electronic gate (not shown) configured between the communication hub 3612 and network port 3614. In this example, incoming packets received at computer port 3616 from computing device 3508 that are addressed to the data packet generator 3506, can be selectively blocked by the electronic gate, while still being received at the network interface 3610. Other communications, however, such as communications between computing device 3508 and server 3502, are allowed to pass through the electronic gate uninterrupted. In some embodiments, data packet generator 3506 is a gateway.

Power supply 3618 provides power to data packet generator 3506. In some embodiments power supply 3618 includes one or more batteries 3620. In some embodiments the battery 3620 is small, such as sufficient to maintain data in memory 3606, or to continue operating timer 3608. In other embodiments, battery 3620 is sufficient to fully power all of the components of data packet generator 3506.

Power supply 3618 typically includes filtering electronics to supply a consistent power source to data packet generator 3506. Further, some embodiments of power supply 3618 receive power from an external source. For example, some embodiments of data packet generator 3506 include a power cord or power input port for receiving a power cord. In another possible embodiment, power is received at power supply 3618 from data ports 3614 or 3616, such as from a Power over Ethernet system. Some embodiments include solar panels to convert light into electricity. Other embodiments receive power from other sources, such as from electromagnetic waves or electromagnetic induction.

In some embodiments, data packet generator 3506 includes a wireless communication device 3622 that permits data packet generator 3506 to send and/or receive data wirelessly, such as through antenna 3624.

Some embodiments include additional communication devices, such as a universal serial bus interface 3626. USB interface 3626 operates to communicate with a USB device according to one or more USB communication protocols. In some embodiments power supply 3618 receives power through USB interface 3626. In some embodiments, external devices are connected with the data packet generator 3506 through USB interface 3626. Examples of external devices include a USB memory stick, a camera, an external sensor, or a wide variety of other external devices. Other communication protocols are used in some embodiments.

Sensors 3628 are included in some embodiments. Other embodiments include multiple sensors, such as sensors 3630, 3632, and 3634. Examples of sensors include tamper sensors (such as a screw presence sensor), position sensors (including GPS receivers, altitude sensors, distance from floor or ceiling sensors), movement sensors (such as an accelerometer), temperature sensors, user presence sensors (e.g., heat, motion, or sound sensors), smoke detector, asset tag sensor (such as an RFID receiver or 802.11 communication device), or other sensors. Some embodiments do not include sensors 3628.

FIGS. 37-49 illustrate various possible embodiments of data packet generator 3506 having different form factors.

Figure 37:
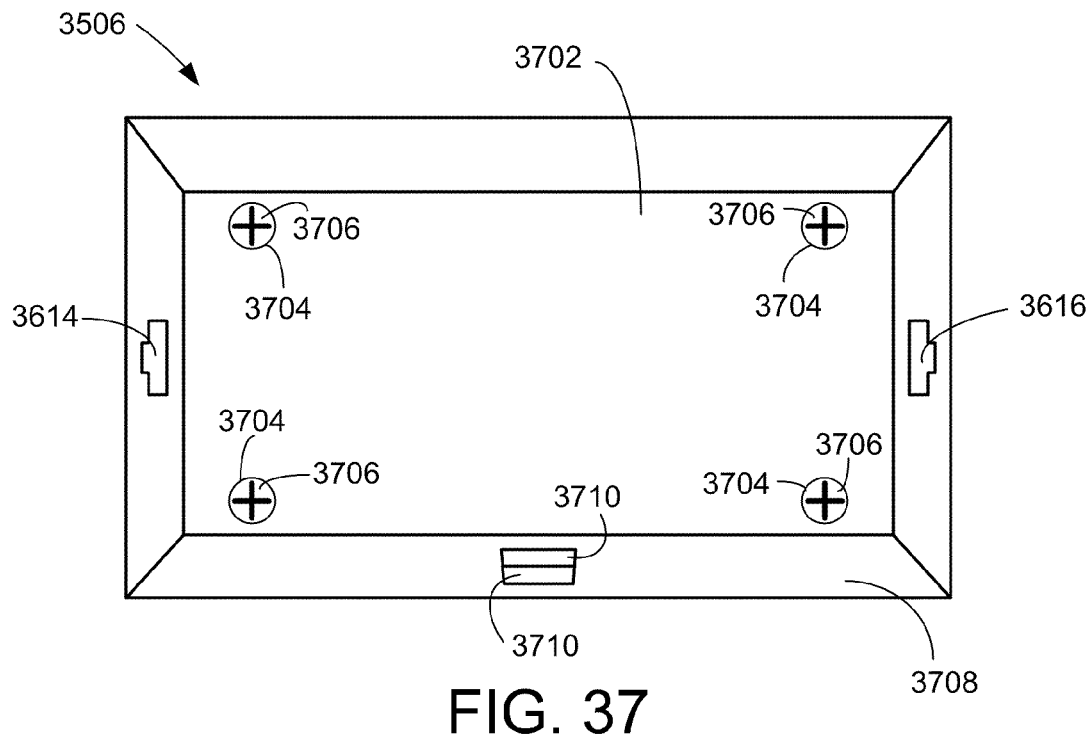
FIG. 37 is a plan view of an example data packet generator.
Figure 38:
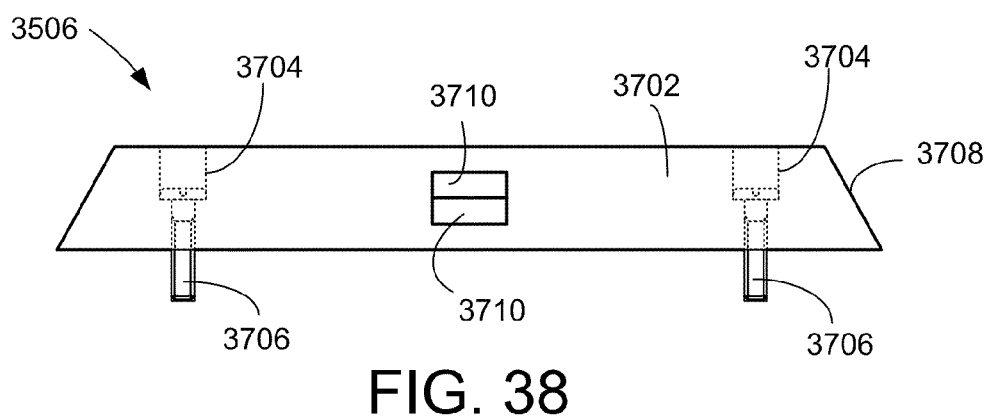
FIG. 38 is a side view of the example data packet generator shown in FIG. 37.
Figure 39:
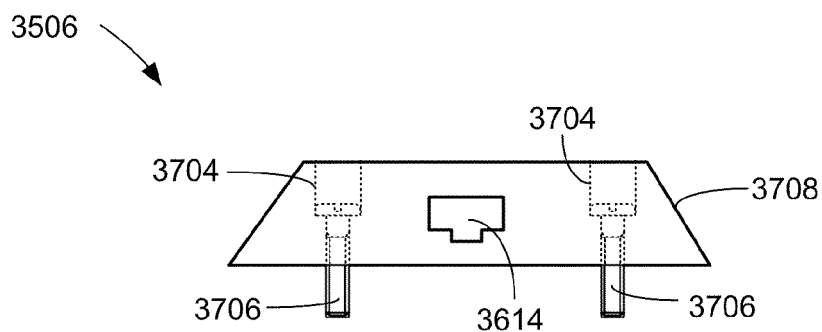
FIG. 39 is another side view of the example data packet generator shown in FIG. 37.

FIGS. 37-39 illustrate an example embodiment of the data packet generator 3506. FIG. 37 is a plan view, FIG. 38 is a side view, and FIG. 39 is another side view.

In this example, data packet generator 3506 includes housing 3702, fastener holes 3704, fasteners 3706, tapered edges 3708, USB ports 3710, network port 3614, and computer port 3616.

Housing 3702 provides a protective enclosure for components of data packet generator 3506. Although one exemplary shape is illustrated, other embodiments include other shapes. In this example, housing 3702 includes tapered edges 3708 that reduce or eliminate sharp corners. Housing 3702 is configured to be securely mounted, in some embodiments, to a work surface, such as a top or bottom surface of a desk. In this example, housing 3702 includes fastener holes 3704 configured to receive fasteners 3706, such as screws. To mount data packet generator 3506 to a work surface (or other object), fasteners 3706 are inserted through fastener holes 3704 and into the work surface.

In some embodiments, data packet generator 3506 includes network port 3614. In one example, network port 3614 is an Ethernet port configured to receive an Ethernet plug of an Ethernet cable. Other embodiments include other ports, such as a telephone port or USB port. In some embodiments, network port 3614 is configured to receive an Ethernet cable that is connected to an Ethernet port, such as in a wall that is in data communication with a network, such as a local area network or the Internet. Some embodiments include multiple network ports 3614 (e.g., two, three, four, or more). Other embodiments do not include network ports 3614.

Data packet generator 3506 further includes, in some embodiments, a computer port 3616. An example of a computer port 3616 is an Ethernet port. In some embodiments the computer port 3616 is configured to receive an Ethernet plug of an Ethernet cable. In some embodiments, network port 3614 is configured to receive an Ethernet cable that is connected to a computer, such as through the computer's Ethernet port. Some embodiments include multiple computer ports 3616 (e.g., two, three, four, or more).

Some embodiments of data packet generator 3506 include one or more external connectors, such as USB ports 3710. In some embodiments, USB ports 3710 are electrically connected to USB interface 3626, shown in FIG. 36. In this example, two USB ports 3710 are shown, although other embodiments include one, two, three, four, or more USB ports 3710. Some embodiments do not include USB port 3710. Other embodiments include other external connectors configured to communicate using a data communication protocol. In other embodiments, one or more external connectors deliver or receive power or perform another function.

In some embodiments, ports 3614, 3616, and external ports such as USB ports 3710 are holes formed in housing 3702. For example, the holes are configured to receive a wire, set of wires, cable, or other object or device. In other embodiments, ports are physical connectors configured to receive a standard or non-standard plug, such as RJ45 jacks, USB jacks, or other data ports.

Figure 40:
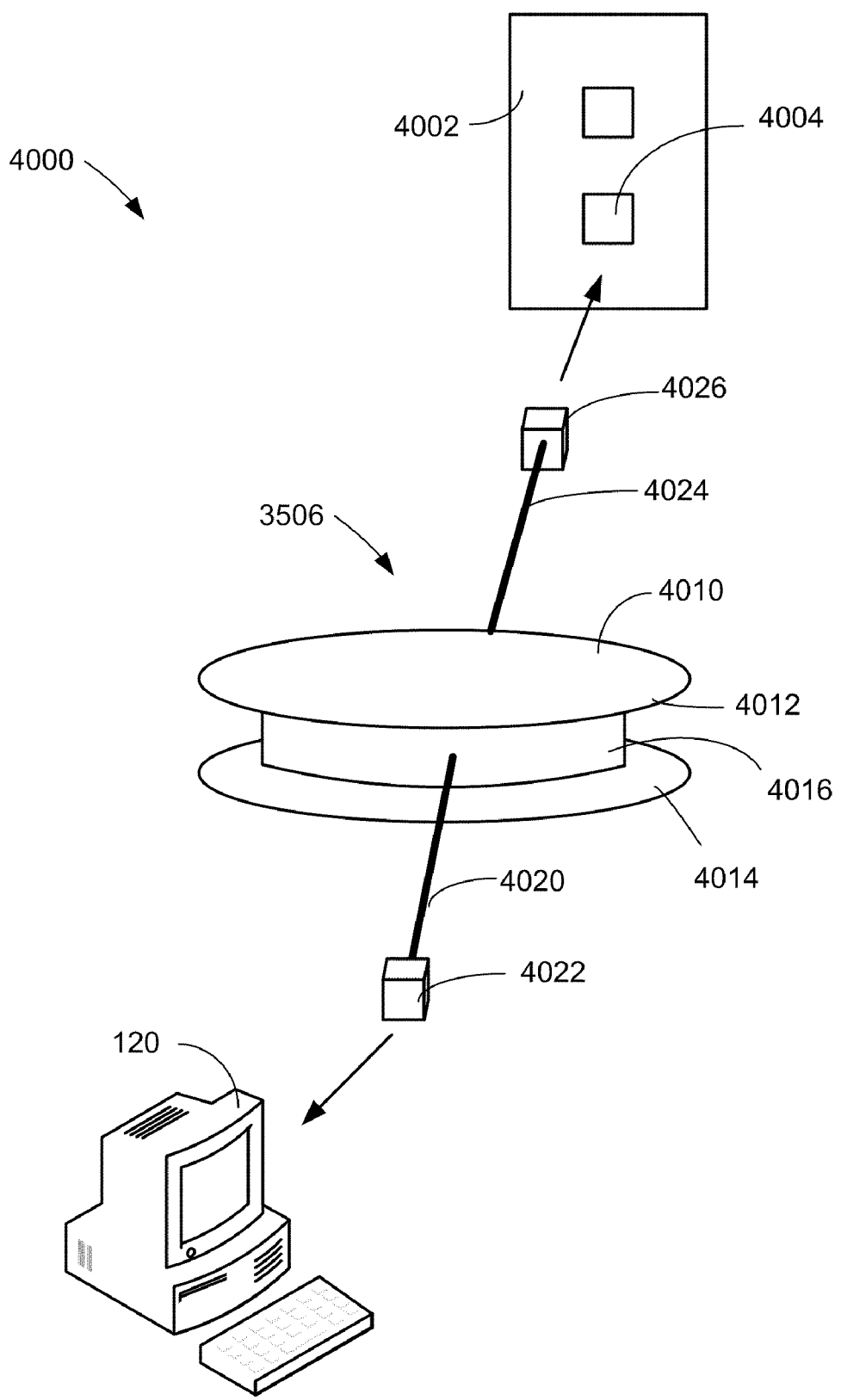
FIG. 40 is a schematic perspective view of an example system including another example data packet generator.
Figure 41:
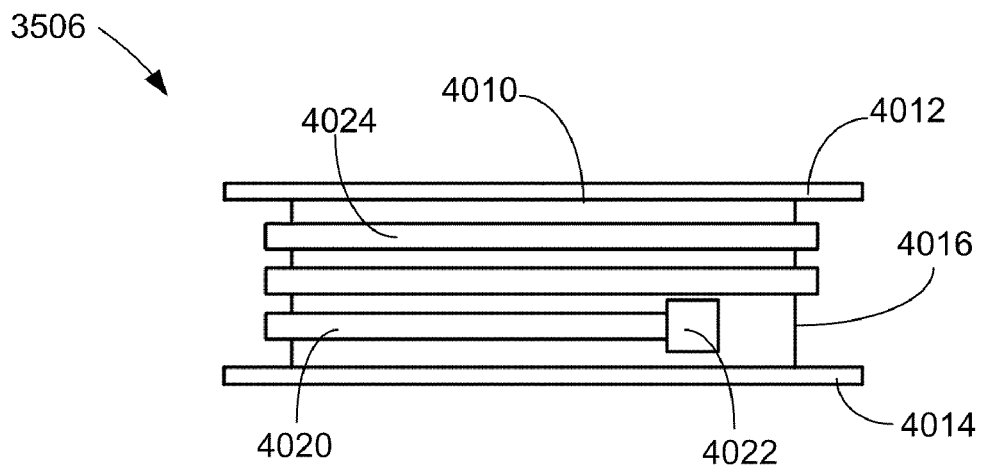
FIG. 41 is a side view of the example data packet generator shown in FIG. 40.
Figure 42:
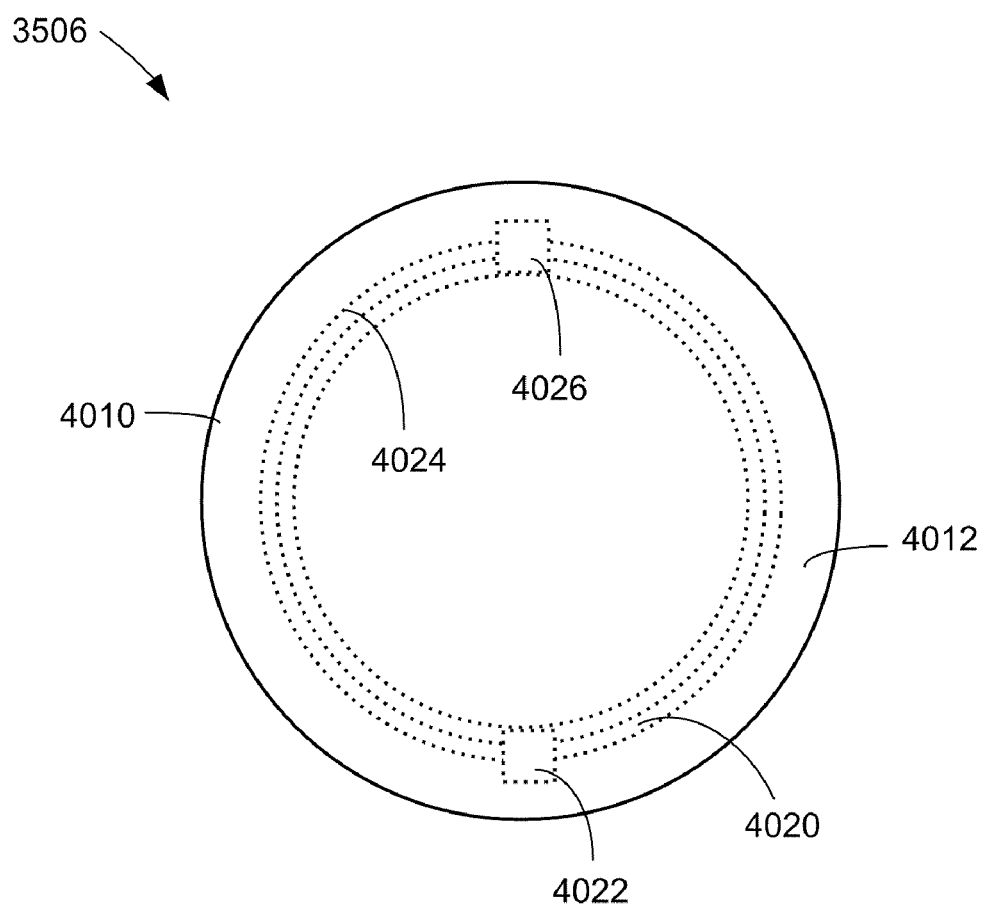
FIG. 42 is a plan view of the example data packet generator shown in FIG. 41.

FIGS. 40-42 illustrate another example embodiment of data packet generator 3506. FIG. 40 is a schematic perspective view of an example system 4000 including data packet generator 3506. FIG. 41 is a schematic side view of data packet generator 3506 in a storage configuration. FIG. 42 is a schematic plan view of data packet generator 3506, also in a storage configuration.

In some embodiments, data packet generator 3506 is configured for use in system 4000. In this example, system 4000 includes computing device 120, data packet generator 3506, and network wall port 4002. Examples of computing device 120 are described herein.

In some embodiments, data packet generator 3506 is configured for connection between network wall port 4002 and a computing device 120. In some embodiments, data packet generator 3506 operates as an Ethernet cable to communicate digital data between network wall port 4002 and computing device 120.

Network wall port 4002 is, for example, one, two, or more Ethernet ports (e.g., RJ45 jacks) installed in a wall outlet configuration. Other embodiments of system 4000 do not include network wall ports 4002, but do include other network ports for connection to a local area network or the Internet, for example.

In the example shown in FIGS. 40-42, data packet generator 3506 includes housing 4010, network cable 4020, and network cable 4024.

Housing 4010 forms an enclosure for housing components of data packet generator 3506, such as components shown in FIG. 36. In this example, housing 4010 further includes a cable storage region 4016. The cable storage region 4016 is formed in a recess between flanges 4012 and 4014. When in a storage configuration, network cables 4020 and 4024 are wrapped around housing 4010 and arranged within cable storage region 4016, as shown in FIGS. 41 and 42. During use, network cables 4020 and 4024 are unwrapped (or partially unwrapped) from cable storage region 4016, such as to reach between a network port of computing device 120 and network wall port 4002. When network cables 4020 and/or 4024 are at least partially unwrapped from cable storage region 4016, the data packet generator 3506 is in a ready-to-use configuration.

In another possible embodiment, housing 4010 includes a cable retraction and storage system. An example of a cable retraction and storage system includes a spool and a spring mechanism. When the network cables 4020 and 4026 are in the ready-to-use configuration, the spring mechanism can be activated to retract the network cables 4020 and 4024, which causes the network cables to wrap around the spool. The network cables 4020 and 4024 are extended by pulling on one or more of the network cables 4020 and 4024. An anti-retraction mechanism is used in some embodiments to selectively lock network cables 4020 and 4024 in the desired extended and ready-to-use configurations. Other embodiments include other configurations including an alternative cable storage region. Further, in some embodiments, straps or bands are used to hold network cables 4020 and 4024, when the network cables 4020 and 4024 are in the storage configuration.

In this example, network cable 4020 includes plug 4022. Network cable 4024 also includes plug 4026. Examples of plugs 4022 and 4026 are Ethernet plugs, such as RJ45 plugs, or other network plugs. Plug 4022 is, in this example, configured for connection with a network communication port of computing device 120. Plug 4026 is, in this example, configured for connection with a network port, such as port 4004 of network wall port 4002.

Some embodiments of data packet generator 3506, such as shown in FIGS. 40-42, include network cables 4020 and 4026 that are permanently and non-releasably connected to the data packet generator 3506 within housing 4010. In some embodiments, network cables 4020 and 4024 are permanently connected to data packet generator 3506 within housing 4010. In other embodiments, network cables 4020 and 4024 are non-releasably connected to data packet generator 3506 within housing 4010. This reduces the chance of a network communication failure, for example, and reduces the installation steps because network cables 4020 and 4024 do not have to be separately connected by a technician to housing 4010 as separate installation steps. Further, an advantage of some embodiments is that additional room is provided within housing 4010 for larger or additional batteries or other components.

Figure 43:
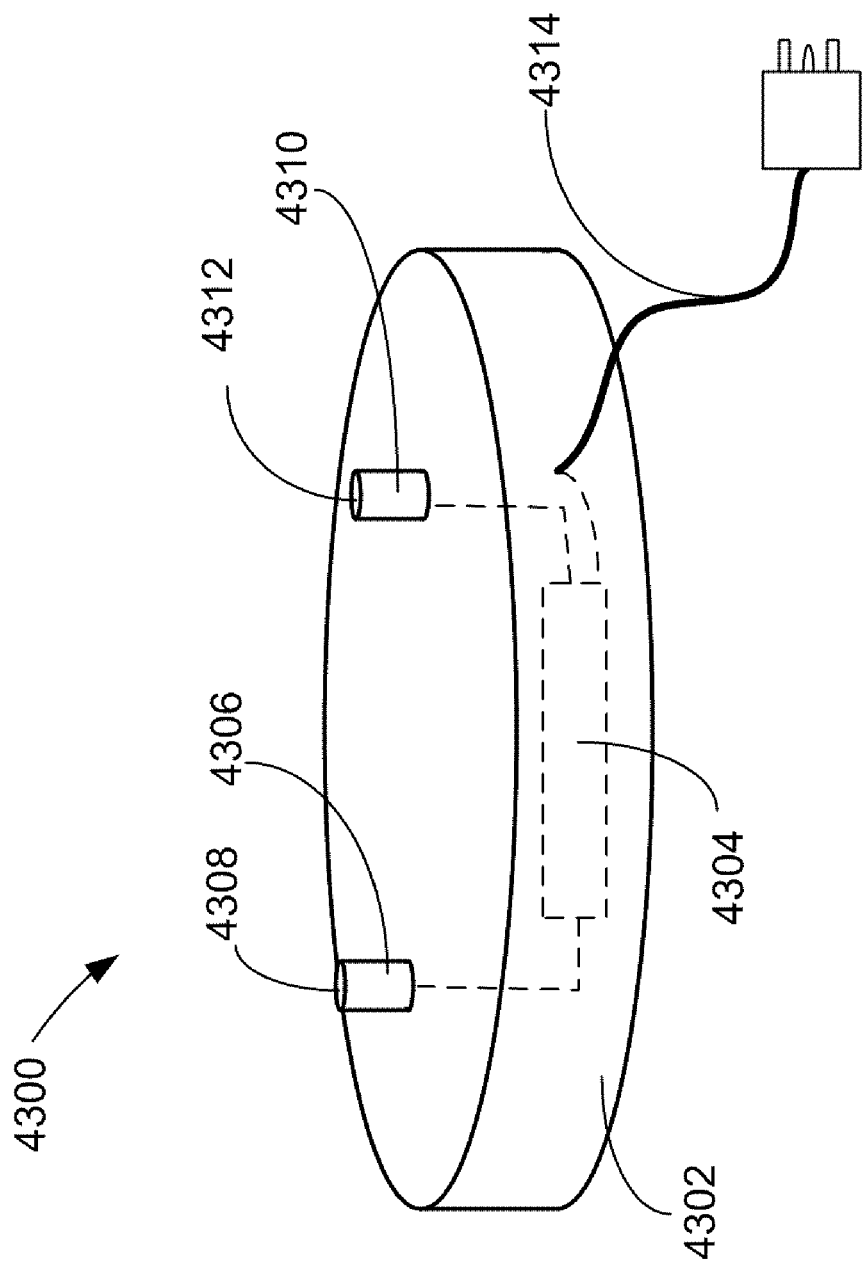
FIG. 43 is a perspective view of an example charging station for a data packet generator.
Figure 44:
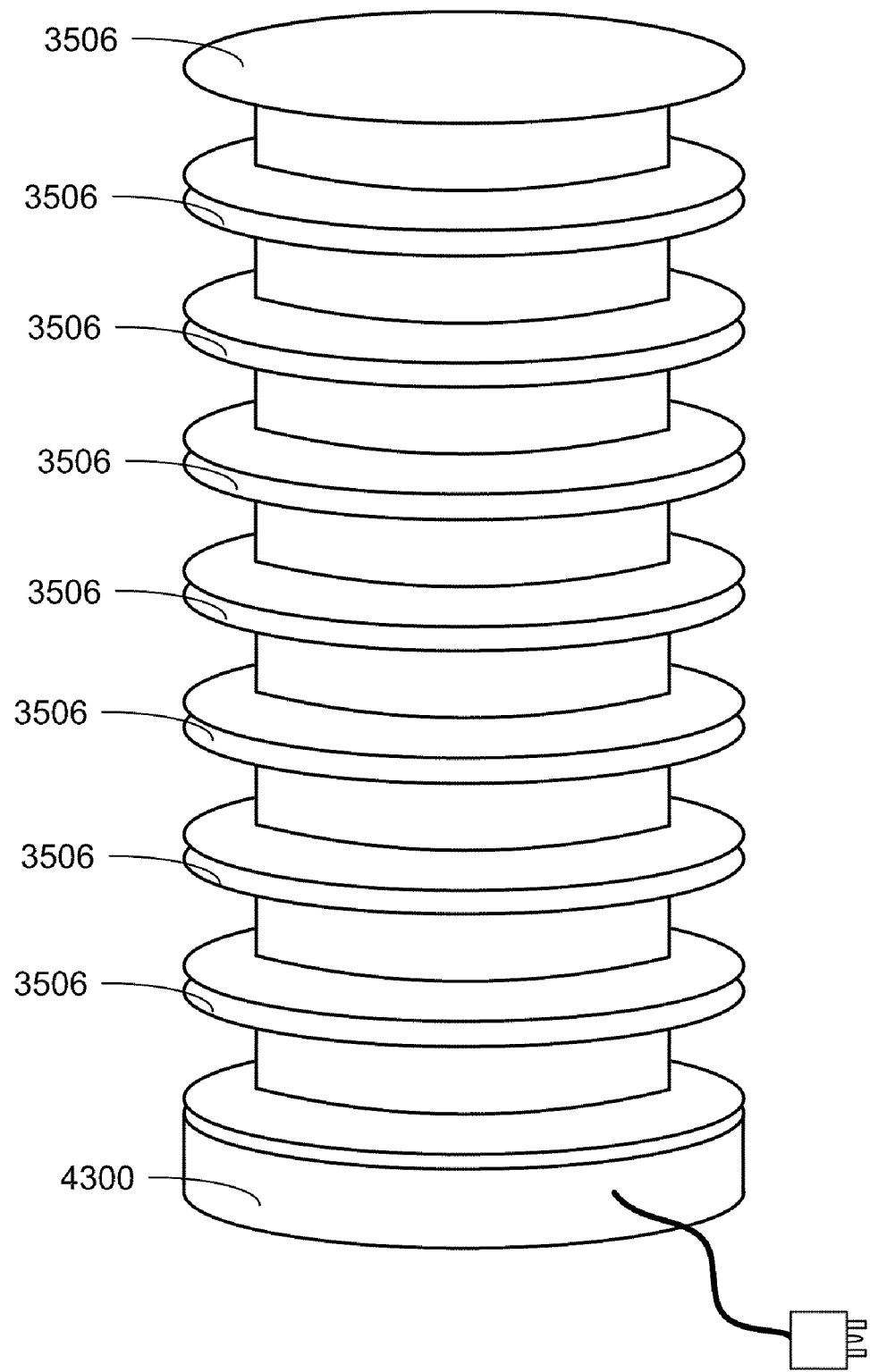
FIG. 44 is a perspective view of the example charging station shown in FIG. 43 including a plurality of data packet generators stacked thereon.

FIGS. 43-44 illustrate an example charging station 4300. FIG. 43 is a perspective view of an example charging station 4300. FIG. 44 is a perspective view of an example charging station 4300 including a plurality of data packet generators 3506 stacked thereon. The example charging station 4300 is used, in some embodiments, for storing one or more data packet generators 3506 (such as shown in FIGS. 40-42), and also for recharging batteries of one or more data packet generators, in some embodiments.

In this example, charging station 4300 includes a base 4302, charging electronics 4304, alignment pins 4306 and 4310, electrical contacts 4308 and 4312, and power cord 4314.

Base 4302 is configured to rest on a surface, such as a table or desk top. A high friction material (such as a foam or rubber material) is arranged on a bottom surface of base 4302 in some embodiments for added stability. Base 4302 includes an interior space for housing electrical circuitry 4304 therein. In some embodiments electronics include an AC to DC converter and power filtering circuitry. Some embodiments include smart charging circuitry, such as including a processor and memory and charge sensing circuitry that monitors the charging to provide a suitable amount of charging current to charge batteries of data packet generators 3506 and to stop charging when all batteries are fully charged. Some embodiments include a trickle charger.

In another possible embodiment, charging electronics generate magnetic or electromagnetic fields to charge one or more data packet generators 3506, such as by electromagnetic induction. As a result, some embodiments do not need electrical contacts 4308 and 4312.

In some embodiments base 4302 includes alignment pins 4306 and 4310 that act to align and aid in the correct positioning of a data packet generator 3506 thereon. In such embodiments, for example, data packet generators 3506 include matching receptacles that receive portions of alignment pins 4306. Other embodiments include other structures for alignment, such as a flange extending from an outer periphery. Another possible embodiment includes a support tube that extends generally vertically upward from the base for receiving and storing data packet generators 3506 therein.

In some embodiments, distal ends of alignment pins 4306 include electrical contacts 4308 and 4312 for delivering charging power from electrical circuitry 4304 to a data packet generator 3506 when stacked thereon. In such embodiments, data packet generators 3506 include electrical contacts within a corresponding receptacle that make an electrical connection with contacts 4308 or 4312. Further, in some embodiments, data packet generators 3506 further include pins and electrical contacts at an opposing surface, to allow yet another data packet generator 3506 to be stacked thereon. A portion of the charging power from contacts 4308 and 4312 is delivered to the additional one or more stacked data packet generators 3506. In this way, any number of data packet generators (e.g., two, three, four, five, or more) 3506 can be stacked on charging station 4300 for simultaneous charging.

Power cord 4314 provides power to electrical circuitry 4304 in some embodiments.

Figure 45:
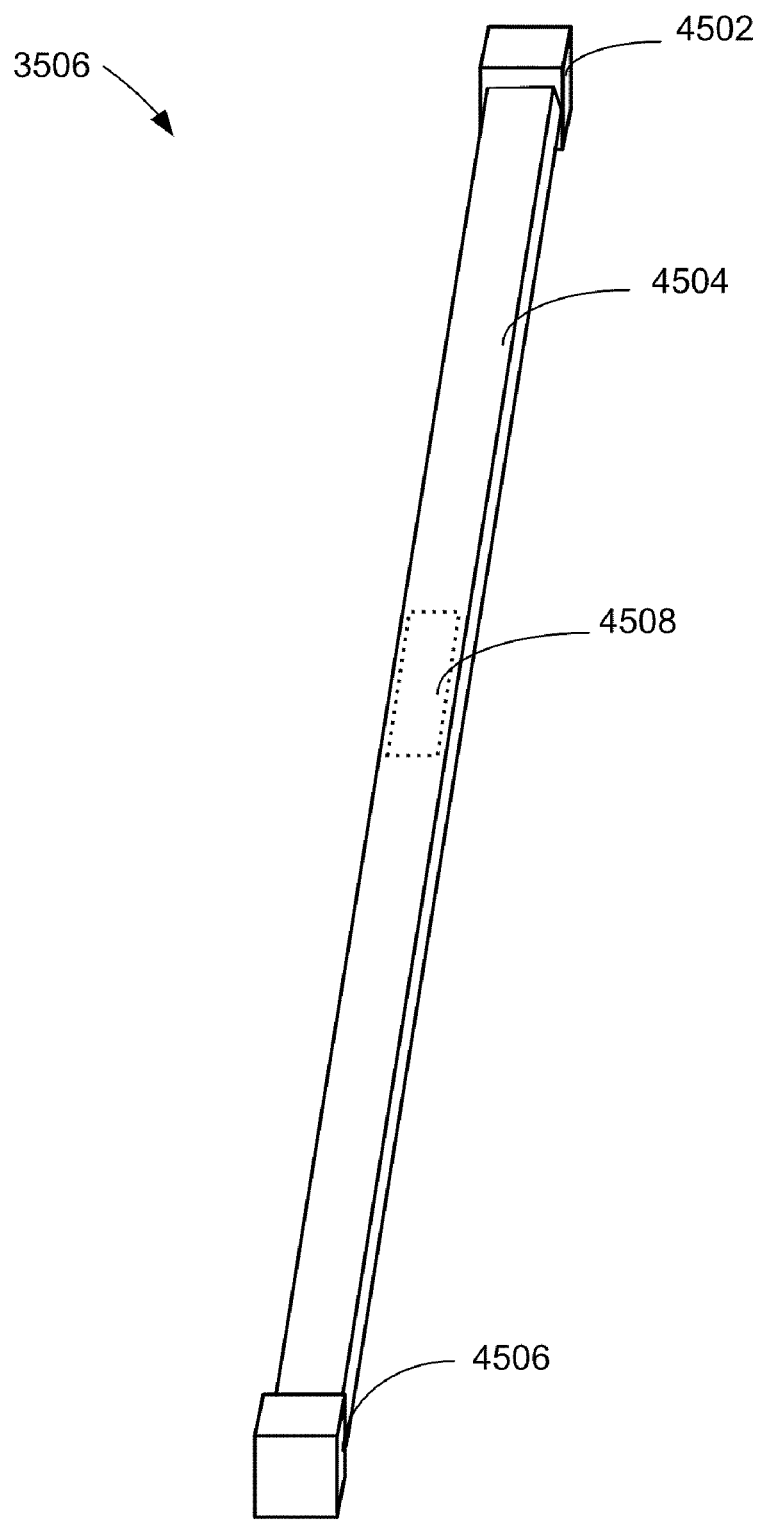
FIG. 45 is a perspective view of another example data packet generator.

FIG. 45 illustrates another example embodiment of data packet generator 3506. In this example, data packet generator 3506 is integrated into a cable, such as an Ethernet cable, and includes plug 4502, cable 4504 (including an outer sheath and one or more conductive wires), plug 4506, and components 4508.

Examples of plugs 4502 and 4506 are RJ45 plugs, but other embodiments include other plugs or connectors.

Cable 4504 includes an outer protective sheath and one or more conductive wires therein that are, in some embodiments, electrically connected to plugs 4502 and 4506.

In some embodiments, components 4508 are integrated into the space within the outer protective sheath of cable 4504. An example of components 4508 is illustrated and described with reference to FIG. 36, herein. Not all components are included in all embodiments. As one specific example, ports 3614 and 3616 are not included in some embodiments such as shown in FIG. 45. In some embodiments, communication hub 3612 is electrically coupled to wires within cable 4504.

In another possible embodiment, components 4508 are within a separate enclosure, other than cable 4504 sheathing. For example, heat shrink tubing is used to surround components 4508 and a portion of cable 4504. In another possible embodiment, components 4508 are within or adjacent to plugs 4502 or 4506.

Figure 46:
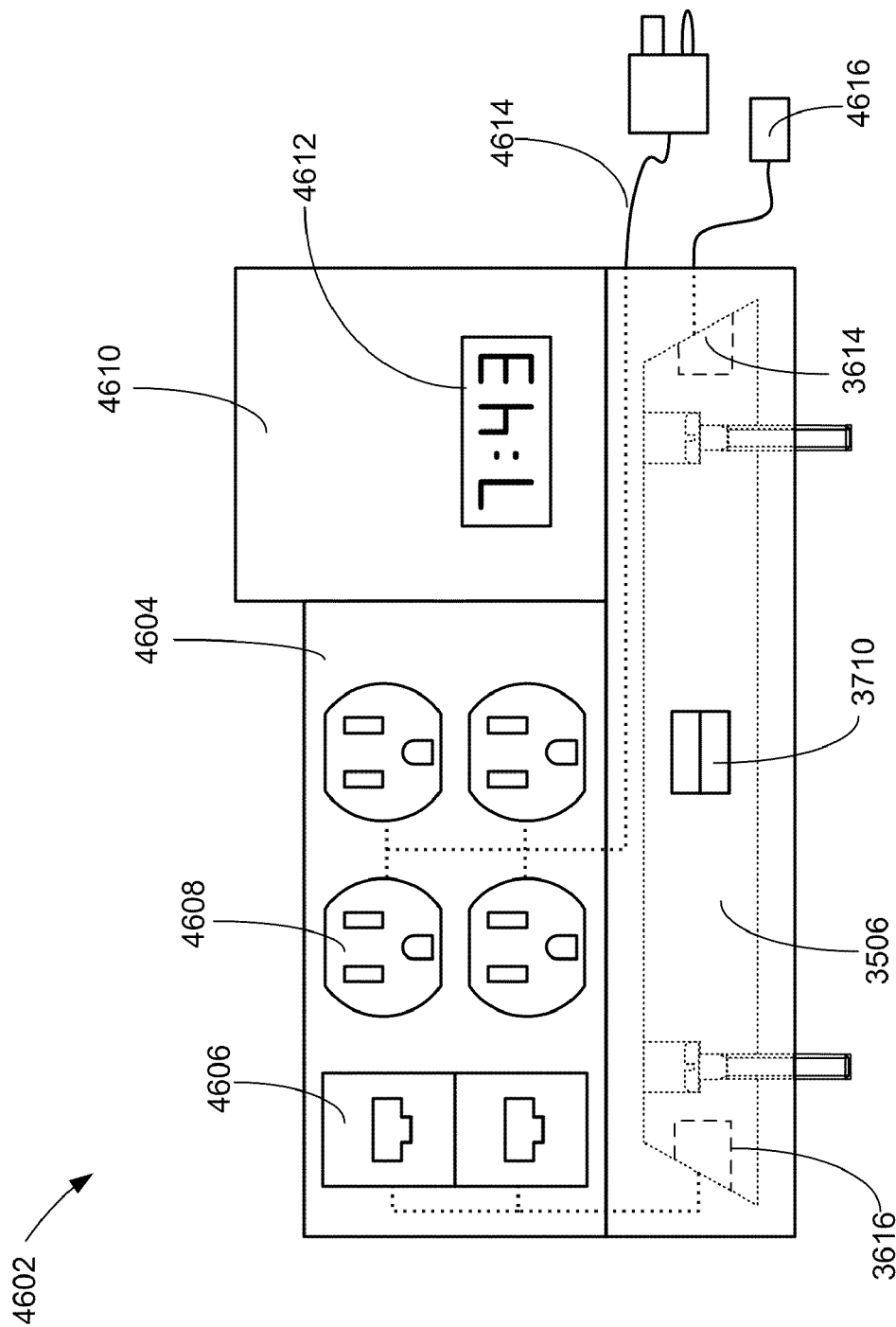
FIG. 46 is a front view of another example data packet generator in the form of a hoteling hub.

FIG. 46 is a front view of another example data packet generator 3506, in the form of a hoteling hub, such as configured for use in a hoteling station (e.g., a short-term, temporary, or unassigned work space, such as a cubicle or an office). In some embodiments, the hoteling hub 4602 is configured to receive a data packet generator 3506. In other embodiments, the hoteling hub 4602 is itself a data packet generator 3506.

The hoteling hub 4602 increases the functionality of the data packet generator 3506, in some embodiments. In this example, hoteling hub 4602 includes housing 4604, network ports 4606, electrical receptacles 4608, a pencil holder 4610, a clock 4612, a power cord 4614, and a network cable 4616. External ports, such as USB ports 3710 are also provided in some embodiments. Other embodiments include more or fewer components.

In this example, housing 4604 is configured to receive data packet generator 3506 therein. In some embodiments, housing 4604 is formed to permit access to portions of the data packet generator 3506, such as USB ports 3710. In other embodiments, housing 4604 fully encloses data packet generator 3506.

Various possible components are provided for added user convenience and to increase the functionality of data packet generator 3506. For example, in some embodiments additional network ports 4606 are provided. Network ports 4606 are connected to computer port 3616 of data packet generator 3506 in some embodiments. Network ports 4606 are connected to a network, such as a local area network or the Internet through data packet generator 3506, which is connected to the network through network cable 4616, for example. Other embodiments connect network ports 4606 directly to a network cable, without first passing through data packet generator 3506.

In some embodiments electrical receptacles 4608 are provided, such as connected to a power cord 4614 or an Ethernet cable (which receives power from a power over Ethernet system, for example). A pencil holder or other structural features are formed in housing 4604 in some embodiments. Some embodiments include a clock 4612 that displays the current time.

Figure 48:
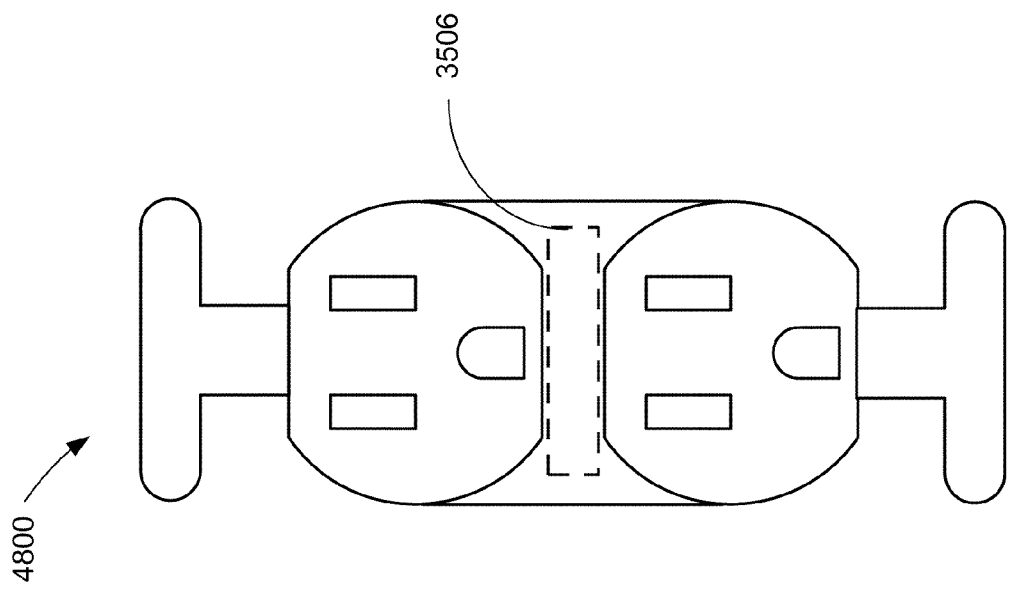
FIG. 48 is a front view of another example data packet generator in the form of a power receptacle.
Figure 47:
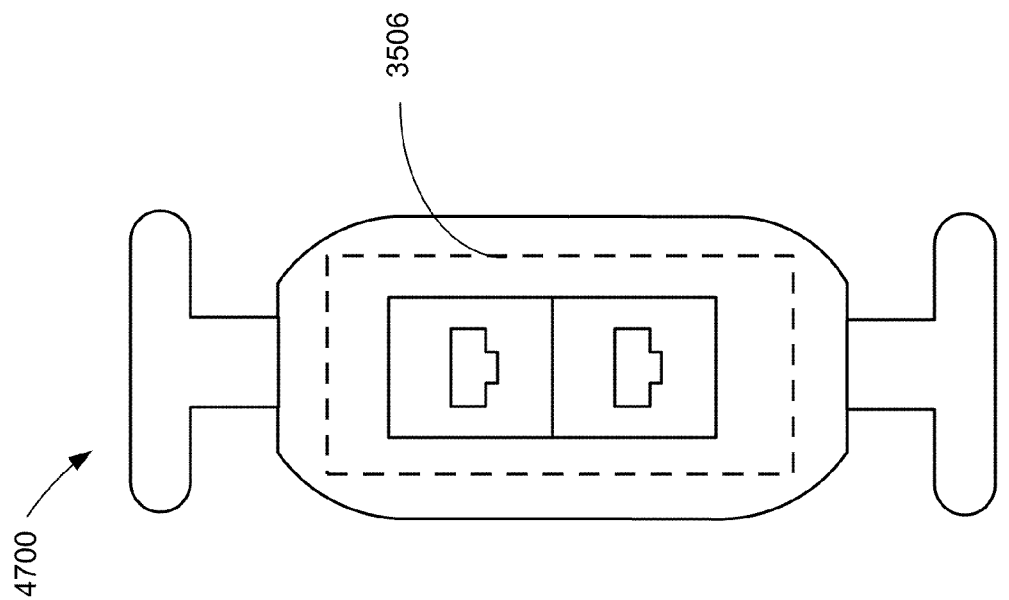
FIG. 47 is a front view of another example data packet generator in the form of a network receptacle.

FIGS. 47 and 48 illustrate further example embodiments of data packet generator 3506. FIG. 37 illustrates an example data packet generator 3506 integrated into a network receptacle 4700, such as an Ethernet receptacle. FIG. 38 illustrates an example data packet generator integrated into a power receptacle 4800. In some embodiments, network receptacles 4700 and power receptacles 4800 are configured for installation within a wall. Components of data packet generator 3506 are integrated into network receptacle 4700 and power receptacle 4800. Examples of such components are shown in FIG. 36.

FIG. 49 illustrates a further example embodiment of data packet generator 3506. In this example, data packet generator 3506 is integrated into a clock 4900.

FIG. 50 is a schematic block diagram of another example system 5000 utilizing wireless data communication. In addition, FIG. 50 illustrates a method for automatically identifying a nearest data packet generator 3506. In this example, system 5000 includes server 108, network 106, wireless access point 5002, computing device 120, data packet generator 3506' and data packet generator 3506". Some embodiments include multiple or many of the various components of system 5000, such as wireless access point 5002, computing device 120, and data packet generators 3506.

In some embodiments, computing device 120 is configured to communicate with network 106 wirelessly. Example of a wireless data communication protocols are the 802.11 series of data communication protocols, although other embodiments utilize other protocols. In this example, computing device 120 transmits and receives messages wirelessly with wireless access point 5002, which is in data communication with network 106. Other possible embodiments utilize wired communication, such as through a network cable.

Under the typical 802.11 wireless protocol, a particular local area network is assigned a friendly name, referred to as the service set identifier (SSID). In some embodiments, the SSID is up to 32 characters long. If configured to do so, the SSID is broadcast from wireless access point 5002 to permit computing device 120 (or the associated user) to identify the local area network and to determine whether or not the computing device 120 (or the associated user) wants to connect to that network. In this example, wireless access point 5002 broadcasts an SSID #1.

Once connected to the network of wireless access point 5002, a data communication path 5004 is formed between wireless access point 5002 and computing device 120. For example, computing device 120 can send messages to network 106 or server 108 by sending the messages to wireless access point 5002. Similarly, server 108 or network 106 can send messages to computing device 120 by sending the messages through wireless access point 5002.

When computing device 120 has formed data communication path 5004, most existing operating systems will not allow computing device 120 to also join an additional wireless communication network (although such dual communication is expected to be included as a feature in Microsoft® Windows® 7). As a result, if computing device 120 (or the associated user) wanted to connect temporarily to another communication path, data communication path 5004 would have to be terminated, and the alternate communication path be established. After communication, the alternate communication path would need to be terminated, and communication path 5004 reestablished. This process, particularly if being done automatically by a computer, could be disruptive to a user who is trying to send or receive data with computing device 120 across communication path 5004.

As a result, another option is illustrated in FIG. 50. In this example, even when data communication path 5004 is established, computing device 120 is configured to wirelessly receive additional SSIDs from devices other than (or in addition to) wireless access point 5002. This is performed without interrupting data communication path 5004.

Data packet generators 3506' and 3506" include wireless communication systems, such as 3622 shown in FIG. 36 that permit them to communicate data wirelessly to computing device 120 or wireless access point 5002, in some embodiments. The data packet generators 3506' and 3506" are configured to simulate a wireless access point, and to broadcast their own SSIDs. For example, data packet generator 3506' broadcasts an SSID of SSID #2 and data packet generator 3506" broadcasts an SSID of SSID#3. Computing device 120 is configured to receive the SSIDs, even when data communication path 5004 is active.

The SSIDs of data packet generators 3506' and 3506" are used to convey information to computing device 120 in some embodiments. For example, some embodiments insert a data packet into the SSID so as to convey an entire data packet to computing device 120 through SSID #2 or SSID #3. In this way, data generators 3506' and 3506" can send data to computing device 120, without interrupting communication path 5004.

One example of a data packet that is inserted into an SSID is a serial number of the data packet generator 3506' or 3506". Another example of a data packet is a passcode, such as including seven characters (or other passcodes described herein). Another possible example includes multiple passcodes, such as a previous passcode, a current passcode, and a next passcode. Yet another possible embodiment includes a serial number and one or more (two, three, four, or more) passcodes. One specific example of an SSID includes a serial number (e.g., seven digits), and three passcodes (e.g., each being seven digits). This example forms an SSID having 28 characters, which is less than the 32 character maximum of a typical 802.11 system.

The computing device 120 is configured to scan for SSIDs, and to receive all available SSIDs that are within wireless communication range. In some embodiments the SSIDs are then stored in memory of computing device 120, such as in a table 5010. In addition, in some embodiments the strength of the signal is measured by computing device 120, and the relative strength associated with each SSID is also stored in memory, such as in table 5010. In this example, SSID #1 has a strength of four bars (e.g., high strength), SSID #2 has a strength of three bar (e.g., good strength), and SSID #3 has a strength of three bars (e.g., moderate strength). Other embodiments identify strengths in other units, such as in mW or dBm.

The relative signal strength is one indication of the proximity of data packet generators 3506' and 3506" to computing device 120. In the example shown in FIG. 50, for example, it is likely that data packet generator 3506' is closer to computing device 120 than data packet generator 3506', due to the higher signal strength of the signal including the SSID #2 as compared to the signal strength of SSID #3. Although the signal strength can be attenuated by objects, such as a wall, between the data packet generators 3506 and computing device 5010, the signal strength is typically a good indication of relative distances. This information can be combined with additional information to obtain more accurate distance or location information in some embodiments.

After receiving the SSIDs, computing device 120 evaluates the SSIDs to determine whether the SSID is a data packet from a data packet generator 3506. In some embodiments this is performed by evaluating the content of the SSID, to determine if it conforms to an expected format, such as including a certain number of characters or digits, or including a particular code or identifier. In other embodiments, the SSIDs are all communicated to a server 108, which evaluates the SSIDs to determine which, if any, of the SSIDs are associated with a data packet generator 3506. For example, the server 108 first determines whether the serial number in the SSID is a valid serial number of a data packet generator. If so, the server 108 next determines whether one or more of the passcodes in the data packet is a valid passcode for the identified data packet generator.

After each SSID has been evaluated, whether by the computing device or server 108, a list of the nearby data packet generators 3506 is determined. In this example, SSID #2 and SSID #3 are both determined to contain a data packet. For each SSID that included a valid data packet, the signal strengths in table 5010 are then evaluated to identify the signal having the strongest signal strength. In this example, the signal associated with SSID #2 is determined to have the strongest signal strength. As a result, data packet generator 3506' is determined to be the nearest data packet generator, in some embodiments.

In some embodiments, after a particular data packet generator 3506' has been identified as being the nearest neighbor to another data packet generator 3506", that data packet generator 3506' will continue to be reported (or identified) as the nearest neighbor (even if the signal strength of data packet generator 3506' falls below another data packet generator 3506''') until that data packet generator 3506' is no longer available. This embodiment prevents false reports of movement based on small changes in signal strength, for example.

In another possible embodiment, data packet generators 3506 operate to receive signals from other data packet generators 3506, and/or from computing device 120. The information is communicated from the data packet generator 3506 to server 108, such as by sending the information to wireless access point 5002, or via a wired network connection.

In some embodiments a computing device operates to collect all of the data packets from a plurality of data packet generators, such as by wirelessly receiving and recording in memory each SSID that is transmitted by the data packet generators that are within a wireless communication range. The computing device then reports the collected data back to a server where is stored in memory and processed.

Further, in some embodiments full data packets are also received by the computing device (either via a wired network or wireless network) containing additional data. The computing device receives the full data packet as well as the SSID data packet and merges the data. In some embodiments the merged data is then communicated to the server.

Some computing devices described herein include a wireless communication card that is configured to receive SSIDs, but are not configured to join a wireless network identified by the SSID. Such a wireless communication card provides added network security by preventing undesired wireless data communication, while still allowing the computing device to receive data in the form of an SSID.

Figure 51:
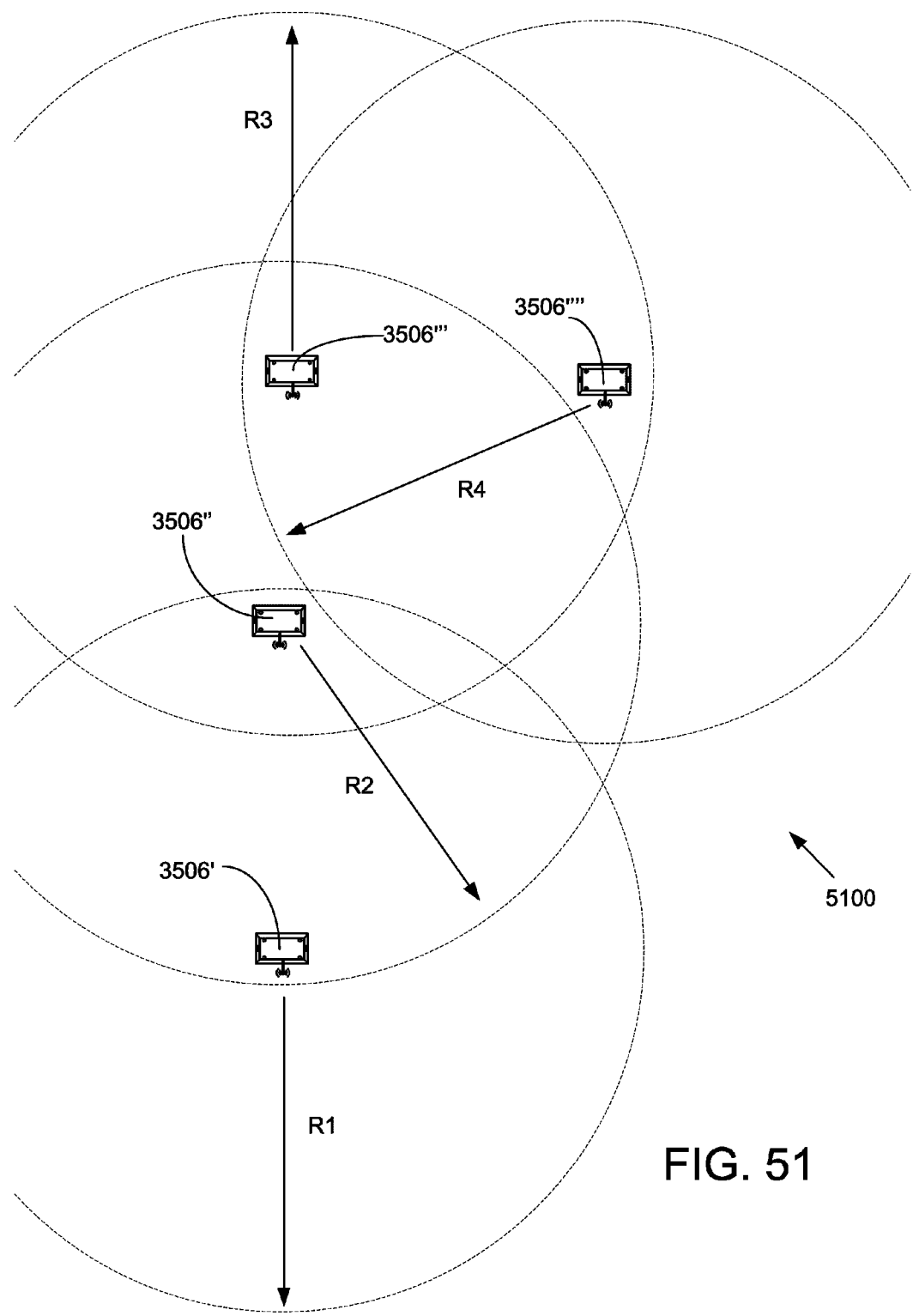
FIG. 51 is a schematic diagram of an example mesh network of data packet generators.

FIG. 51 is a schematic diagram of an example mesh network 5100. In this example, mesh network 5100 includes a plurality of data packet generators, including data packet generators 3506', 3506", 3506''', and 3506''''. Other embodiments include other numbers of data packet generators 3506. A method of locating one or more neighboring data packet generators 3506 is also described with reference to FIG. 51.

In some embodiments, data packet generators 3506 include a wireless communication system, such as 3622, shown in FIG. 36. The wireless communication system generates wireless signals having a signal range. Communication can occur between two data packet generators 3506 if they are both within each other's signal range R1.

In this example, data packet generator 3506' has a signal range of R1. In some embodiments the signal range is approximately a circular region surrounding data packet generator 3506', in the absence of objects that act to attenuate portions of the signal. Other embodiments have differently shaped signal regions, such that the distance of signal range R1 can be different in different directions.

In some embodiments, data packet generators 3506 have different wireless power levels, providing variable signal ranges. For example, some embodiments include a low and a high signal level. Another embodiment includes a high, medium, and low power level. A further embodiment includes four signal levels ranging from low to high. Yet other embodiments have more signal levels, such as five or more or ten or more signal levels.

One example embodiment of mesh network 5100 operates as follows. At a predetermined time (such as periodically each minute, hour, day, week, month, or year), all data packet generators 3506 wake up, form an ad hoc network and exchange a data packet. In some embodiments, each data packet generator 3506 begins with the lowest wireless power level, such as a low power level. The data packet generators then wait to receive a data packet from a neighboring data packet generator. If received, the data packet (or data from the data packet) is stored in memory. In some embodiments, the data packet generator associated with the received data packet is identified by the receiving data packet generator as being the nearest neighbor. If more than one data packet is received, then, in some embodiments, each of the data packet generators are identified as being the nearest neighbors. Alternatively, the relative strength of the received signals are used to further identify relative distances of data packet generators.

If a data packet is received, in some embodiments, the data packet generator 3506 then stops broadcasting. Alternatively, if only a single wireless power level is to be used, data packet generator 3506 stops broadcasting.

In other embodiments, the data packet generator 3506 continues broadcasting to search for additional neighbors. The wireless power level is adjusted to the next higher setting, and a second data packet is broadcast. The data packet generator 3506 then waits to receive a data packet from one or more neighboring data packet generators. If received, the data packet (or data from the data packet) is stored in memory. The process of increasing the wireless power level, broadcasting a data packet, and receiving a data packet (if any) continues, in some embodiments, until the data packet generator 3506 has broadcast a data packet at the highest power level, or highest selected power level.

This process allows data packet generators 3506 to identify their neighbors and to provide at least some information about the respective locations of each data packet generator.

In the example shown in FIG. 51, mesh network 5100 includes four data packet generators 3506', 3506", 3506''', and 3506''''. At the predetermined time, all data packet generators form an ad hoc network and exchange data packets within the respective signal ranges R1, R2, R3, and R4.

The data packet generators then receive data packets from neighboring data packet generators. For example, data packet generator 3506' receives a data packet from data packet generator 3506" because it is within signal range R2. Data packet generator 3506" receives a data packet from data packet generators 3506' and 3506''' because it is within the signal ranges R1 and R3. Data packet generator 3506''' receives data packets from data packet generators 3506" and 3506'''' because it is within the signal ranges R2 and R4. Data packet generator 3506'''' receives a data packet from data packet generator 3506''' because it is within the signal range R3.

After storing the data in memory, in some embodiments data packet generators are configured to insert some or all of the data into a data packet to be subsequently transmitted to another device, such as server 108, another data packet generator 3506, or a computing device.

When received by server 108, for example, the server acts in some embodiments to process the data and to determine whether any position or location changes have occurred. In some embodiments, server 108 identifies a location, or approximate location, of a data packet generator 3506 based on the locations of its nearest neighbors. In some embodiments the location data is used to generate a user interface display or is associated with a CAFM system. In other embodiments, tampering or relocating is detected by identifying the absence of a data packet generator that was previously within a mesh network 5100 or previously identified as a nearest neighbor to a particular data packet generator. Sometimes an accelerometer is used to identify which device experienced motion, since the data packets for all nearby data packet generators may change with just one simple reconfigure.

Figure 52:
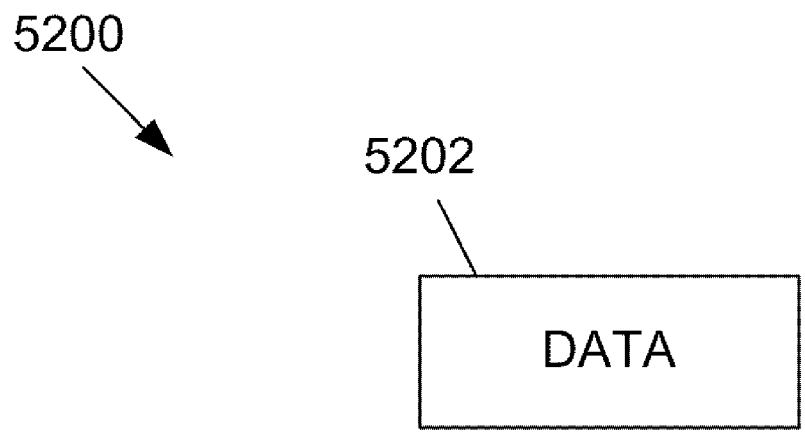
FIG. 52 is a block diagram of an example data packet.
Figure 53:
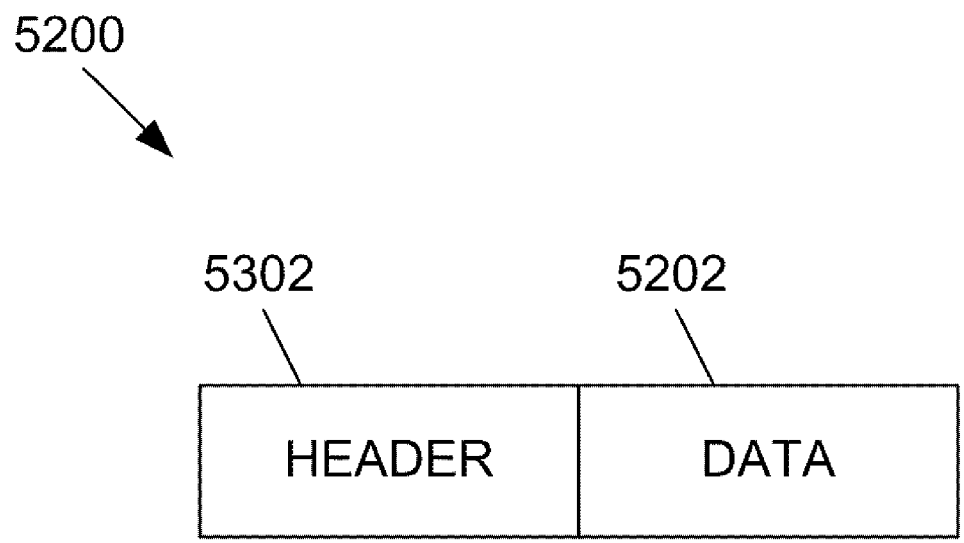
FIG. 53 is a block diagram of another example data packet.

FIGS. 52-53 illustrate various examples of data packets 5200. FIG. 52 is a block diagram of one embodiment of data packet 5200. FIG. 53 is a block diagram of another example data packet 5200.

One example of a data packet 5200 includes data 5202. Examples of data include a serial number or a passcode. As discussed herein, some embodiments display data packet

5200 on a display device, such as including a single passcode. In some embodiments data 5202 includes multiple pieces of data, such as a serial number and a passcode, or multiple passcodes, or a serial number and multiple passcodes, or alert codes or data described herein, or combinations of other data, such as data shown in Table 2 below, or other data described herein, or yet other data.

FIG. 53 is a block diagram of another example data packet 5200. In this example, data packet 5200 includes a header 5302 and data 5202. In some embodiments the header provides an address of the device that the data packet 5200 is addressed to. In some embodiments the header 5302 includes an SSID. In some embodiments data 5202 is included in header without a separate data 5202 section after the header. In some embodiments header 5302 identifies a number of bytes of data 5202 or of the entire data packet 5200. Further, some embodiments include a time stamp in header 5302. Other embodiments include other header 5302 data. As noted above, data 5202 includes one or more pieces of data in some embodiments.

Table 2 includes a list of various possible examples of types of data 5202 that are included in a data packet in some embodiments. Table 2 shows four particular examples of data packets, including examples 1, 2, 3, and 4.

Example 1 is data packet that includes only one piece of data, such as a passcode. This data packet 5200 is used in some embodiments when manual entry of the passcode is necessary.

Example 2 is a data packet 5200 including two pieces of data, such as a passcode and a user name. In some embodiments, the data packet of example 2 is generated by a computing device after receiving the data packet of example 1, by adding the username to the passcode to generate a new data packet.

Example 3 is a data packet 5200, such as for use as an SSID. An exemplary embodiment that utilizes such a data packet is described with reference to FIG. 50 herein. In this example, data packet 5200 includes a serial number and three passcodes.

Example 4 is a data packet 5200 including all available data. Other embodiments include subsets of the data, or include other data than specifically listed herein.

Another possible embodiment of data packet 5200 includes an expansion data field, and associated expansion data. In this example, data packet 5200 includes a set of standard data, but also includes an expansion data field where a number of expansion data sets are identified. For example, a standard set of data includes a serial number, a passcode, and an expansion data field. If a data packet generator needs to communicate additional data, the quantity of additional expansion data sets necessary is indicated in the expansion data field. For example, the quantity 2 is inserted into the expansion data field to indicate that two additional expansion data sets are included. The data packet is then expanded to include two additional data sets to include the additional data, for example, temperature data and asset tag data, or any other desired data. This provides a data packet having variable length. This improves efficiency by not requiring that empty data fields be transmitted in each data packet, and improves flexibility by allowing any desired data to be transmitted. In some embodiments a header is included in each expansion data set to identify the type of data being transmitted in the each expansion data set.

TABLE 2

TABLE OF EXAMPLE DATA PACKET CONTENT

| DATA TYPE | EXAMPLE 1 | EXAMPLE 2 | EXAMPLE 3 | EXAMPLE 4 |
| --- | --- | --- | --- | --- |
| Username | 0 | 15 | 15 | 15 |
| Passcode 1 | 7 | 7 | 7 | 7 |
| Passcode 2 | 0 | 0 | 7 | 7 |
| Passcode 3 | 0 | 0 | 0 | 7 |
| Serial number | 0 | 0 | 7 | 20 |
| Four screws | 0 | 0 | 1 | 5 |
| Tampering one | 1 | 1 | 1 | 5 |
| Tampering two | 0 | 0 | 0 | 5 |
| Neighbors serial numbers at range 1 | 0 | 0 | 5 | 50 |
| Neighbors serial numbers at range 2 (except in above) | 0 | 0 | 0 | 250 |
| Neighbors serial numbers at range 3 (except in above 2) | 0 | 0 | 0 | 1000 |
| Device has experienced motion exceeding 3 seconds | 0 | 0 | 0 | 5 |
| Altitude | 0 | 0 | 0 | 5 |
| Device has experienced a change in altitude | 0 | 0 | 0 | 5 |
| Presence verification sensors (heat, motion, sound, etc) | 0 | 0 | 0 | 25 |
| Version of software/firmware | 0 | 0 | 0 | 10 |
| Style of data packet generator unit/model | 0 | 0 | 0 | 15 |
| Date of most recent synchronization with the server | 0 | 0 | 0 | 10 |
| Service reps have been in the area | 0 | 0 | 0 | 50 |
| Security guard has been in the area | 0 | 0 | 0 | 20 |
| Emergency responder is currently in the area | 0 | 0 | 0 | 100 |
| Smoke detected | 0 | 0 | 0 | 5 |
| Temperature | 0 | 0 | 0 | 5 |
| Humidity | 0 | 0 | 0 | 5 |
| Ethernet in use with no software requesting codes | 0 | 0 | 0 | 5 |
| Mesh network message status (viral transmissions) | 0 | 0 | 0 | 5 |
| Device is currently on an approved recharging base | 0 | 0 | 0 | 15 |
| Error codes | 0 | 0 | 0 | 25 |
| Battery strength | 0 | 0 | 0 | 5 |
| POE active/inactive | 0 | 0 | 0 | 5 |
| Ping history | 0 | 0 | 0 | 50 |
| Space heater or fire temp has occurred | 0 | 0 | 0 | 5 |
| Personal asset tags | 0 | 0 | 0 | 100 |
| Asset tags 1 | 0 | 0 | 0 | 200 |
| Asset tags 2 | 0 | 0 | 0 | 200 |
| Asset tags 3 | 0 | 0 | 0 | 200 |
| Box moving asset tags | 0 | 0 | 0 | 200 |
| Additional sensor attached to data packet generator | 0 | 0 | 0 | 50 |
| Data from additional sensor attached to data packet generator | 0 | 0 | 0 | 200 |
| Wireless triangulation information | 0 | 0 | 0 | 200 |
| GPS information | 0 | 0 | 0 | 25 |
| Other RFID information (such as a badge) | 0 | 0 | 0 | 50 |
| Second battery status | 0 | 0 | 0 | 5 |
| Time remaining until memory erased | 0 | 0 | 0 | 10 |
| Mesh network on/off status | 0 | 0 | 0 | 5 |
| Time of last independent login to the server | 0 | 0 | 0 | 10 |
| Time remaining until next scheduled independent login | 0 | 0 | 0 | 10 |
| Time remaining until firmware update will be implemented | 0 | 0 | 0 | 10 |
| OS of most recent occupant | 0 | 0 | 0 | 10 |
| Neighbors serial numbers at range 1 from 24 hours ago | 0 | 0 | 0 | 50 |

TABLE 2-continued

TABLE OF EXAMPLE DATA PACKET CONTENT

| DATA TYPE | EXAMPLE 1 | EXAMPLE 2 | EXAMPLE 3 | EXAMPLE 4 |
|---|---|---|---|---|
| Neighbors serial numbers at range 2 from 24 hours ago | 0 | 0 | 0 | 250 |
| Neighbors serial numbers at range 3 from 24 hours ago | 0 | 0 | 0 | 1000 |
| Neighbors serial numbers at range 1 from one week ago | 0 | 0 | 0 | 50 |
| Neighbors serial numbers at range 2 from one week ago | 0 | 0 | 0 | 250 |
| Neighbors serial numbers at range 3 from one week ago | 0 | 0 | 0 | 1000 |
| Accelerometer status (angle of device) | 0 | 0 | 0 | 10 |
| Distance to the floor | 0 | 0 | 0 | 5 |
| Device identifier (e.g., devices other than data packet generators) (asset in use) | 0 | 0 | 0 | 50 |
| Alert override approval code | 0 | 0 | 0 | 50 |
| Model number of neighbors in range 1 | 0 | 0 | 0 | 100 |
| Device experienced massive shock | 0 | 0 | 0 | 5 |
| Device experienced water | 0 | 0 | 0 | 5 |
| Device experienced wireless interference (microwave) | 0 | 0 | 0 | 5 |
| Log file of what has happened to the device | 0 | 0 | 0 | 1000 |
| Other(s) | 0 | 0 | 0 | 1000 |
| TOTAL DATA PACKET SIZE | 23 | 23 | 43 | 8061 |

In some embodiments, data packet 5200 and/or data 5202 are encoded and/or encrypted. For example, in some embodiments data packet 5200 and/or data 5202 include tags, such as extensible markup language (XML), hypertext markup language (HTML) to encode data 5202. Encryption and/or compression algorithms are used to package the data 5202 in some embodiments for more efficient or secure transmission of data packet 5200. An XML schema is used in some embodiments.

Figure 54:
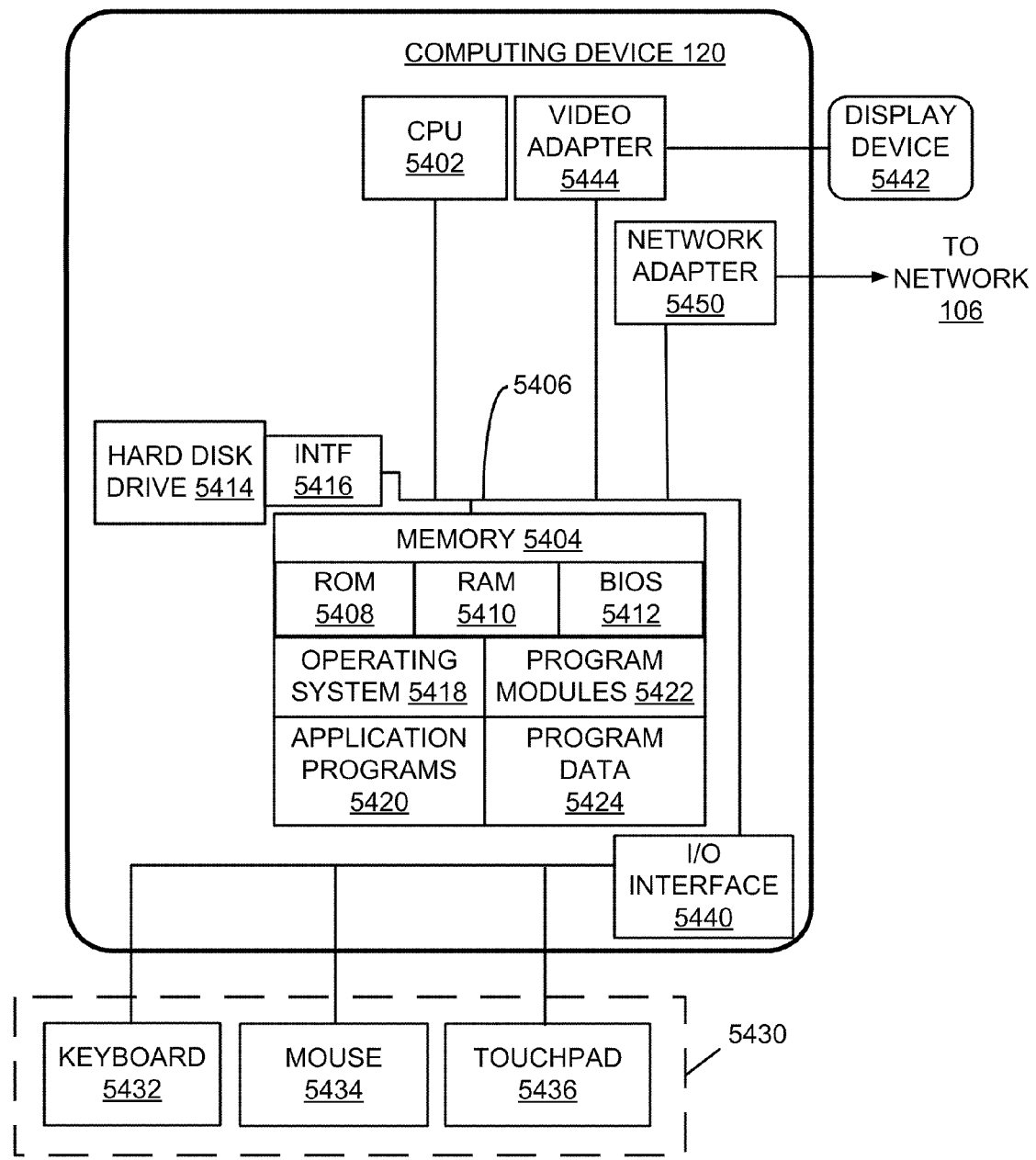
FIG. 54 is a schematic diagram of an example computing device, such as the computing device shown in FIG. 1.

FIG. 54 is a schematic block diagram illustrating an architecture of an example computing device 120. In this example, computing device 120 is a computing device, such as a personal computer. In some embodiments, computing device 120 is used to execute the operating system 5418, application programs 5420, program modules 5422, and manipulate the program data 5424 described herein. The example computing device described in FIG. 54 is also an example of a suitable computing device 130 or server 108, or any other computing device disclosed herein. Further, in some embodiments the code generators and data packet generators described herein are implemented by such a computing device.

Computing device 120 includes, in some embodiments, at least one processing device 5402. A variety of processing devices are available from a variety of manufacturers, for example, Intel or Advanced Micro Devices. In this example, computing device 120 also includes system memory 5404, and system bus 5406 that couples various system components including system memory 5404 to processing device 5402. System bus 5406 is one of any number of types of bus structures including a memory bus, or memory controller; a peripheral bus; and a local bus using any of a variety of bus architectures.

System memory 5404 includes read-only memory 5408 and random access memory 5410. Basic input/output system 5412, containing the basic routines that act to transfer information within computing device 120, such as during start up, is typically stored in read-only memory 5408.

Computing device 120 also includes secondary storage device 5414 in some embodiments, such as a hard disk drive, for storing digital data. Secondary storage device 5414 is connected to system bus 5406 by secondary storage interface 5416. Secondary storage devices 5414 and their associated computer readable media provide nonvolatile storage of computer readable instructions (including application programs and program modules), data structures, and other data for computing device 120.

Although the exemplary architecture described herein employs a hard disk drive as a secondary storage device, other types of computer readable media are used in other embodiments. Examples of these other types of computer readable media include magnetic cassettes, flash memory cards, digital video disks, Bernoulli cartridges, compact disc read only memories, digital versatile disk read only memories, random access memories, or read only memories.

A number of program modules can be stored in secondary storage device 5414 or system memory 5404, including operating system 5418, one or more application programs 5420, other program modules 5422, and program data 5424. Server communication module 900, authorization module 902, and data packet generator communication module 904 (shown in FIG. 9) are examples of program modules 5422.

In some embodiments, a user provides inputs to the computing device 120 through one or more input devices 5430. Examples of input devices 5430 include keyboard 5432, mouse 5434, and touchpad 5436 (or touch sensitive display). Other embodiments include other input devices 5430, such as a barcode reader, RFID reader, magnetic card reader, USB port, microphone, or other input device. Input devices 5430 are often connected to the processing device 5402 through input/output interface 5440 that is coupled to system bus 5406. These input devices 5430 can be connected by any number of input/output interfaces, such as a parallel port, a serial port, a game port, or a universal serial bus. Wireless communication between input devices and interface 5440 is possible as well, and includes infrared, BLUETOOTH® wireless technology, 802.11a/b/g/n (or other wireless communication protocols), cellular, or other radio frequency communication systems in some possible embodiments.

In this example embodiment, a display device 5442, such as a monitor, liquid crystal display device, projector, or touch screen display device, is also connected to system bus 5406 via an interface, such as video adapter 5444. In addition to display device 5442, the computing device 120 can include various other peripheral devices (not shown), such as speakers or a printer.

When used in a local area networking environment or a wide area networking environment (such as the Internet), computing device 120 is typically connected to network 106 through a network interface or adapter 5450. An example of a network interface is an Ethernet interface. Other possible embodiments use other communication devices. For example, some embodiments of computing device 120 include a modem for communicating across network 106.

Computing device 120 typically includes at least some form of computer-readable media. Computer readable media include any available media that can be accessed by computing device 120. By way of example, computer-readable media include computer readable storage media and communication media.

Computer readable storage media includes volatile and nonvolatile, removable and non-removable media implemented in any device configured to store information, such as computer readable instructions, data structures, operating systems 5418, application programs 5420, program modules 5422, program data 5424, or other data. System memory 5404 is an example of computer readable storage media. Computer storage media includes, but is not limited to, read-only memory 5408, random access memory 5410, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by computing device 120.

Communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, communication media includes wired media such as a wired network or direct-wired connection, and wireless media such as acoustic, radio frequency, infrared, and other wireless media. Combinations of any of the above are also included within the scope of computer readable media.

In some embodiments, computing device 120 remotely accesses software running on a server, such as server 108, such as utilizing virtualization technology or remote access software for delivering applications over network 106. For example, Citrix Systems, located in Fort Lauderdale, Fla., US distributes software suitable for delivering applications over network 106.

Some embodiments according to the present disclosure are or include one or more of the following.

A code generating device comprising: a housing; a processing device within the housing that generates a passcode; memory that stores the passcode generated by the processing device; an output device that outputs the passcode; and an attachment device rigidly attachable to the housing to connect the housing to a structure.

A code generating device wherein the output device is selected from the group comprising a display, a speaker, a digital communication device, and a wireless communication device.

A code generating device, wherein the passcode comprises alphanumeric characters.

A code generating device, wherein the alphanumeric characters do not include any of the following characters: I, O, Q, 1, and 0.

A code generating device, wherein the alphanumeric characters are selected only from the group consisting of: A, B, C, D, E, F, G, H, J, K, L, M, N, P, R, S, T, U, V, W, X, Y, Z, 2, 3, 4, 5, 6, 7, 8, and 9.

A code generating device, wherein the alphanumeric characters are numbers.

A code generating device comprising: a processing device that generates a passcode comprised of a plurality of characters selected from the group consisting of A, B, C, D, E, F, G, H, J, K, L, M, N, P, R, S, T, U, V, W, X, Y, Z, 2, 3, 4, 5, 6, 7, 8, and 9; memory that stores the passcode generated by the processing device; and an output device that outputs the passcode.

An authentication system comprising: a code generating device operable to generate a passcode, a computing device operable to prompt a user to enter the passcode, to receive the passcode from the user, and to communicate the passcode across a network; and a server device operable to receive the passcode from the computing device across the network, wherein the server device is operable to verify that the passcode is a valid passcode and to identify the passcode as being associated with the code generating device.

An authentication system, wherein the code generating device includes an attachment device, the attachment device being attachable to a structure.

An authentication system, wherein the server device stores a location of the code generating device, such that the location of the code generating device is determinable by the server when the server identifies the passcode as being associated with the code generating device.

An authentication method comprising: receiving a first passcode; determining that the first passcode is not unique; requesting a second passcode; receiving the second passcode; determining that the second passcode is unique; and retrieving information associated with at least the second passcode.

An authentication method wherein the information identifies a location.

An authentication method, wherein the information identifies an object.

A method of authenticating, the method comprising: receiving an input value from a surface of an object; determining a time; computing a passcode using the input value and the time; and outputting the passcode for authentication.

A system as shown in any one of the drawings or as described in the detailed description herein.

A method as shown in any one of the drawings or as described in the detailed description herein.

A code generating device comprising: a housing including a first housing member and a second housing member, the first housing member being pivotally coupled to the second housing member, the second housing member including a recessed region, wherein the code generator is positionable in a first position in which the first housing member is received within the recessed region, and a second position in which the first housing member extends out from the recessed region; a processing device within the housing that generates a passcode; memory that stores the passcode generated by the processing device; an output device that outputs the passcode; and an attachment device rigidly attachable to the housing to connect the housing to a structure.

A code generating device, wherein the output device comprises a display.

A code generating device, wherein the output device comprises a wireless communication device.

A code generating device, wherein the wireless communication device is operable in a short range communication mode and a longer range communication mode.

A code generating device, wherein the short range communication mode is operable to automatically communicate a passcode to a computing device without user intervention.

A code generating device, wherein the communication communicates a message including the passcode and further including alert data.

A code generating device, wherein the longer range communication mode is operable to automatically communicate with a nearby code generator.

A code generating device, wherein the display displays a manual alert passcode.

A code generating device, further comprising a tamper sensor.

A code generating device, wherein the tamper sensor comprises a fastener detector that operates to detect the presence or absence of a fastener in a fastener hole.

A code generating device, wherein the display generates a space utilization intensity map.

A code generating device, wherein the processor is programmed to operate in a normal mode and in an alert mode.

A code generating device, wherein when operating in the alert mode, the code generating device displays a passcode on a display, the passcode including an alert code.

A code generating device, wherein when operating in the alert mode, the code generating device transmits an alert message including a passcode and alert data.

An authentication system comprising: a server; a conference room control system that manages conference room resources; a code generator located in a conference room; and a telephone located in the conference room, wherein a passcode generated by the code generator is entered into the telephone, which in turn communicates the passcode to the conference room, and wherein the server grants or denies access to conference room resources based upon the passcode.

A passcode generator with means for integrating with physical and/or virtual objects or data. An example of a virtual object is currency in an electronic form. Any other physical object can also be a virtual object in some embodiments.

A method of observing scheduled passcode changes (including in some embodiments SSID name changes) at a moment in time as an authentication method.

A method of observing changes at a moment in time, wherein the moment in time is a period of time in a range from 1 millisecond to about ten minutes. In some embodiments the period of time is less than ten minutes. In another embodiment, the period of time is less than 1 millisecond, 10 milliseconds, 100 milliseconds, 1 second, 10 seconds, 30 seconds, 60 seconds, 5 minutes, 15 minutes, 1 hour, or 24 hours.

A method of correctly identifying a single passcode generator from among many passcode generators while in a duplicating passcode environment. An example is shown in FIG. 13.

A method of using a passcode generator, synchronized server, and CAD drawing to perform GIS functions.

A method of communicating authenticated, real-time information over an IT network without joining that same network.

A method of authenticating a real-time event.

A method of integrating IT, HR, and CRE functions within an organization.

A method of automating a CAFM program.

A passcode generator including mesh networking capabilities.

A method of communicating a data packet including data, such as any of the data shown in Table 2.

A method of acquiring a username at or after login.

A data packet generator that is not worn or carried by a person/human being/animal.

A data packet generator incorporating data from other sources, such as a utilities ledger, human resources database, CAFM database, neighboring device.

A method of merging a first data packet with another data packet.

A method of merging with a computing device a data packet received from an SSID with a full data packet received from a wireless or wired communication.

A method of sending a merged data packet to a server, and receiving the merged data packet at the server.

A method of generating a real-time, compiled, and/or predictive data display based on information received from one or more data packets from one or more data packet generators.

A method of communicating a data packet from a data packet generator directly to a server across a communication network.

A method of revealing space utilization within a building and/or enables ongoing commercial real estate optimization.

A method of automatically adjusting a building control (such as a heating or cooling system, an elevator, a light, etc.) based on data received from one or more data packets of one or more data packet generators.

A method of limiting access to resources with a computing system.

A biomimicry of a strand of dna comprising at least one passcode.

A method of controlling a fleet of vehicles.

A method of integrating the operation of a data packet generator with one or more of currency, audio or video data files (e.g., mp3), credit cards, avatars, or other objects discussed herein whether physical or virtual.

A method of charging back departments based on actual space utilization.

A method of performing any one of the applications described herein or generating any one of the dashboards or user interfaces described herein.

A method of identifying a latitude and a longitude within a building.

A method of enabling location based applications to function without requiring triangulation, GPS data, or RFID data.

A method of acquiring an input from an external source such as a conductive material or light rays, such as by encoding a data packet in the conductive material or light rays. Other electromagnetic signals are used in other embodiments.

A method of tracking objects throughout a facility or plurality of facilities.

A method of guiding a first responder and/or providing interactive wayfinding.

A method of improving environmental sustainability.

A method of improving predictions and/or recognizing the location of reconfigurations.

A method of locating a computing device in a facility.

A method of integrating with facility management functions.

A method of detecting tampering.

A method of tying into demographic information, insurance claims, synergy, performance, job satisfaction, and other human resource measures or metrics.

A method of preventing access to a resource based on missing or incorrect information.

A smartphone application as described herein.

A system including a jumpnode server, wherein the jumpnode server communicates data outside of a network but prevents unauthorized communication into the network.

A method of locating a voice-over-IP telephone in real-time.

A computing device that receives a software push as a prerequisite to accessing a wireless network.

A system or method that conforms with the requirements of a data exchange standards system, such as the open standards for commercial real estate (OSCRE).

A data packet generator that is ruggedized to endure office/cubicle reconfigurations and smooth to accommodate office/cubicle users.

A data packet generator incorporated into a cubicle or office component.

A method of generating a data feed display that is configured for viewing by a CEO, CFO, CIO, occupancy planner, HR executive, facilities manager, IT manager, space planner, department manager, IT security manager, IT technician, disaster response coordinator, mail center professional, facility manager, physical security personnel, call center professional, department move liaison, furniture installer, box mover, work space end user, or common area user.

A data packet generator integrated with a convenience or hoteling hub, such as including easily accessible outlets, ports, jacks, pencil holders, etc.

The present disclosure describes various systems and processes with reference to particular examples and exemplary embodiments. The particular features, configurations, and methods described with reference to a particular embodiment are also useful when combined with part or all of another embodiment to form yet additional embodiments. Such additional embodiments will be readily apparent to a person of skill in the art. As a result, the following description should be read as a whole with the understanding that many alternative combinations of features, configurations, and methods are intended to be within the scope of the present disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A data packet generator comprising:
   a processing device;
   memory storing data instructions, which when executed by the processing device cause the processing device to periodically generate at least one non-network name code the at least one code including a plurality of characters; and
   a wireless communication device that wirelessly transmits the at least one code in a network name field according to a wireless data communication protocol.

2. The data packet generator of claim 1, wherein the code includes data selected from a serial number, a passcode, a temperature, a humidity, a username, a distance-to-floor, a GPS coordinate, data received from a neighboring data packet generator, and a tamper code.

3. The data packet generator of claim 1, wherein the network name field is a service set identifier field.

4. The data packet generator of claim 1, wherein the plurality of characters is in a range from five to ten characters.

5. The data packet generator of claim 1, further comprising an attachment device including one or more of a screw, a bolt, a nail, and adhesive.

6. The data packet generator of claim 5, wherein the attachment device is configured for attachment to a component of a workstation.

7. The data packet generator of claim 1, further comprising a housing.

8. The data packet generator of claim 7, wherein the processing device and memory are contained within the housing.

9. The data packet generator of claim 1, further comprising a battery and electrical contacts, wherein the electrical contacts are configured to receive power from a charging station to recharge the battery of the data packet generator.

10. The data packet generator of claim 1, wherein the processing device periodically generates the code according to a passcode generation algorithm.

11. The data packet generator of claim 1, wherein periodically is a period of time less than ten minutes.

12. The data packet generator of claim 1, wherein the processing device periodically generates the code by retrieving the code from a lookup table.

13. The data packet generator of claim 1, wherein the data packet generator is battery powered.

14. The data packet generator of claim 13, wherein the data packet generator is separated from an Internet to prevent data communication from the Internet to the data packet generator.

15. The data packet generator of claim 1, further comprising a sensor, wherein the code includes data describing an event that is measured or detected by the sensor.

16. The data packet generator of claim 1, wherein the data packet generator is incorporated into a smart dust device.

17. A data packet generator comprising:
    a processing device;
    memory storing data instructions, which when executed by the processing device cause the processing device to periodically generate a passcode, the passcode including a plurality of characters; and
    a wireless communication device that outputs a data packet including the passcode in a network name field, and wherein the wireless communication device is continually free from network communication.

18. The data packet generator of claim 17, wherein the only data transmitted by the wireless communication device is passcodes generated by the processing device.

19. The data packet generator of claim 17, wherein the wireless communication device is a transmit-only device that transmits the data packet to another device without connecting to the other device.

20. The data packet generator of claim 17, wherein the wireless communication device transmits the data packet in a service set identifier according to a standard wireless radio frequency data communication protocol.

21. The data packet generator of claim 20, wherein the wireless radio frequency data communication protocol is a Wi-Fi protocol according to an IEEE 802.11 wireless communication protocol.

22. A data packet generator comprising:
    a processing device;
    memory storing data instructions, which when executed by the processing device cause the processing device to periodically generate a non-network name code including a sequence of characters; and
    a wireless communication device that wirelessly transmits the non-network name code in a network name field according to a wireless data communication protocol.

23. The data packet generator of claim 22, wherein the network name further comprises other data in addition to the non-network name code.

* * * * *